(12) United States Patent
Cummins

(10) Patent No.: US 9,073,762 B2
(45) Date of Patent: Jul. 7, 2015

(54) FLUID TREATMENT APPARATUS

(75) Inventor: Ian G. Cummins, Runaway Bay Gold Coast (AU)

(73) Assignees: Snapdragon Investment Limited of Sovereign Trust (Hong Kong) Limited, Central Hong Kong (HK); Ian Geoffrey Cummins, Gold Coast, Queensland (AU)

( * ) Notice: Subject to any disclaimer, the term of this patent is extended or adjusted under 35 U.S.C. 154(b) by 720 days.

(21) Appl. No.: 13/375,590

(22) PCT Filed: Jun. 2, 2010

(86) PCT No.: PCT/AU2010/000669
§ 371 (c)(1),
(2), (4) Date: Dec. 1, 2011

(87) PCT Pub. No.: WO2010/139001
PCT Pub. Date: Dec. 9, 2010

(65) Prior Publication Data
US 2012/0085691 A1  Apr. 12, 2012

(30) Foreign Application Priority Data

| Jun. 2, 2009 | (AU) | 2009902489 |
|---|---|---|
| Aug. 5, 2009 | (AU) | 2009903649 |
| Nov. 12, 2009 | (AU) | 2009905544 |
| Feb. 23, 2010 | (AU) | 2010900731 |
| Feb. 23, 2010 | (AU) | 2010900733 |
| Apr. 15, 2010 | (AU) | 2010901588 |

(51) Int. Cl.
*C02F 9/00* (2006.01)
*C02F 1/32* (2006.01)
*C02F 1/78* (2006.01)

(52) U.S. Cl.
CPC ... *C02F 9/00* (2013.01); *C02F 1/32* (2013.01); *C02F 1/78* (2013.01)

(58) Field of Classification Search
CPC .............. C02F 1/006; C02F 1/20; C02F 1/32; C02F 1/325; C02F 1/24; C02F 1/78; C02F 2201/3223; C02F 2201/78; C02F 2201/782; C02F 2201/784; C02F 9/00
See application file for complete search history.

(56) References Cited

U.S. PATENT DOCUMENTS

| 5,393,419 | A | * | 2/1995 | Tiede et al. | 210/192 |
|---|---|---|---|---|---|
| 2004/0226893 | A1 | * | 11/2004 | Kamimura et al. | 210/748 |
| 2005/0218084 | A1 | * | 10/2005 | Leung et al. | 210/748 |
| 2009/0180934 | A1 | | 7/2009 | Khoshbin | |

FOREIGN PATENT DOCUMENTS

| CN | 201296711 | 8/2009 |
|---|---|---|
| JP | 2004-298717 | 10/2004 |

(Continued)

*Primary Examiner* — Lucas Stelling
(74) *Attorney, Agent, or Firm* — Davis & Bujold, P.L.L.C.; Michael J. Bujold

(57) ABSTRACT

Fluid purification or treatment apparatus (10) for treating or purifying contaminated liquids such as water which includes at least one upright elongated primary treatment chamber (11) having an inlet (14) for fluid to be treated at an upper end of the chamber (11) such that fluid flows downwardly through the chamber (11) and means (20 or 24) for introducing a sterilizing agent such as ozone or ozone enriched air into a lower end of the chamber (11) for bubbling upwardly through liquid flowing downwardly through the chamber (11), means (16) at the upper end of the chamber (11) for removing waste and an ultraviolet lamp (29) for UV treatment of the liquid, the ultraviolet lamp (29) being located in a separate chamber (12) connected to the primary treatment chamber (11) or within the primary treatment chamber (11). A plurality of chambers (11) and (12) may be provided for multiple treatment of the liquid.

25 Claims, 50 Drawing Sheets

(56) References Cited

FOREIGN PATENT DOCUMENTS

| | | |
|---|---|---|
| JP | 2008-272761 | 11/2008 |
| KR | 20100003553 | 1/2010 |
| WO | 90/14312 | 11/1990 |
| WO | WO 2007025345 A1 * | 3/2007 |
| WO | 2010/058187 | 5/2010 |

* cited by examiner

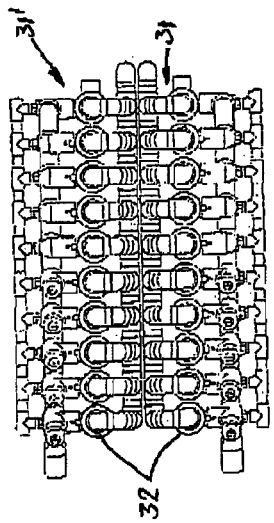
FIG. 4
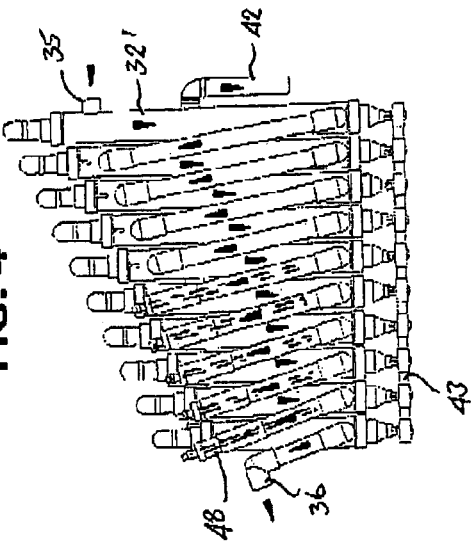
FIG. 6
FIG. 5
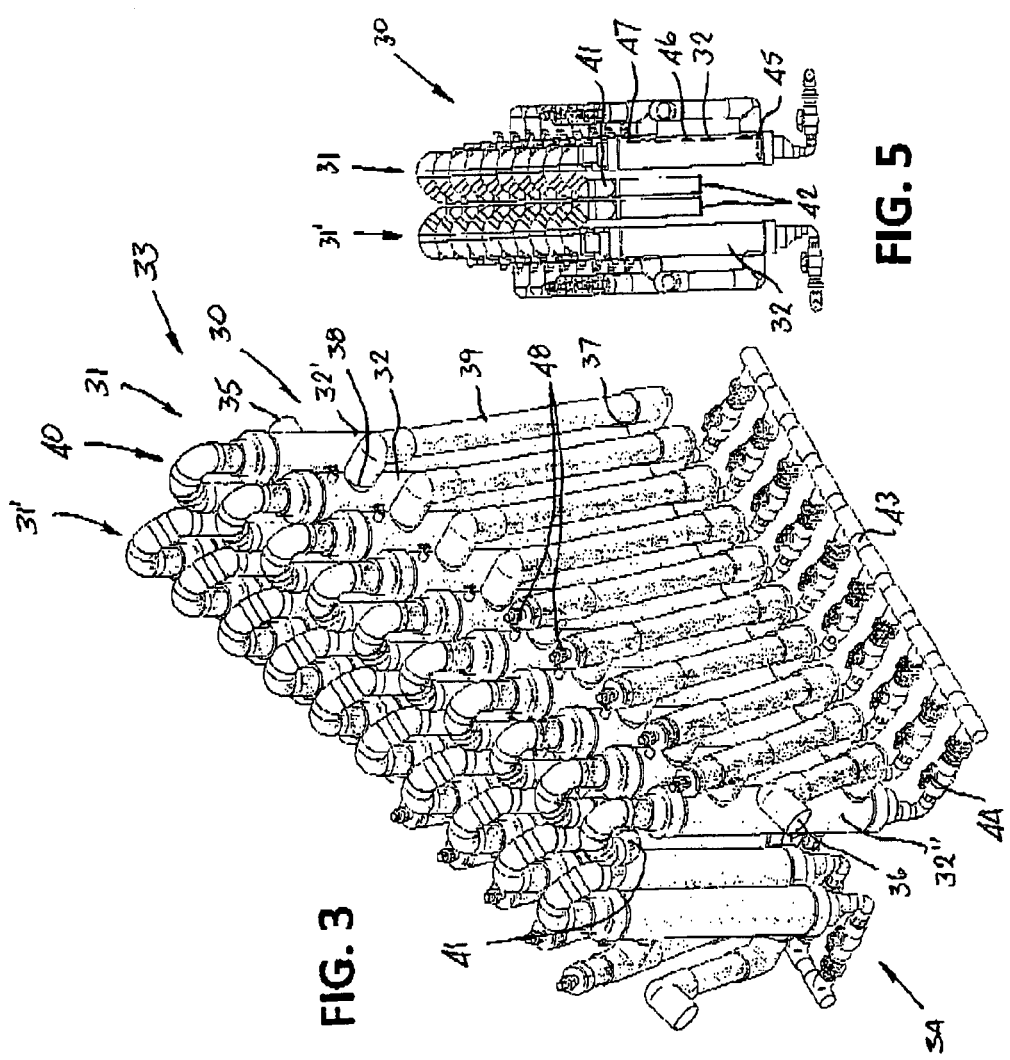
FIG. 3

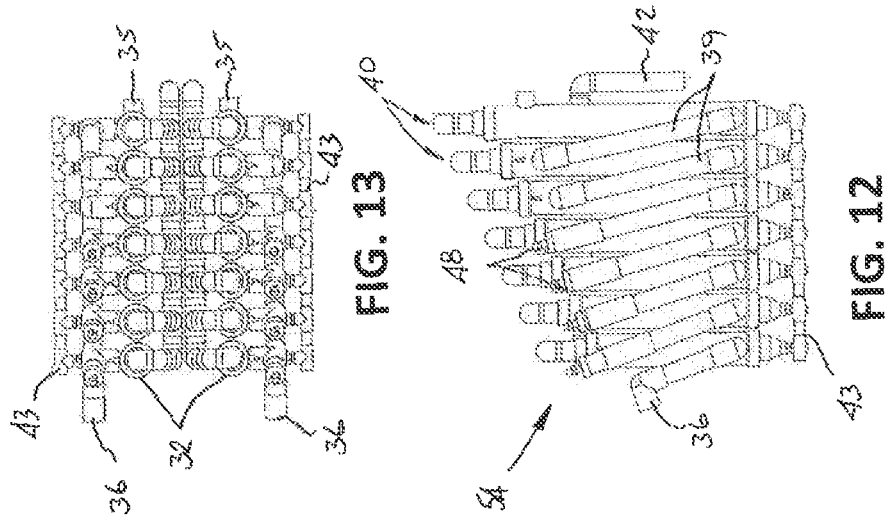
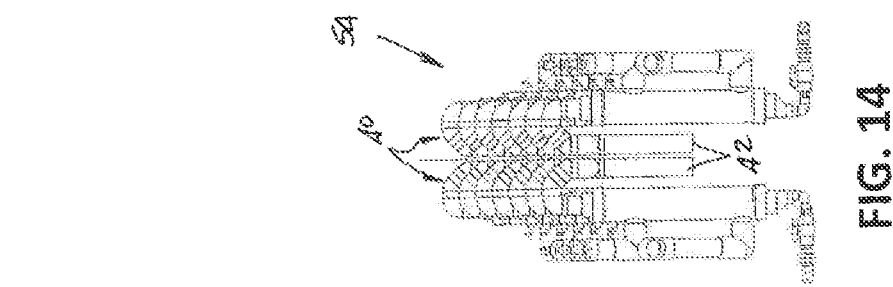
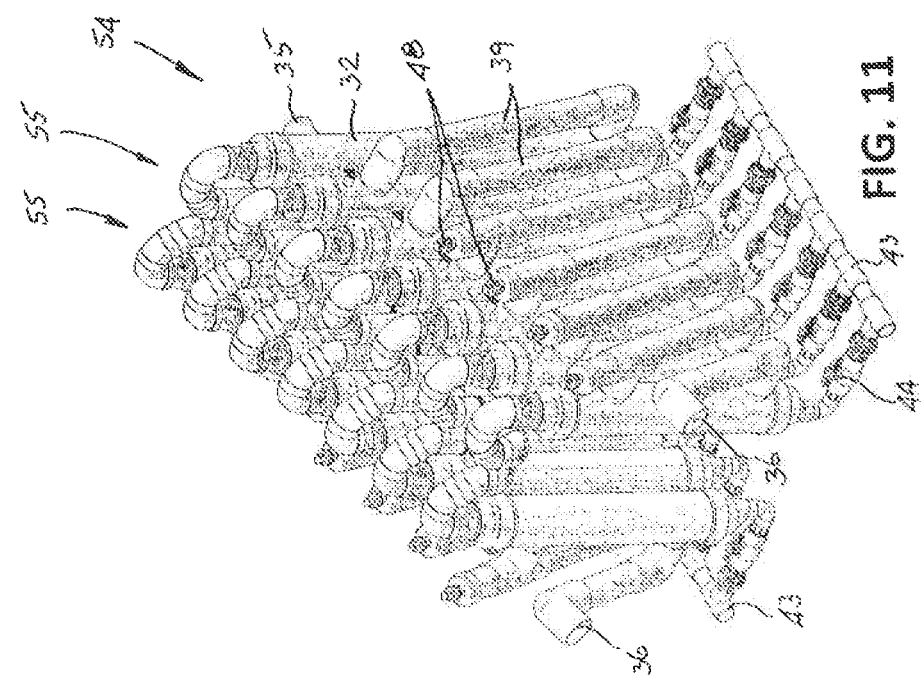

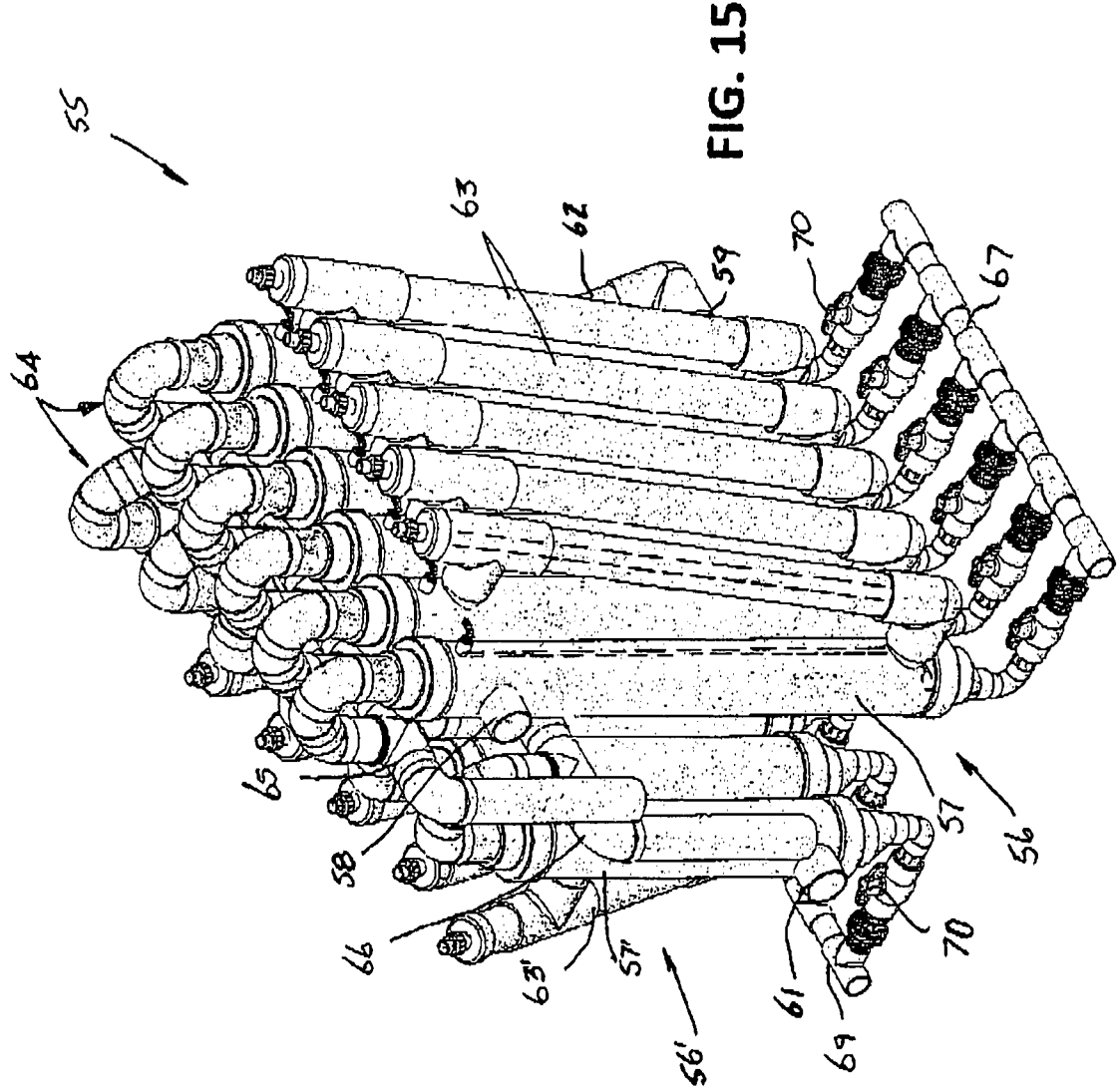

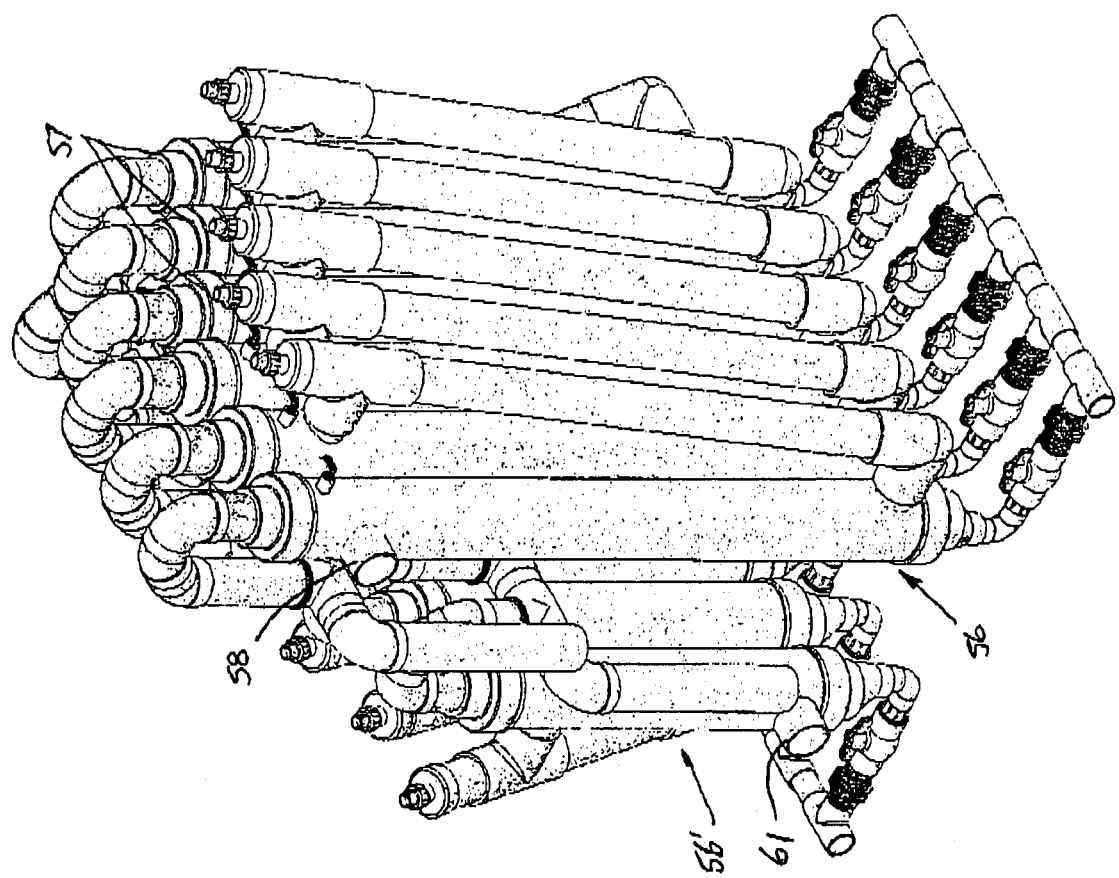

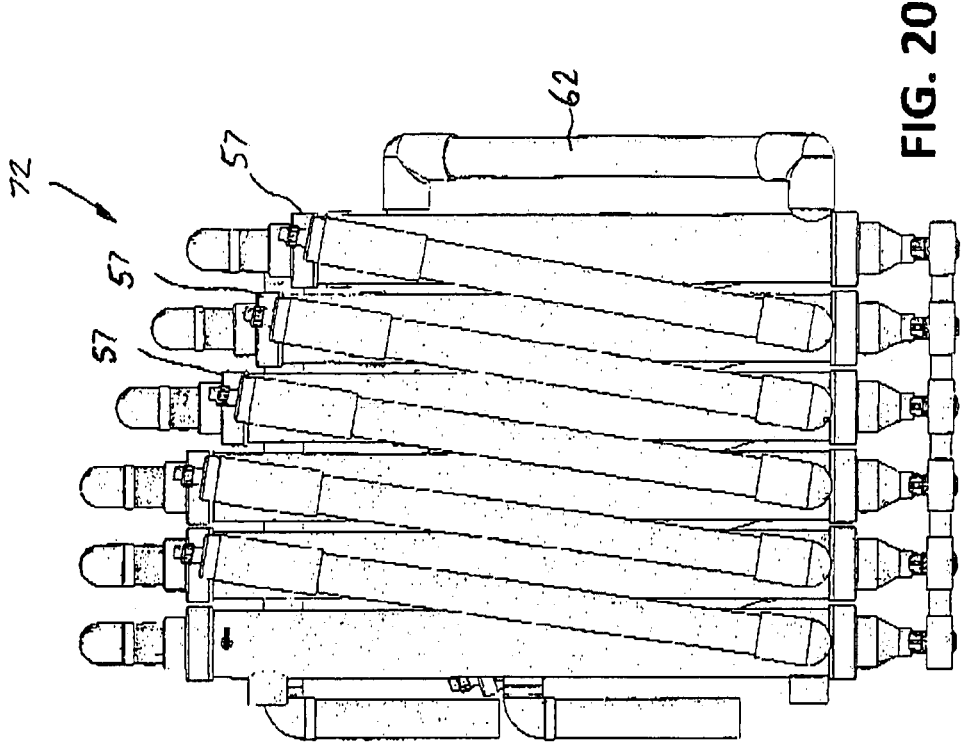
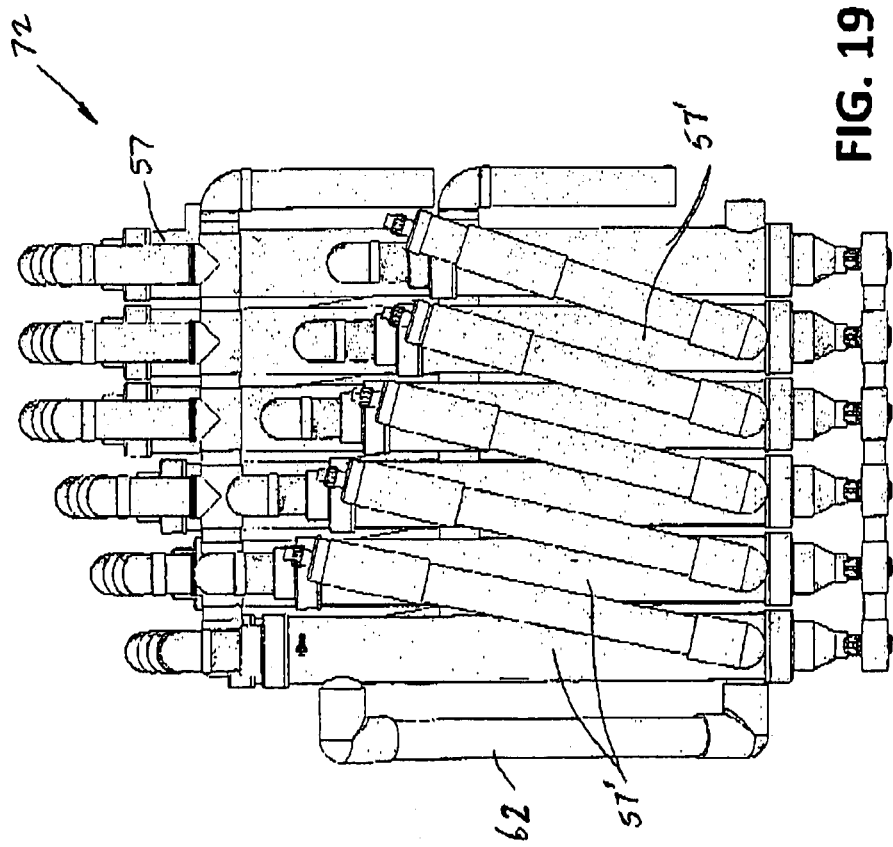

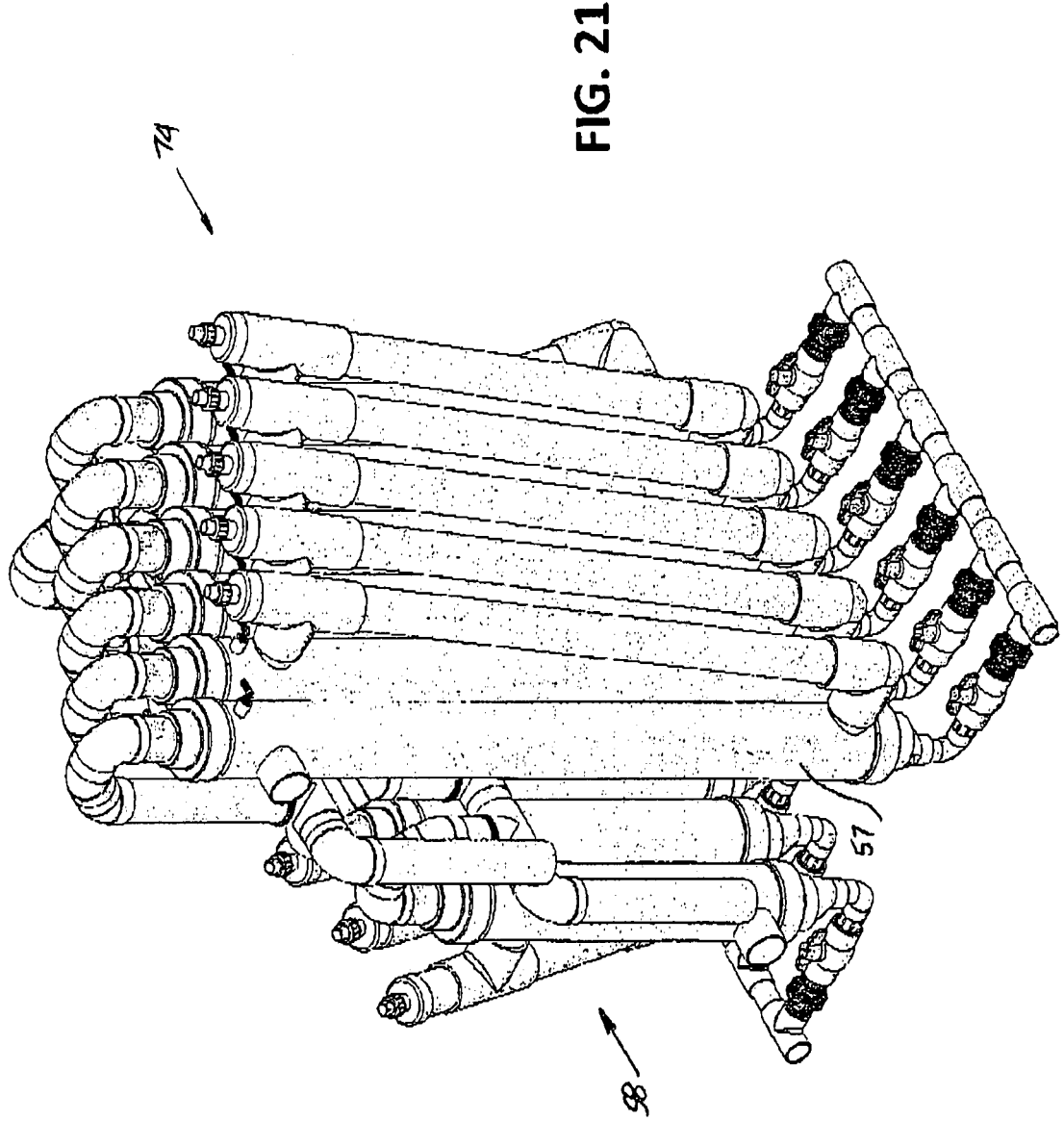

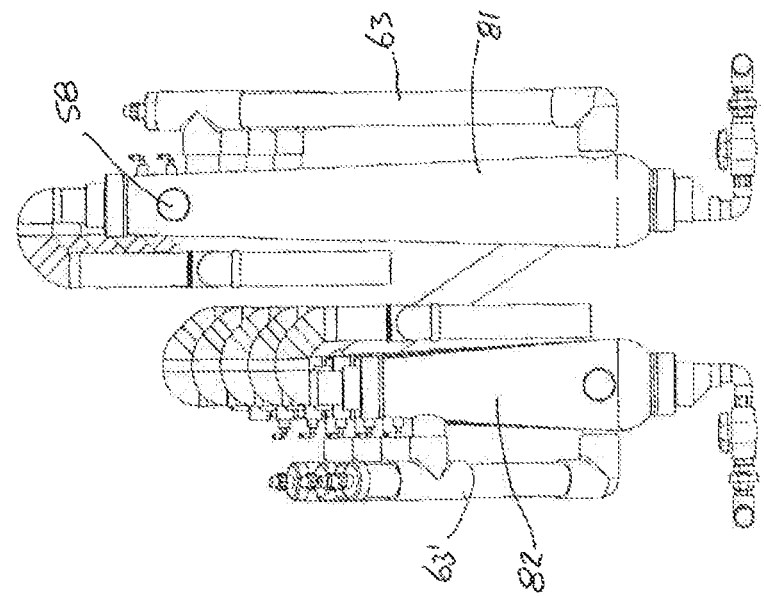
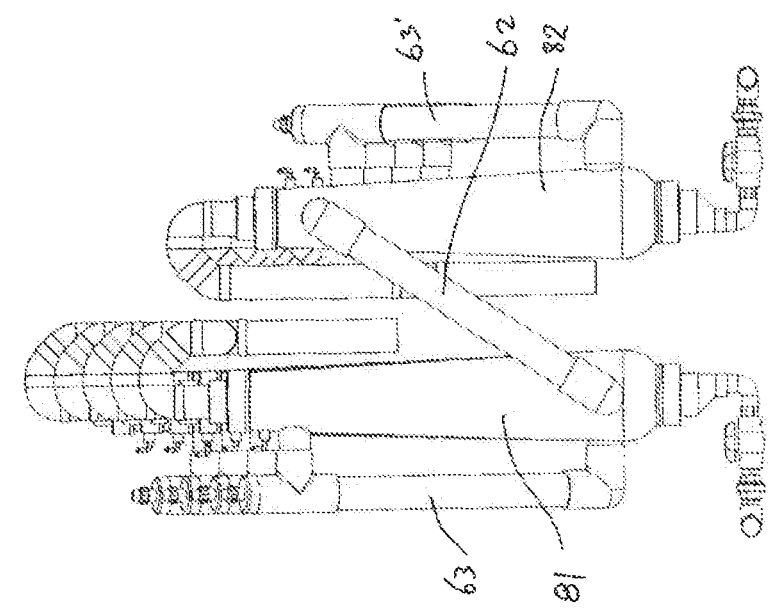

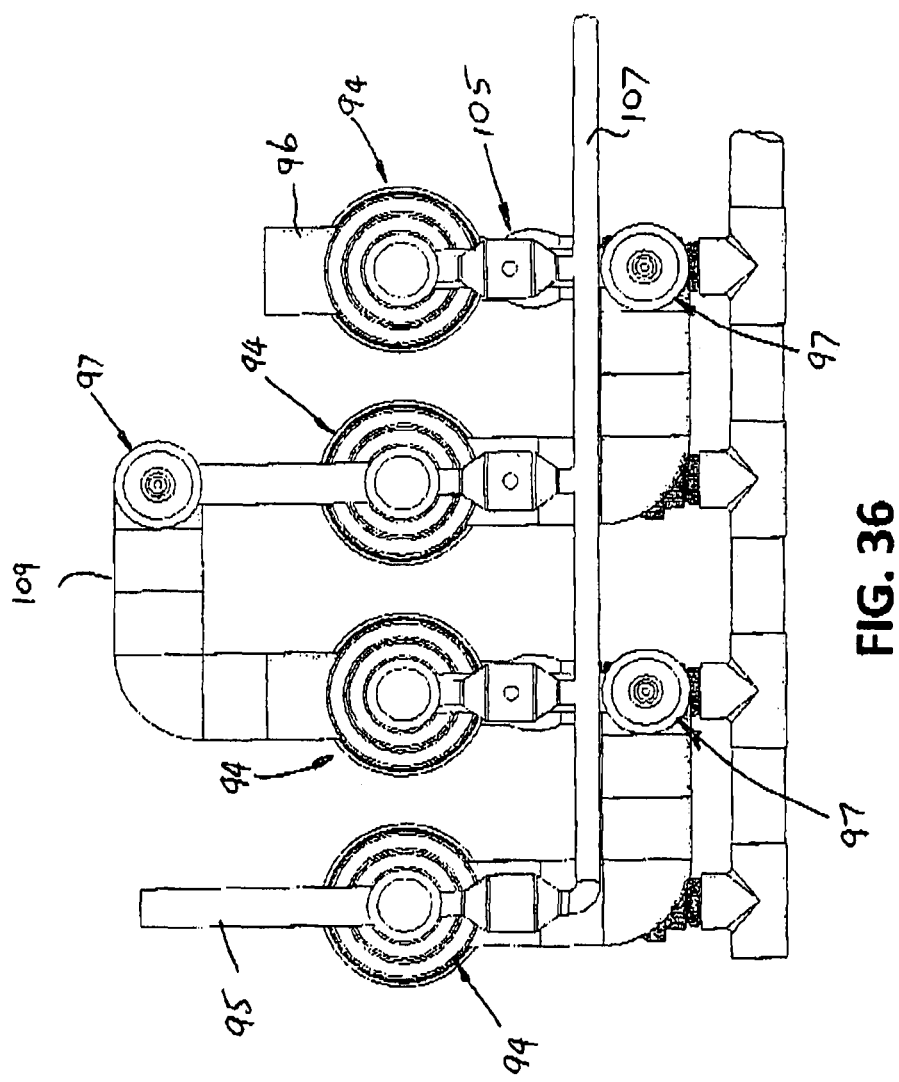

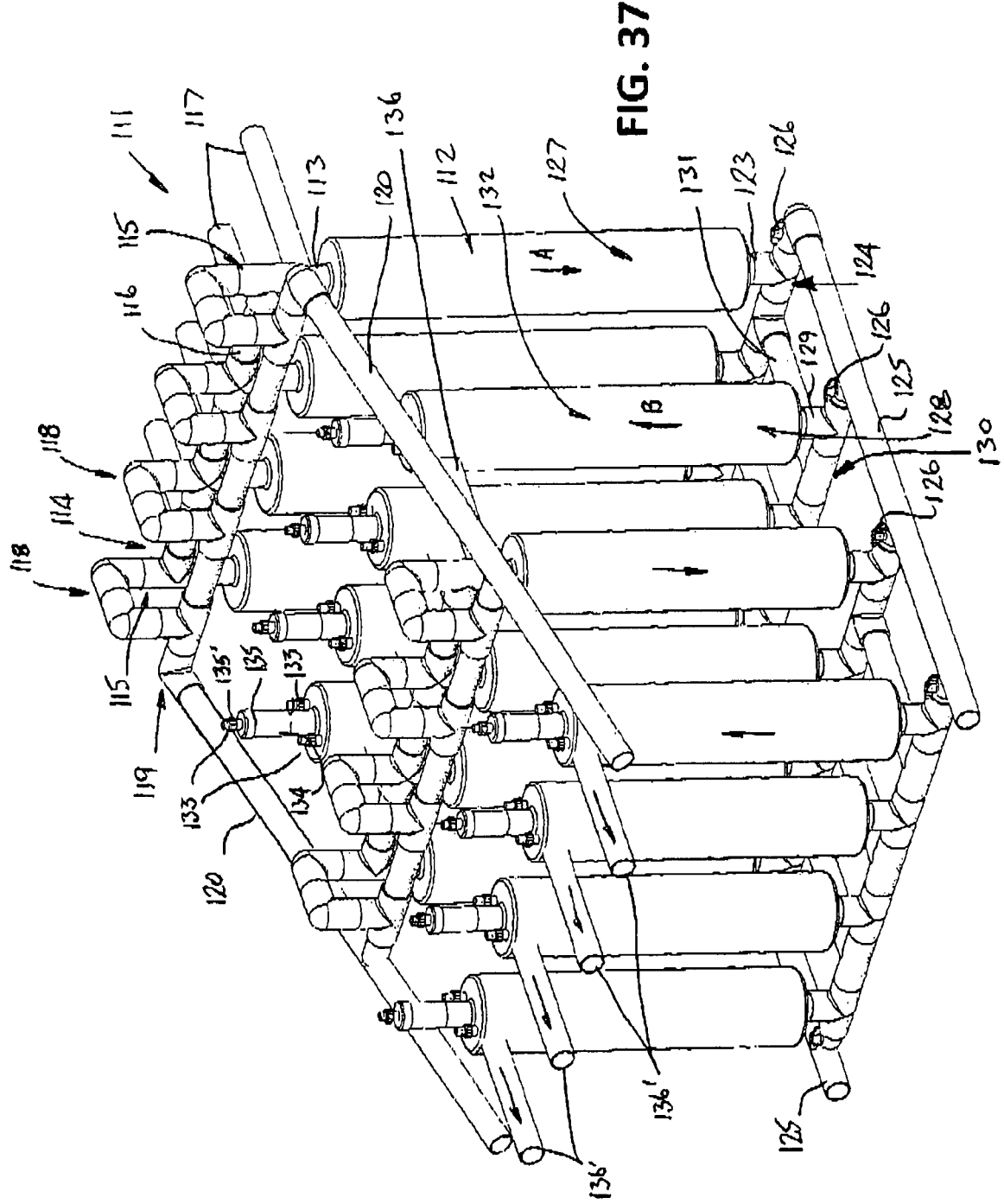

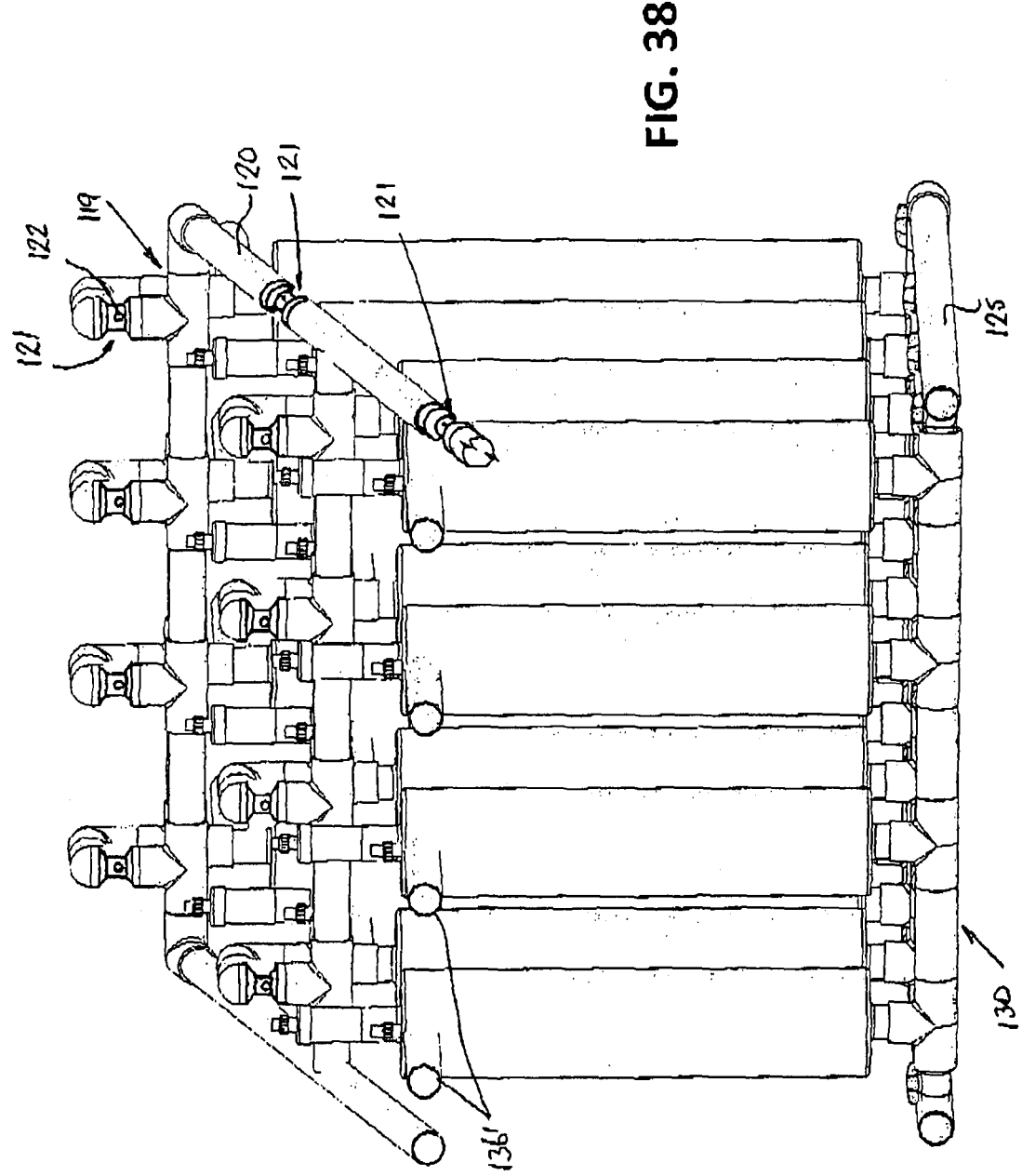

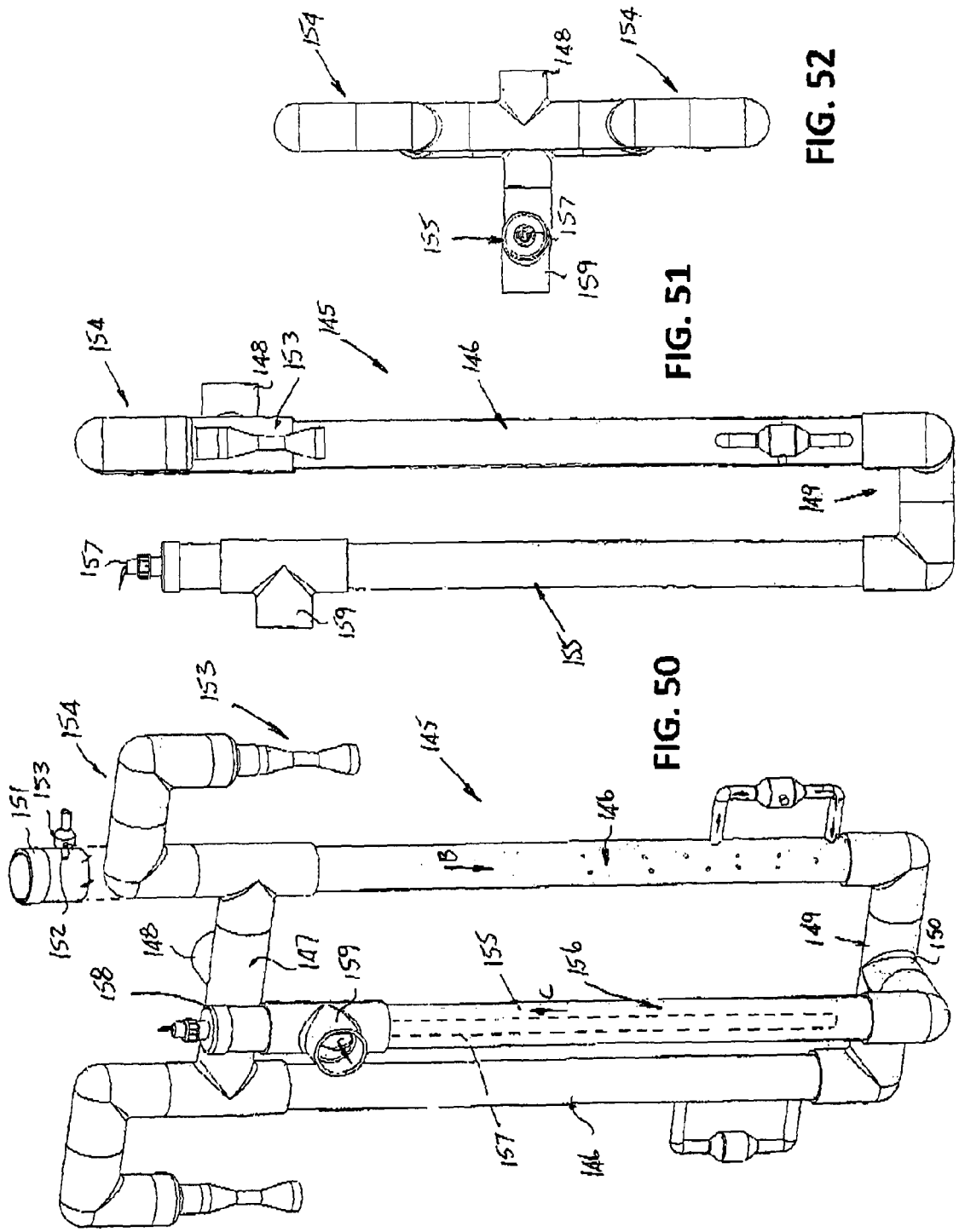

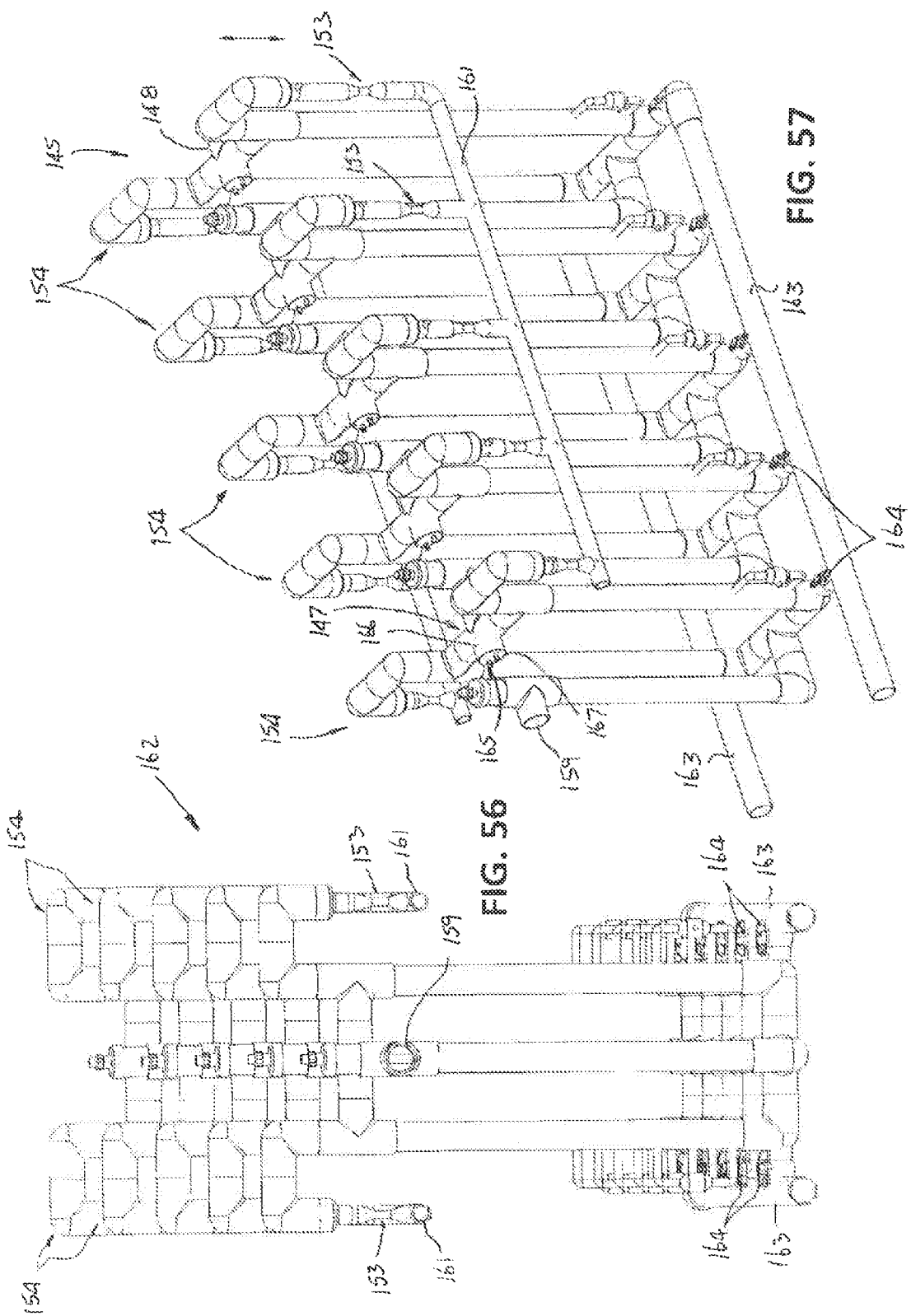

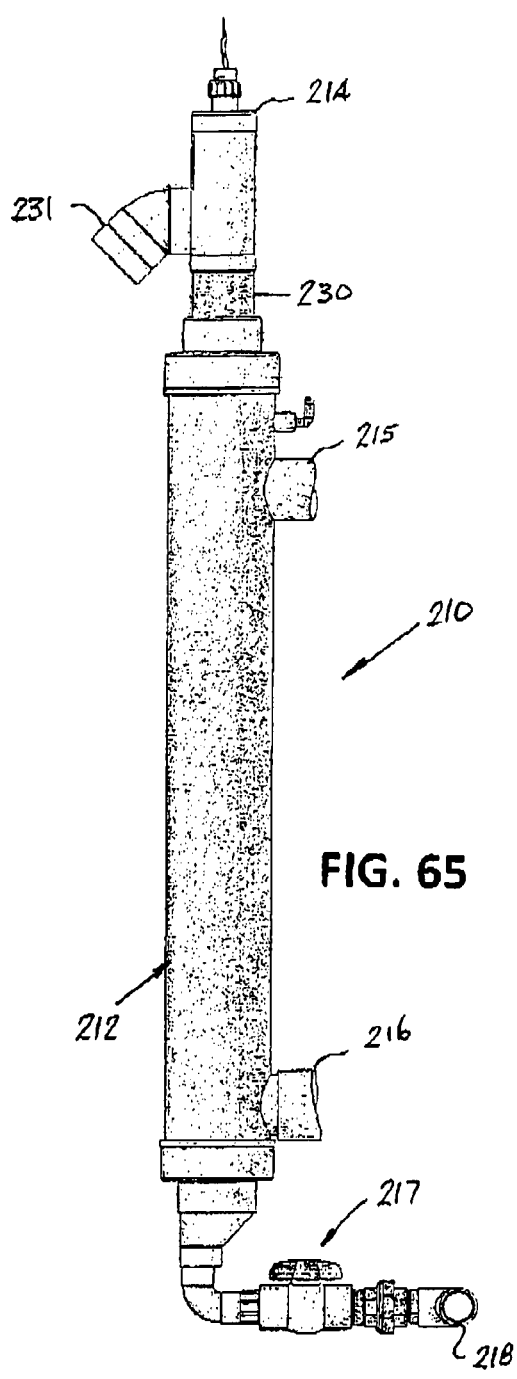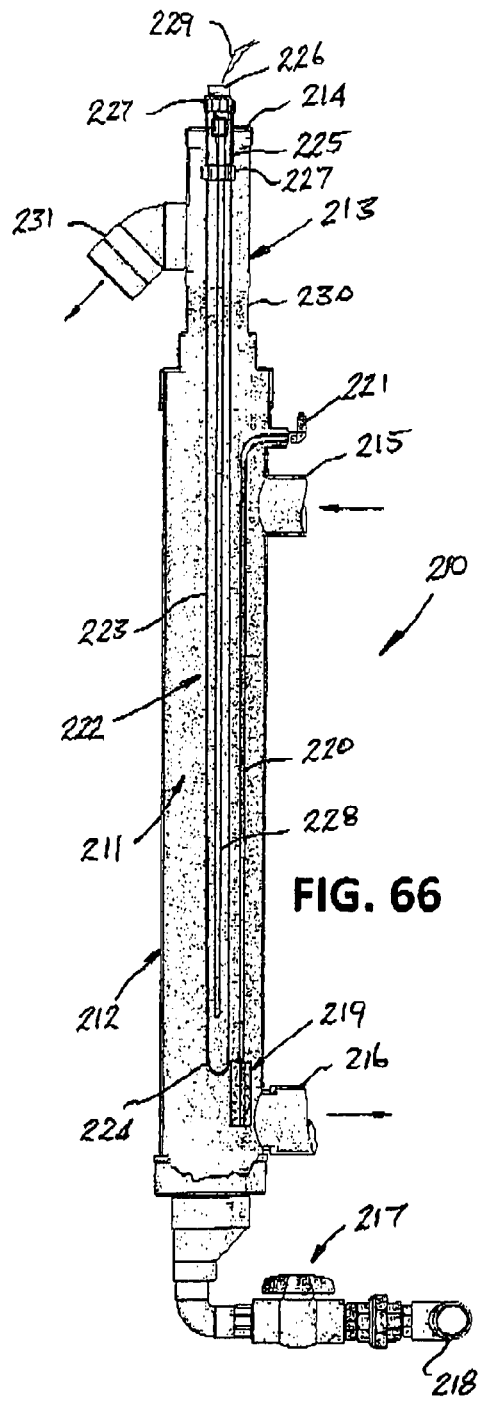
FIG. 65
FIG. 66

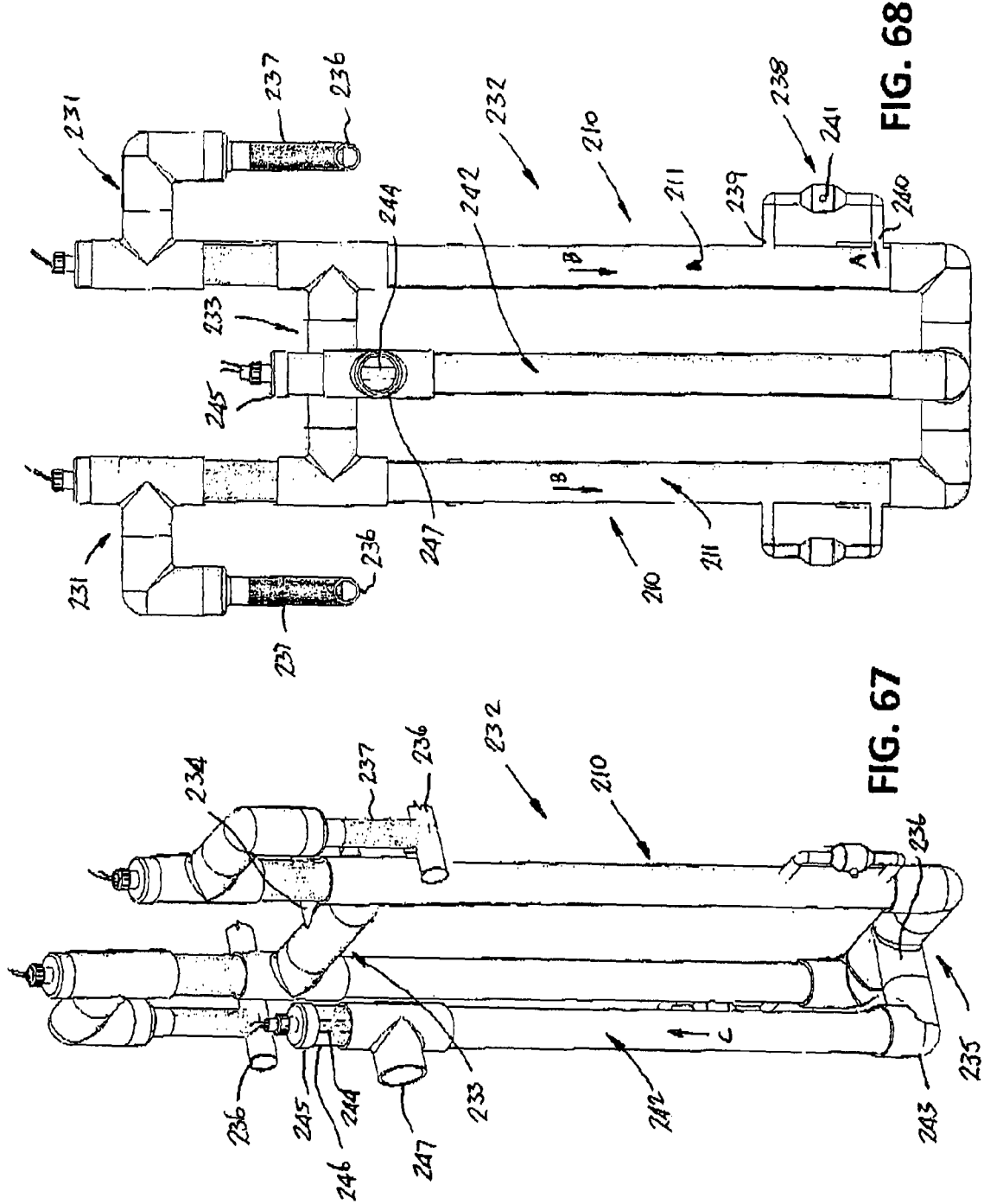

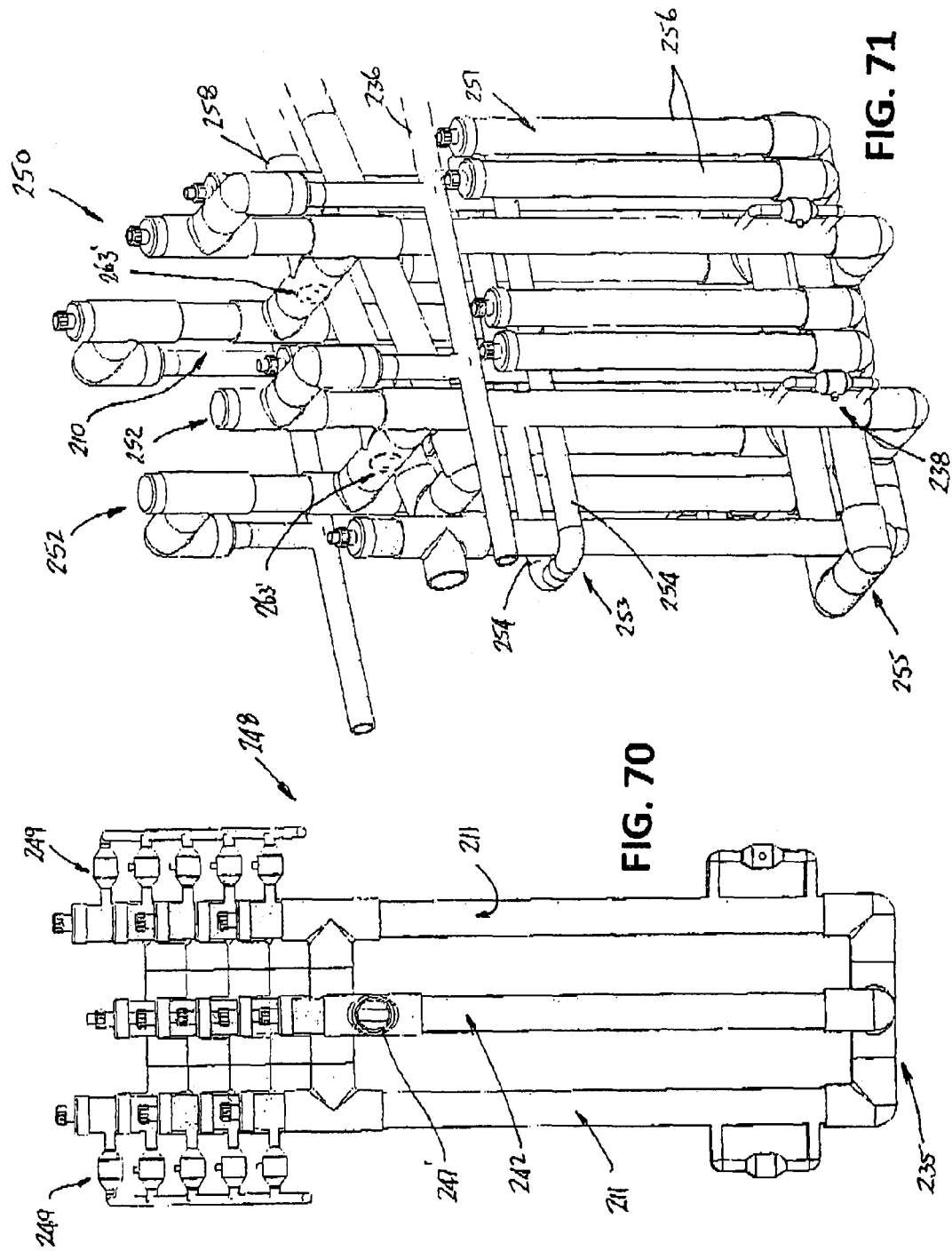

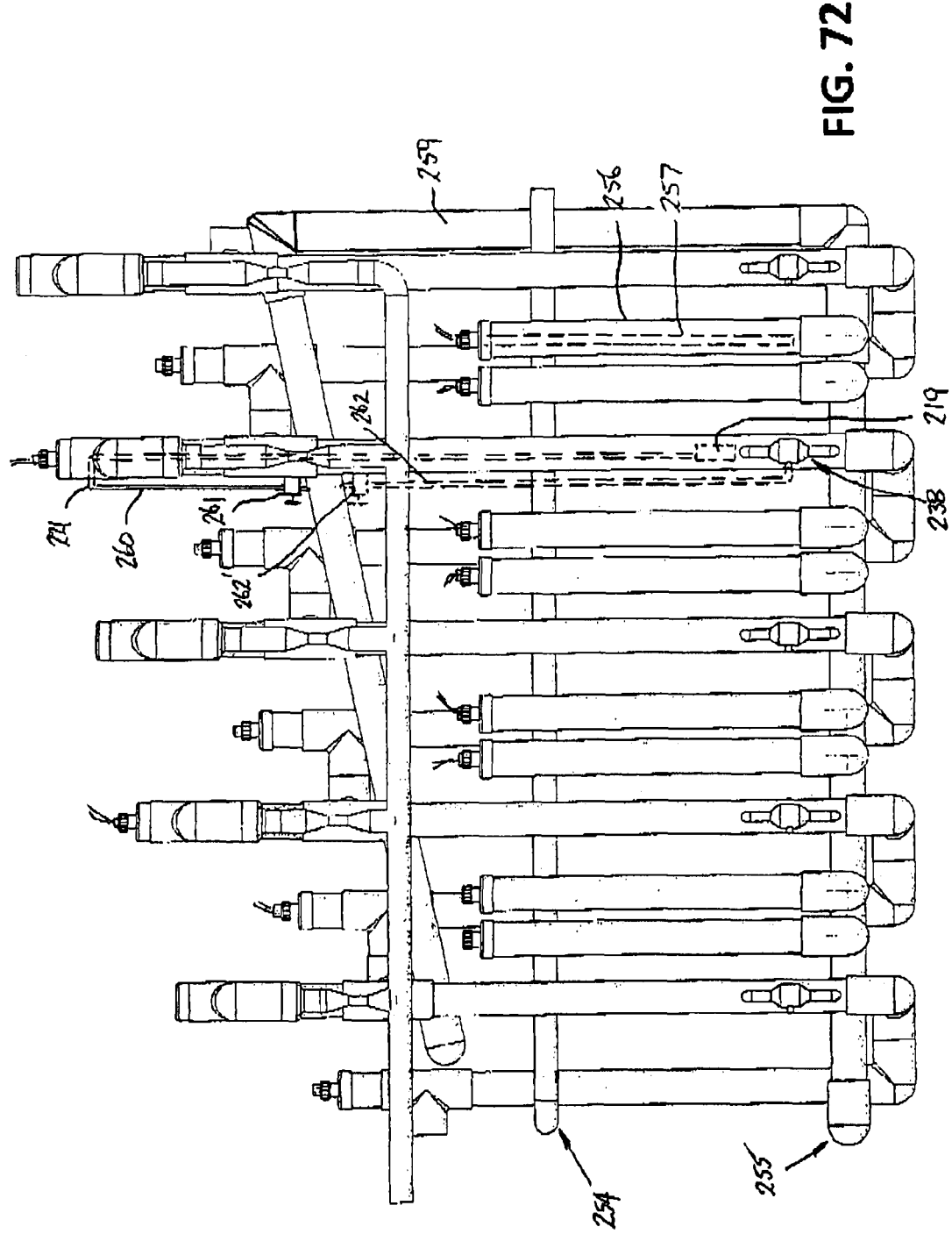

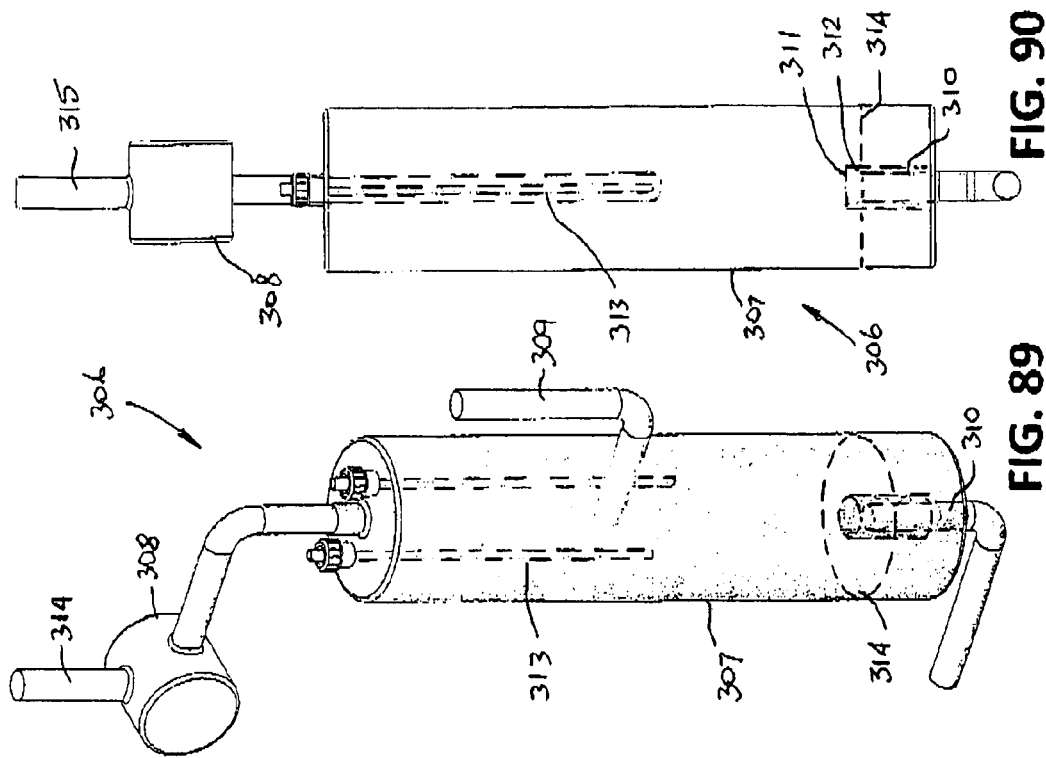
FIG. 89
FIG. 90
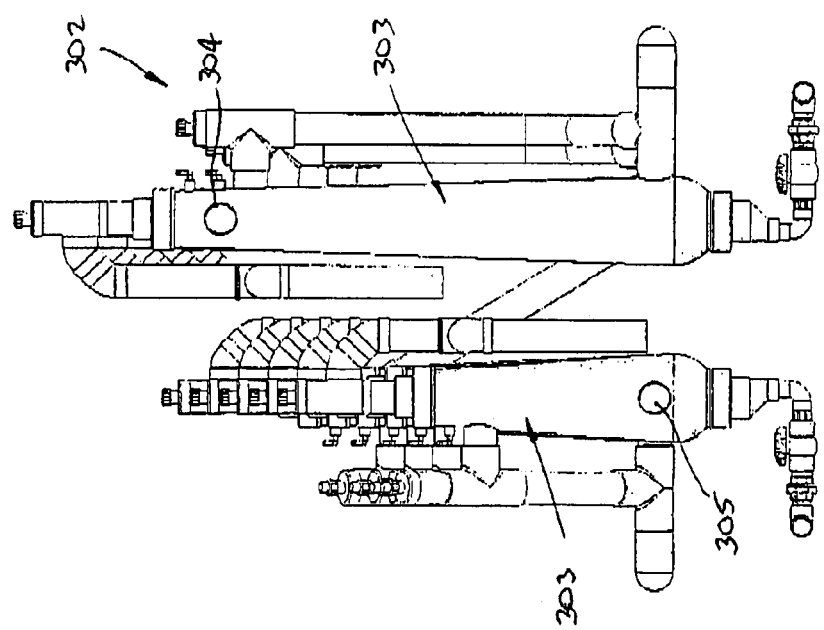
FIG. 88

FLUID TREATMENT APPARATUS

TECHNICAL FIELD

This invention relates to fluid treatment apparatus which is suited for treating liquid such as water for the purposes of purifying, cleaning or otherwise removing impurities or contaminants in the liquid. The apparatus of the present invention is particularly suited for treatment of grey water, drinking water, swimming pool water, and water from aquaculture systems, sewerage water, and other contaminated water such as water from vehicle washing apparatus which contain soap and detergent and water containing dyes and other contaminants or colourants. The present invention may also be applied to the removal of salt from salt water to provide drinking or potable water in a desalination process or treatment of other liquids such as blood and fuels. The present invention may also be applied to the treatment of gases for the purposes of purifying gases.

BACKGROUND ART

The treating of water for the purposes of purifying the liquid particularly water or removing contaminants from water has become an increasing problem for growing communities where increasing volumes of effluent or contaminated water is generated. Contaminated water can be generated in domestic, commercial and agricultural situations. Often such water receives primary treatment and is then simply left in settling ponds where solids settle out. With water shortages it is highly desirable that the contaminated water be treated so as to enable it to be reused or recycled. Other water intended for drinking and which is supplied in a reticulated system often has insufficient treatment to enable it to be safely drunk.

Automated and non-automated vehicle washing apparatus use considerable quantities of water in washing vehicles. Water which is used in the vehicle washing process can be contaminated with soap and detergent suds used in the washing process as well as grease, oil, brake pad dust, road grime and other contaminants. Furthermore, a considerable volume of water is used in the washing process which is obviously undesirable from the point of view of water conservation. It would be desirable therefore to have an effective means for re-using or re-cycling water used in vehicle washing apparatus for the purposes of conserving water. Difficulties however are encountered in reusing water from vehicle washing apparatus because of the contaminants in the water used in the washing process.

Similar difficulties to that described above have been encountered where purifying or removing of contaminants from other liquids is required and additionally in purifying or removing contaminants from gases.

SUMMARY OF THE INVENTION

The present invention provides in one preferred aspect although not necessarily the broadest aspect, fluid purification or treatment apparatus comprising at least one upright elongated primary treatment chamber, an inlet for fluid to be treated at an upper end of said chamber, an outlet from the chamber at a lower end of said chamber such that fluid flows downwardly through said chamber from said inlet to said outlet, means for introducing a sterilizing agent into a lower end of said chamber for bubbling upwardly through liquid flowing downwardly through said chamber, means at the upper end of said chamber for removing waste in said liquid conveyed by said bubbles upwardly through said chamber, and means for exposing gas treated liquid from said chamber to ultraviolet light.

The term "sterilizing agent" as used throughout the specification and claims typically comprises a gas such as ozone, ozone enriched air or hydrogen peroxide The means for introducing the sterilizing agent into the primary treatment chamber may comprise one or more gas outlets, the one or more gas outlets comprising one or more of air stones, a gas permeable pipe or pipes, a diffuser or diffusers or an external venturi or venturis communicating with the primary treatment chamber and a source of the sterilizing agent.

The means at the upper end of the chamber for removing waste may comprise an inverted U-shaped trap and/or a venturi unit.

The apparatus suitably includes a further chamber communicating with the outlet of the primary treatment chamber and a source of ultraviolet light is provided within the further chamber whereby liquid from the primary treatment chamber is exposed to ultraviolet light in the further chamber. The source of ultraviolet light suitably comprises at least one ultraviolet lamp or tube extending longitudinally of the further chamber.

The further chamber suitably includes an outlet below the inlet to the primary chamber to enable gravitational flow of fluid through said apparatus.

Preferably, the or each chamber is defined by an elongated upstanding tubular member.

In a preferred form, a series of alternative interconnected primary treatment chambers and further chambers are provided whereby fluid flowing through the apparatus is subject to multiple treatments. The further chambers are suitably connected between the outlet of a primary treatment chamber and the inlet of adjacent primary treatment chamber. The further chambers may be inclined between adjacent primary treatment chambers.

Preferably at least some of the primary treatment chambers are of a successively decreasing height from an inlet to the apparatus to an outlet from the apparatus. Preferably also at least some of the further chambers are of a successively decreasing height or length from an inlet to the apparatus to an outlet from the apparatus.

One or more of the further chambers may be provided without a source of UV light or have the source of UV light non-operative.

In another form, the primary treatment chambers and further chambers are arranged in transverse rows and wherein the inlets to the primary treatment chambers are connected to an inlet mixing manifold and wherein the outlets of the primary treatment chambers are connected to an outlet mixing manifold, the outlet mixing manifold being connected to inlets to said further chambers via transfer passages. The transfer passages may be connected to an inlet mixing manifold connected to the inlets to the further chambers. The transfer passages may connect the primary treatment chambers to upper ends of said further chambers whereby flow through said primary and further chambers is in the same direction.

The waste removing means of each primary treatment chamber may be connected to one or more common waste pipes. Further the lower ends of the chambers may be selectively connectable to one or more common drainage pipes or ducts such as by suitably manually operable or electrically or mechanically operated valves to allow drainage of the chambers.

In another preferred aspect, the present invention provides fluid treatment or purification apparatus comprising at least one fluid treatment or purification unit, said unit comprising a pair of primary treatment chambers, an inlet for fluid to be purified or treated at an upper end of each said primary treatment chamber for flow of fluid downwardly through said chambers, means for supplying a sterilizing agent to said primary treatment chambers for bubbling upwardly through fluid flowing downwardly through said primary treatment chambers for ozone fractionation of said fluid, means at the upper end of said primary chambers for removing waste in said fluid conveyed by bubbles of said sterilizing agent passing upwardly through said chambers, said primary treatment chambers being connected at their corresponding lower ends to the lower end of a further chamber for flow upwardly through said further chamber, means for directly or indirectly exposing liquid in said further chamber to ultraviolet light and a treated liquid outlet at an upper end of said further chamber. The treated liquid outlet is suitably below the inlets such that fluid flows gravitationally through the or each liquid treatment unit.

A plurality of fluid treatment units may be provided with the inlets to the primary treatment chambers being interconnected and connected to the outlet of an immediately preceding further chamber. The lower ends of the primary and further chambers are suitably in substantially the same horizontal plane such that the apparatus can be freestanding.

The means for removing waste may comprise inverted U-shaped waste trap members at the upper ends of the primary treatment chambers. The waste trap members may be connected to at least one common waste pipe or line. The at least one common waste pipe or line may extend between the primary treatment chambers.

As an alternative, the means for removing waste may comprise venturi units at the upper ends of the primary treatment chambers.

The lower ends of the primary treatment chambers and further chambers may be connectable to one or more common drainage pipes or ducts to allow drainage of the chambers.

The further chamber may comprises an inner flow tube and an outer housing surrounding the flow tube and wherein said at least one source of ultraviolet light is located within said outer housing such that fluid flowing through the tube is subject to ultraviolet light.

One or more of the primary treatment chambers may have a decreasing cross section from a lower end to an upper end of a primary treatment chamber. Thus the chambers may be in a conical or frusto-concial configuration.

In another arrangement, one or more of the primary treatment chambers may comprise a plurality of joined or interconnected chamber sections, each chamber section being of a cross section which is smaller than that of an immediately adjacent lower chamber section.

In another aspect, the present invention provides fluid purification or treatment apparatus comprising at least one advanced oxidation unit, said advanced oxidation unit comprising at least one upright elongated primary treatment chamber, an inlet for fluid to be treated at an upper end of said chamber, an outlet from the chamber at a lower end of said chamber, means for introducing a sterilizing agent into a lower end of said chamber, means at the upper end of said chamber for removing waste in said liquid conveyed by bubbles of said sterilizing agent passing upwardly through said chamber, and means in said chamber for exposing fluid therein to ultraviolet light.

The means for exposing fluid in the chamber to ultraviolet light may comprises at least one elongated ultraviolet lamp or tube extending longitudinally of the chamber. The or each chamber may be defined by an elongated upstanding tubular member. The upstanding tubular member may include an end cap and the at least one ultraviolet lamp or tube may be mounted to said end cap. Preferably the at least one ultraviolet lamp is located with a transparent tube mounted to the end cap such as not to be exposed directly to fluid flowing through the chamber.

The means for introducing a sterilizing agent into said primary treatment chamber may comprise one or more gas outlets, the one or more gas outlets comprising one or more of air stones, a gas permeable pipe or pipes, a diffuser or diffusers or an external venturi communicating with the primary treatment chamber and a source of the agent. Means may be provided for selectively controlling the flow of the sterilizing agent to the one or more gas outlets.

The means at the upper end of the chamber for removing waste suitably comprises one of an inverted U-shaped trap and/or a venturi unit or a combination thereof.

A fluid purification or treatment device in another aspect may comprise at least one pair of advanced oxidation units of the above type each having a primary treatment chambers, the inlets to the primary treatment chambers being interconnected and the primary treatment chambers being connected at their corresponding lower ends to the lower end of a further chamber for flow of fluid upwardly through the further chamber, and means for directly or indirectly exposing liquid in the further chamber to ultraviolet light and a treated liquid outlet at an upper end of the further chamber.

The fluid purification or treatment apparatus may include a plurality of interconnected fluid purification or treatment devices, the outlet of the further chamber of at least one device being connected to the interconnected inlets of the primary treatment chambers of an adjacent said device. The lower ends of the chambers may be in substantially the same horizontal plane and preferably at least some of the chambers are of decreasing height from an inlet to an outlet from the apparatus.

The one or more of said further chambers may be provided without a source of UV light or have the source of UV light non-operative. The means for introducing the sterilizing agent into one or more of the primary treatment chambers may comprise means for introducing air into said primary treatment chambers. Further one or more of the primary treatment chambers may be provided without the sterilizing agent introducing means or non-operative sterilizing agent introducing means.

In a further preferred embodiment, primary treatment chambers and further chambers are arranged in two rows or columns, each row or column including alternatively primary treatment chambers and further chambers respectively and means interconnect the primary treatment chambers in one row with adjacent further chambers in the other row.

In yet another preferred embodiment, the primary treatment chambers and further chambers are arranged in transverse rows and the inlets to the primary treatment chambers are connected to an inlet mixing manifold and the outlets of the primary treatment chambers are connected to an outlet mixing manifold, the outlet mixing manifold being connected to the inlets to the further chambers via transfer passages. The transfer passages may be connected to an inlet mixing manifold connected to the inlets to the further chambers.

In another aspect, at least one pair of primary treatment chambers is connected to a further chamber whereby fluid flowing in the primary treatment chambers flows through the further chamber.

One or more of the primary treatment chambers have a decreasing cross section from a lower end to an upper end of a primary treatment chamber. Alternatively one or more of the primary treatment chambers includes a plurality of interconnected or joined chamber sections, each chamber section being of a cross section which is smaller than that of an immediately adjacent lower chamber section.

Means may be provided for ionizing, chlorinating or applying electrical pulses to, fluid flowing through said apparatus.

Where the sterilizing agent comprises ozone or ozone enriched air, ozone production means for supplying ozone or ozone enriched air to the primary treatment chambers may be provided, the ozone production means suitably comprising one or more elongated upright chambers, one or more ultraviolet lamps in the one or more chambers and means for passing air through the chambers, ultraviolet radiation from said lamps being of a frequency to convert oxygen in said air into ozone.

Means may be provided for processing the waste from the apparatus, the processing means including a waste chamber having an inlet for receiving the waste, a vacuum or suction pump connected to the waste chamber, at least one ultraviolet light source in the chamber for destroying gas in the waste chamber and an outlet from said chamber. A fluid trap may be associated with the outlet for preventing gases passing through the outlet.

The terms "pipe" and "tube" as used throughout the specification includes any elongated hollow member defining a flow passage of any cross section.

BRIEF DESCRIPTION OF THE DRAWINGS

Reference will now be made to the accompanying drawings which illustrate various preferred embodiments of the invention. The embodiments have been described with reference to the treatment of contaminated water using ozone enriched air as the sterilizing agent however it will be appreciated that the apparatus may be used for treatment of other liquids and gases with ozone or other sterilizing agents. It is to be understood therefore that the following description of the preferred embodiments is not to be considered as limiting the scope of the invention. In the drawings:

FIG. 3 is an isometric view of liquid treatment apparatus according to a further embodiment of the invention;

FIGS. 4, 5 and 6 are top, front and side views of the apparatus of FIG. 3;

FIG. 11 is an isometric view of liquid treatment apparatus according to a third embodiment of the invention; and FIGS. 12, 13 and 14 are side, top and front views of the apparatus of FIG. 1;

FIG. 15 is an isometric view of liquid treatment apparatus according to another embodiment of the invention;

FIG. 18 is an isometric view of liquid treatment apparatus according to another embodiment of the invention;

FIGS. 19 and 20 are opposite side views of the apparatus of FIG. 18;

FIG. 21 is an isometric view of liquid treatment apparatus according to another embodiment of the invention;

FIGS. 29 and 30 are opposite end views of the apparatus of FIG. 26;

FIG. 36 is an enlarged plan view of the apparatus of FIG. 32;

FIG. 37 is an isometric view from the front of liquid treatment apparatus according to another embodiment of the invention;

FIG. 38 is a further n isometric view from the front of the apparatus of FIG. 37;

FIG. 50 is an isometric view of a liquid treatment unit of liquid treatment apparatus according to another embodiment of the invention;

FIG. 51 is a side view of the unit of FIG. 50;

FIG. 52 is a top view of the unit of FIG. 50;

FIGS. 56 to 58 illustrate in front, isometric and side views, liquid treatment apparatus according to a further embodiment of the invention

FIG. 65 is a side view of an advanced oxidation unit according to an embodiment of the invention;

FIG. 66 is a partial longitudinal sectional view of the unit of FIG. 65;

FIG. 67 is an isometric view of a liquid treatment device incorporating units of the type illustrated in FIGS. 65 and 66;

FIG. 68 is a front view of the device of FIG. 67;

FIG. 70 is a front view of the apparatus of FIG. 69;

FIG. 71 is an isometric view of part of liquid treatment apparatus similar to that of FIG. 69 but incorporating an ozone generator;

FIGS. 72 and 73 are side and front views of the apparatus of FIG. 71;

FIG. 88 is a front view of the apparatus of FIG. 86; and

FIGS. 89 and 90 are isometric and end views of waste extraction unit for use with liquid treatment apparatus of the invention.

DETAILED DESCRIPTION OF THE PREFERRED EMBODIMENTS

Figure 2:
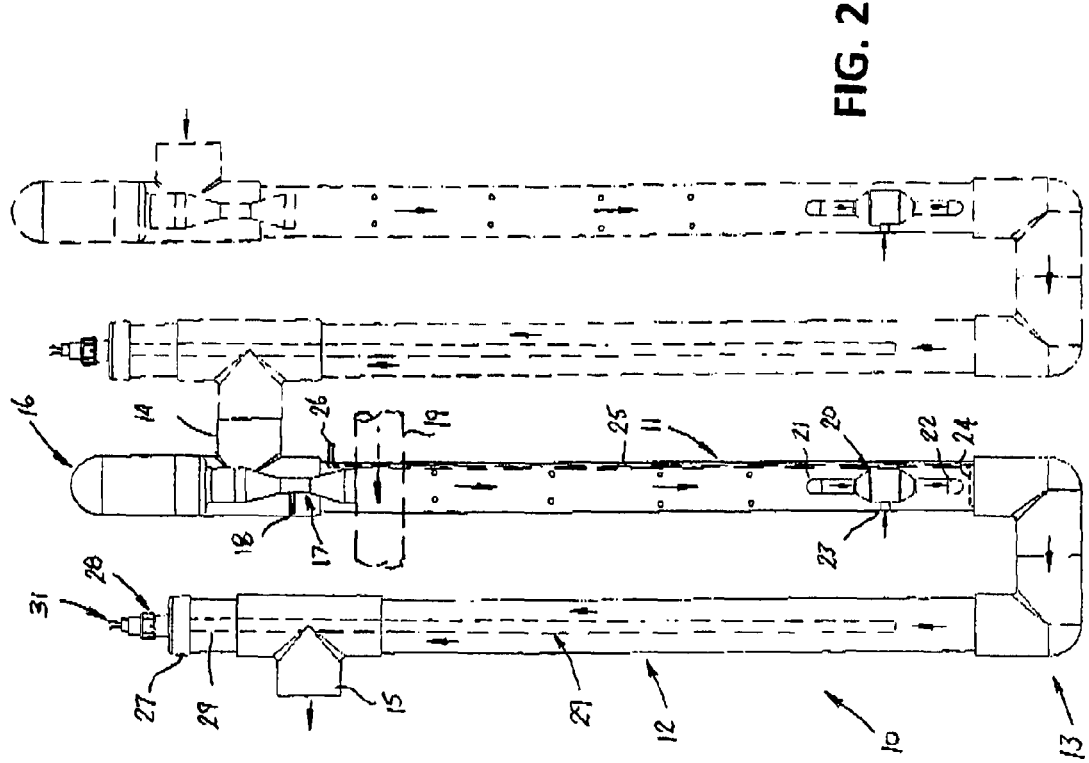
FIG. 2 is a side view of the apparatus of FIG. 2.
Figure 1:
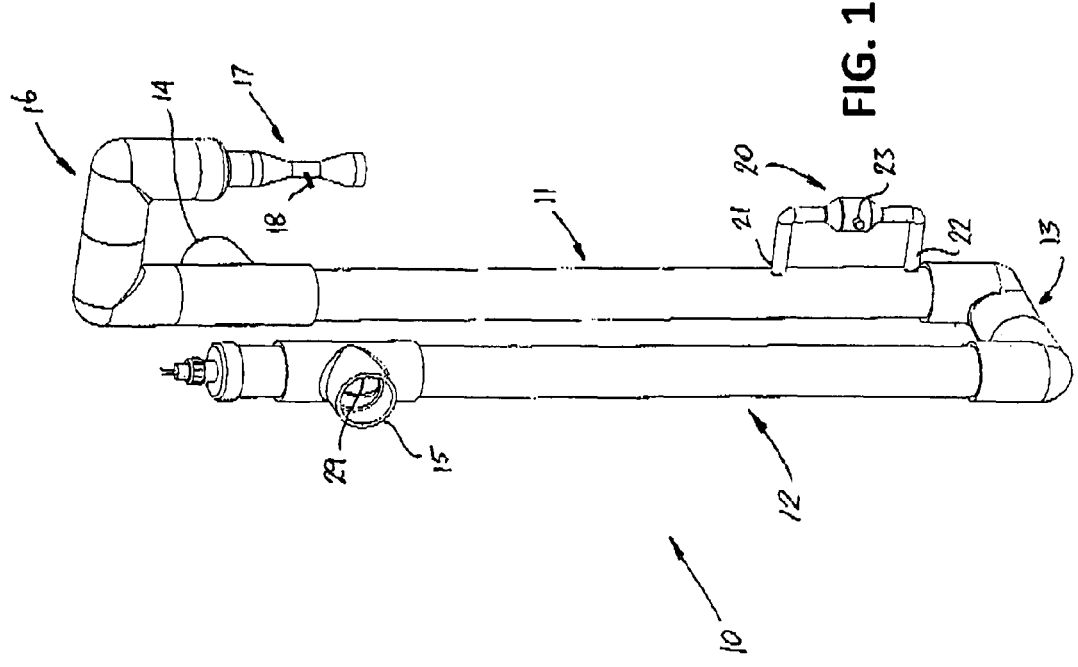
FIG. 1 is an isometric view of a basic liquid treatment unit according to an embodiment of the invention.

Referring to the drawings and firstly to FIGS. 1 and 2, there is illustrated a fluid treatment unit 10 which embodies the principles of the invention and which is used typically in apparatus for treating contaminated liquid which for example may be grey water, or water from a vehicle washing establishment or for treating any other fluid. The unit 10 includes a first upright elongated hollow member 11 and a second elongated member 12 which typically comprise pipes or tubes which are substantially parallel to each other and have their lower ends at substantially the same horizontal level and which in this case are fluidly joined to each other through a pair of elbow fittings which serve as a fluid transfer passage 13.

The first treatment member 11 of the unit 10 has an inlet 14 for liquid to be treated towards its upper end whilst the second or trailing member 12 includes an outlet 15 for treated liquid which is towards the upper end of the member 12 but below the inlet 14.

The upper end of the member 11 is connected via a U-shaped trap 16 through which waste foam generated in the member 11 can pass. The U-shaped trap 16 is connected to a venturi unit 17 which has an inlet 18 for air and/or water or other liquid. The outlet of the venturi unit 17 may be connected to a common waste pipe or line 19 (shown in dotted outline). The waste pipe or line 19 may be inclined downwardly to allow for gravitational draining of the waste pipe 19.

Provided at the lower end of the hollow member 11 is a further venturi unit 20 having a fluid inlet 21 and a fluid outlet 22 with the inlet 21 being connected to the member 11 above the outlet 22. The venturi unit 20 additionally includes a gas inlet 23 between the inlet 21 and outlet 22 for connection to a source of gas to be introduced into the member 11.

Alternatively and as shown in dotted outline in FIG. 2, a gas outlet 24 for gas may be provided in a lower portion of the member 11 and the gas outlet 24 can be supplied with gas through a duct 25 extending down the member 12 from an inlet 26 penetrating a side wall of the member 12. The outlet 24 in the embodiment illustrated may be in the form of air stones or may alternatively be nozzles which penetrate the member 12, perforated pipes, diffusers or other forms of outlets internally of, or extending into the lower end of the member 12.

The member 12 is closed at its upper end by a removable end cap 27 which carries a clamp 28 which can clamp onto an elongated ultraviolet (UV) light tube or lamp 29 which is located within and extends longitudinally of the member 12. Power is supplied to lamp 29 externally of the cap 27 through connecting cables 31.

In use liquid to be treated is supplied to the inlet 14 for flow into the leading member 11 of the unit 10 to flow downwardly through the member 11 and a gas typically ozone or ozone-enriched air is supplied to the lower end of the member 12. This may be by way of the venturi unit 20 where the gas introduced into the gas inlet 23 will cause liquid to pass from the member 11 into the inlet 21. The inwardly flowing liquid will mix with the gas introduced through the inlet 23 and pass out the outlet 22 back into the member 11 with the reintroduced liquid carrying the ozone.

Alternatively, the gas is introduced through the inlet 26 and duct 25 into the outlet 24. In each case the ozone or ozone enriched air passes upwardly as bubbles against the downwardly flowing liquid to bubble through the liquid which is therefore exposed to the sterilizing effect of ozone.

Bubbles of gas rising through the downwardly flowing liquid carry impurities and contaminants upwardly through the member and when they reach the upper level of liquid in the member 12, creates foam which carries the impurities and contaminants. The foam will pass outwardly through the U-shaped trap 16 assisted by being sucked out by the venturi units 17 and passing into the waste line 19. The member 12 thus serves as an ozone fractionator.

Liquid flow continues from the leading member 11 through the transfer passage 13 into the lower end of the member 12 for flow upwardly towards the outlet 15. This liquid which also carries dissolved ozone is exposed to UV light from the UV lamp so as to kill pathogens in the liquid as it flows upwardly from the first member 11 to the second member 12. The final treated liquid then exits through the outlet 15. Flow of liquid will continue gravitationally through the unit 10 as the outlet 15 is below the inlet 14.

Liquid treatment apparatus may comprises a series of units 10 interconnected with each other with the outlet 15 of members 11 connected to inlets 14 of respective members 11 as shown in dotted outline in FIG. 2. Further the members 11 and 12 are of successively increasing height from the outlet to the inlet with the respective inlets 14 being of successively increasing height so that gravitational flow occurs through the apparatus.

Various different embodiments of liquid treatment apparatus which incorporate the principles of treatment provided by the unit 10 will now be described.

FIGS. 3 to 6 illustrate liquid treatment apparatus 30 which includes a first treatment unit 31 comprising a series of upright elongated hollow members typically pipes or tubes 32 which are substantially parallel to each other and have their lower ends at substantially the same horizontal level and which are equivalent to the members 11 of FIGS. 1 and 2. Successive hollow members 32 from the inlet end 33 to the outlet end 34 of the unit 11 are of decreasing height.

A second treatment unit 31' which is of substantially the same configuration as the unit 31 is provided adjacent to and in parallel to the unit 31. The first treatment pipe 32' of the series of members 32 has an inlet 35 for liquid to be treated towards its upper end whilst an outlet 36 for treated liquid is connected to the lower end of the trailing member 32" of the series.

The lower end of each hollow member 32 has an outlet 37 connected to an inlet 38 adjacent the upper end of each subsequent member 32 of the series through angled connecting ducts 39 which serve as transfer passages such that liquid being treated flows downwardly through the chambers defined in each member 32 from the upper end of the member 32 towards the lower end thereof with liquid flowing upwardly through the connecting ducts 39 and in series through each member 32 in turn from the leading member 32' to the trailing member 32".

As with the embodiment of FIGS. 1 and 2, the upper end of each member 32 comprises a waste outlet for foam and is connected to a U-shaped connector 40 which serves as a trap and connects the upper end of each member 32 to a common waste pipe or line 41 positioned below the upper ends of the members 32 and extending substantially horizontally for connection to a waste outlet 42. The connector 40 has or may be connected to a transparent section 40' to allow observation of the foam collection.

The base of each member is also connected to a common waste outlet line 43 through a selectively actuable valve 44 which allows for selective draining of each member 32.

Provided at the lower end of each hollow member 12 is an outlet or outlets 45 for air or gas (see FIG. 4) which is supplied with air or gas through a duct 46 extending through a side wall of the member 32 as at 47 adjacent an upper end thereof. The outlets 45 may be in the form of nozzles or venturis which penetrate the members 32, air stones, perforated pipes or other forms of outlets internally of, and at the lower ends of the members 32.

At least some of the connecting ducts 39 are provided with ultraviolet (UV) light sources in the form of ultraviolet (UV) light tube or lamp 48 which is located within and extend longitudinally of the duct 39. The ducts 39 containing the tubes 48 thus are equivalent to the members 12 of FIG. 1. Power is supplying to the tubes 48 through the upper ends of the connecting ducts 39. In the illustrated embodiment, UV lamps 48 are provided in the trailing five connecting ducts 37. This arrangement ensures that turbidity and lack of clarity in the liquid is removed by the gas or ozone treatment before the liquid is exposed to UV light which will result in more effective UV treatment.

In use liquid to be treated is supplied to the inlet 45 for flow into the leading member 32' to flow downwardly as indicated by the arrows in FIG. 6. Ozone enriched air is supplied to the lower end of the member 32' via the outlet 45 and flows upwardly against the downwardly flowing liquid to bubble through the liquid which is therefore exposed to the sterilizing effect of ozone. Bubbles of gas reaching the upper end of the member 35 create foam which carries contaminants in the liquid. The foam will pass upwardly then downwardly through the connector or trap 40 to pass into the waste pipe 41 where it is directed to waste through the waste outlet 42. The members 32 thus serve as ozone fractionators.

Liquid flow continues from the member 32' upwardly through the connecting duct 39 to the upper end of the adjacent member 32 where it flows downwardly as in the member 32'. Again ozone enriched air supplied to the outlet 45 in the adjacent member 32 bubbles through the liquid to again create further foam at the upper end of the member 32 which passes into the connecter 40 to again be directed to waste. This treatment procedure is repeated in the respective pipes 32 as liquid flows under the influence of gravity through the apparatus 30. In the ducts 39 which contain the UV lamps 48, the liquid is exposed to UV light to kill pathogens in the liquid. In the illustrated embodiment, this occurs in the final five connecting ducts 39.

So as to kill residual ozone in the flowing liquid, air or oxygen may be introduced into the final member 32" through the outlet 45. Alternatively or additionally, the UV lamp 48 in the final transfer duct 39 may emit UV light of a wavelength to destroy ozone in the liquid.

Treated liquid then exits from the apparatus 30 through outlet 36. The treated liquid outlet 36 may be connected back to the inlet 35 for further treatment of liquid.

Many variations may be made to the operation of the apparatus 30 described above. For example the concentration of ozone introduced into each member 32 may be varied. Preferably the concentration of the ozone introduced into the first two members 32 is greater than in the remaining members 32.

Each of the connecting ducts 39 may contain ultraviolet light sources or only selected ducts 39 may include these light sources. Whilst the ultraviolet lamps 48 are shown to be located within the ducts 39, the ducts 39 alternatively may be transparent or include a transparent section and one or more ultraviolet lamps may be provided externally of the ducts 39 such that liquid flowing in the ducts 39 can still be exposed to ultraviolet light. The UV lamps 48 may be selected to either emit UV light in the low range, mid range or upper range of frequencies depending upon the requirements.

A flow adjusting valve or valves may also be provided for adjusting the flow of liquid through each member 32 or duct 39 to vary the treatment characteristics.

In the embodiment of FIG. 3, each member 32 in turn is shorter than the next such that the overall height of the apparatus 30 tapers from the inlet end 33 to the outlet end 34. Only some of the members 32 however may have this relationship.

Further in the embodiment of FIG. 3, all members 32 are in line however the members 32 may be provided in two rows as in the embodiment of apparatus 50 of FIGS. 7 to 10 where a first set 51 of members 32 of tapering height and in a line are connected by a connecting duct 52 to a adjacent set 53 of members 32, the connecting duct 52 connecting the outlet of trailing member 32 of the set 51 to the inlet of the leading member 32 of the adjacent set 53. Other similar components to the embodiment of FIGS. 3 to 6 have been given like numerals. It will be further noted in this embodiment, that all connecting ducts are provided with ultraviolet lamps 48.

The embodiment of apparatus 54 of FIGS. 11 to 14 is similar to the embodiment of FIGS. 3 to 7 and like components have been given like numerals. In this case however the apparatus 54 includes side by side units 55 each comprising seven main treatment members or chambers 32 for foam fractionation purpose with four of the six connecting ducts between the chambers 32 containing ultraviolet lamps 48.

Figure 17:
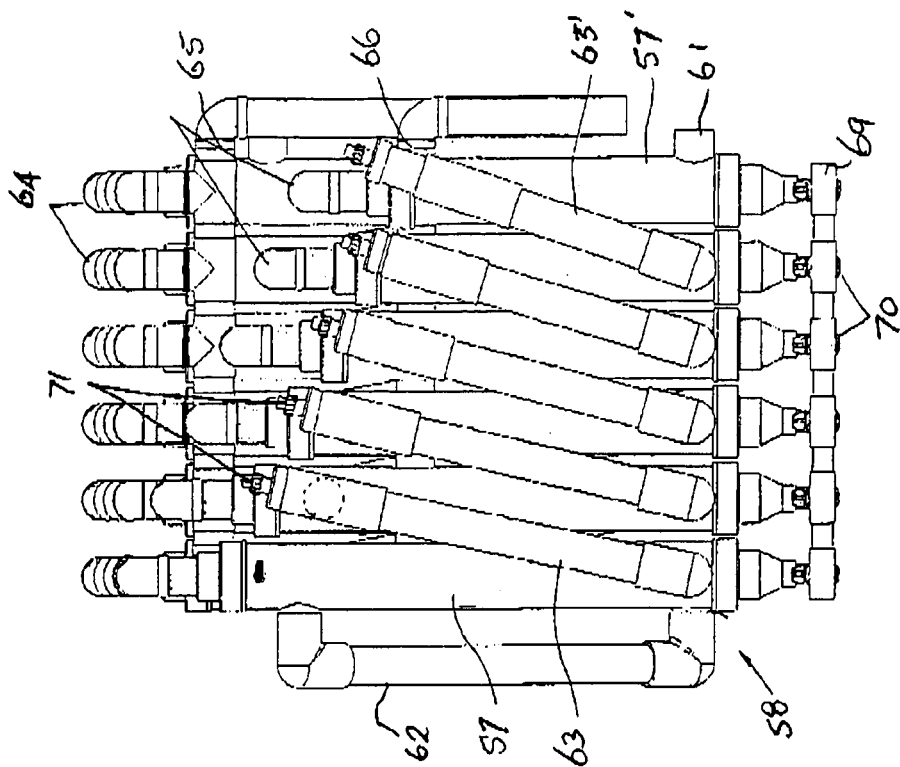
FIGS. 16 and 17 are opposite side views of the apparatus of FIG. 15.
Figure 16:
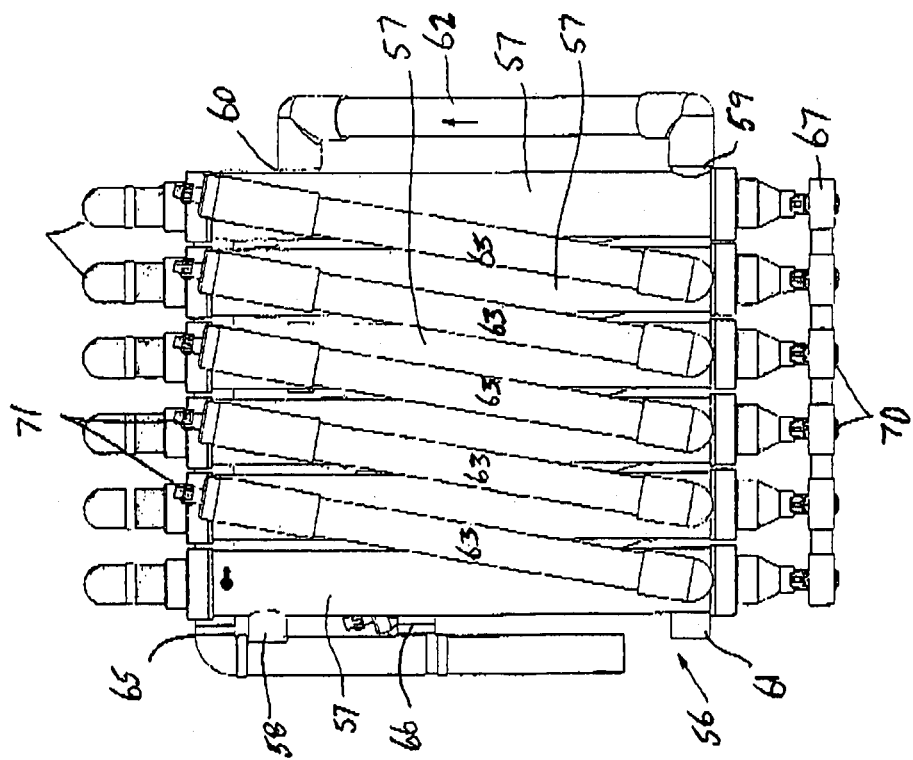

The embodiment of liquid treatment apparatus 55 of FIGS. 15 to 17 includes a first treatment unit 56 comprising series of upright elongated hollow members typically pipes or tubes 57 which are substantially parallel to each other and have their lower ends at substantially the same horizontal level and in this embodiment having their upper ends also at substantially the same horizontal level. At least some of the hollow members 57 however may be of successively decreasing height. A second treatment unit 56' which is provided adjacent to and in parallel to the unit 56 and is similar configuration to the treatment unit 56 including upright hollow members comprising pipes or tubes 57' similar to the pipes or tubes 57 however in this case the lower ends or the pipes or tubes 57' are at substantially the same horizontal level whilst successively pipes or tubes 57' have a successively decreasing height.

The first or leading treatment member 57 of the unit 56 has an inlet 58 for liquid to be treated towards its upper end whilst an outlet 59 for treated liquid is connected to the lower end of the trailing member 57' of the unit 56'. An inlet 60 to the unit 56' is provided at an upper end of the first or leading treatment member 57 of the unit 56' whilst an outlet 61 from the unit 56 is provided at a lower end of the trailing member 57' of the unit 56'. A main transfer duct 62 is connected between the outlet 59 and inlet 60 to transfer liquid from the unit 56 to the unit 56' for treatment.

As with the embodiment of FIGS. 3 to 14, angled connecting ducts 63 connect the lower end of each hollow member 57 to the upper end of each subsequent member 57 such that liquid being treated flows downwardly through the chambers defined in each member 57 from the upper end of the member 57 towards the lower end thereof with liquid flowing upwardly through the connecting ducts 63 and in series through each member 57 in turn from the leading member 57 to the trailing member 57 in the unit 56. A similar arrangement is provided in the unit 57' with angled connecting ducts 63' connecting the lower ends of the members 57' to the upper ends of adjacent members 57' such that again in the unit 56', liquid being treated flows downwardly through the chambers defined in each member 57' from the upper end of the member 57' towards the lower end thereof with liquid flowing upwardly through the connecting ducts 63' and in series through each member 57' in turn from the leading member 57' to the trailing member 57' in the unit 56'.

As with the embodiment of FIGS. 3 to 14, U-shaped waste connectors 64 serve as traps and connect the upper ends of each member 57 and 57' to common waste pipes or lines 65 and 66 whilst the bases of each member 57 and 57' are connected to waste outlet lines 67 and 69 through selectively actuable valves 70 which allows for selective draining of each member 57 and 57'.

The members 57 and 57' comprise ozone fractionators with ozone or ozone enriched air being introduced in the same manner as described in the previous embodiments for bubbling upwardly through downwardly flowing liquid in the members 57 and 59. Further at least some of the connecting ducts 63 and 63' are provided with UV tubes 71 which are located within and extend longitudinally of the ducts 63 and 63'.

Liquid to be treated enters the inlet 58 for flow into the leading member 57 of the unit 56 to flow downwardly and ozone or ozone-enriched air is supplied to the lower end of the member 57 and flows upwardly against the downwardly flowing liquid to bubble through the liquid which is therefore exposed to the sterilizing effect of ozone. Bubbles of gas reaching the upper end of the member 57 creates foam which carries contaminants in the liquid and which passes through the connector or trap 64 to pass into the waste pipe 65 where it is directed to waste.

Liquid flow continues from the leading member 57 upwardly through the connecting duct 63 to the upper end of the adjacent member 57 where it flows downwardly as in the leading member 57 for ozone oxygenation. In the ducts 63 which contain the UV lamps 71, the ozone treated liquid is exposed to UV light to kill pathogens in the liquid.

At the end of the unit 56, the main transfer duct 62 directs the treated liquid from the outlet 59 to the inlet 60 to the unit 56' to flow through the respective members 57' in a similar manner to that described above. As however the members 57' are of successively reducing height, foam in the successive trailing member 57' which usually rises to successively lower levels from the leading member can be efficiently collected.

So as to kill residual ozone in the flowing liquid, air or oxygen may be introduced into the final member 59 through an outlet at a lower end thereof. Alternatively or additionally, the UV lamp in the final transfer duct 63 may emit UV light of a wavelength to destroy ozone in the liquid.

Treated liquid then exits from the apparatus 55 through outlet 61. The treated liquid outlet 61 may be connected back to the inlet 60 for further treatment of liquid if required.

In the embodiment of FIG. 15, each member 57' in turn is shorter than the next however only some of the members 57' may have this relationship and in some embodiments all members 57' may have the same height. Similarly the members 57 may be of varying configuration and have each member 57 in turn or a decreasing height similar to the members 57'.

The embodiment of apparatus 72 of FIGS. 18 to 20 is similar to the embodiment of FIGS. 15 to 17 and like components have been given like numerals. In this case however the apparatus 72 has upright members 57 defining liquid treatment chambers which are initially of the same height however the trailing three members 57 are of decreasing height. The apparatus 72 however is in substantially the same configuration to that shown in FIGS. 15 to 17.

Figure 23:
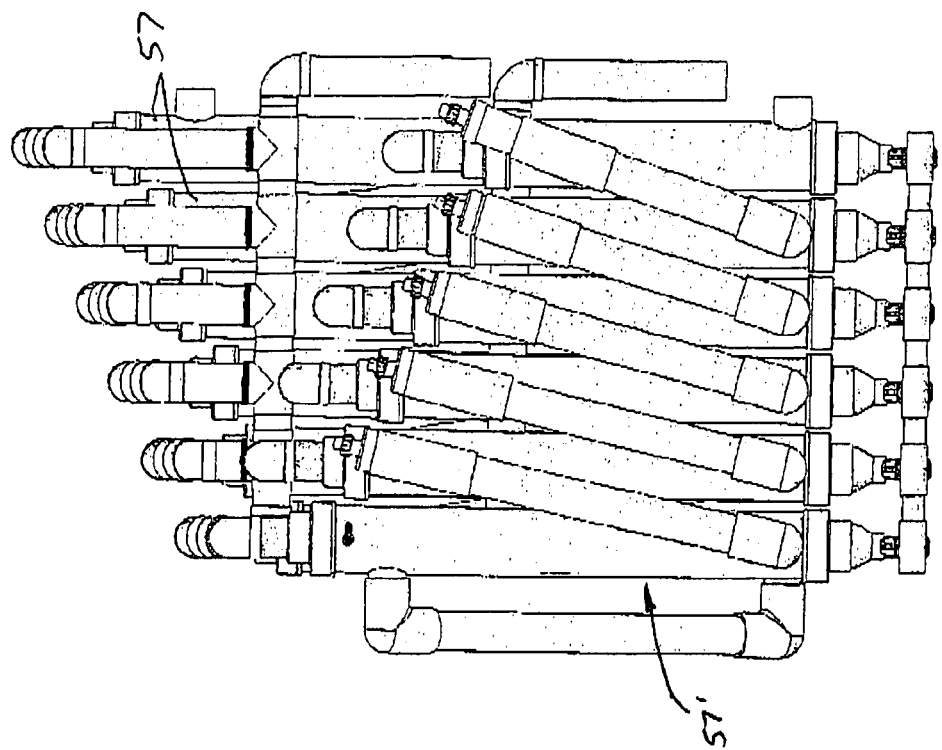
FIGS. 22 and 23 are opposite side views of the apparatus of FIG. 21.
Figure 22:
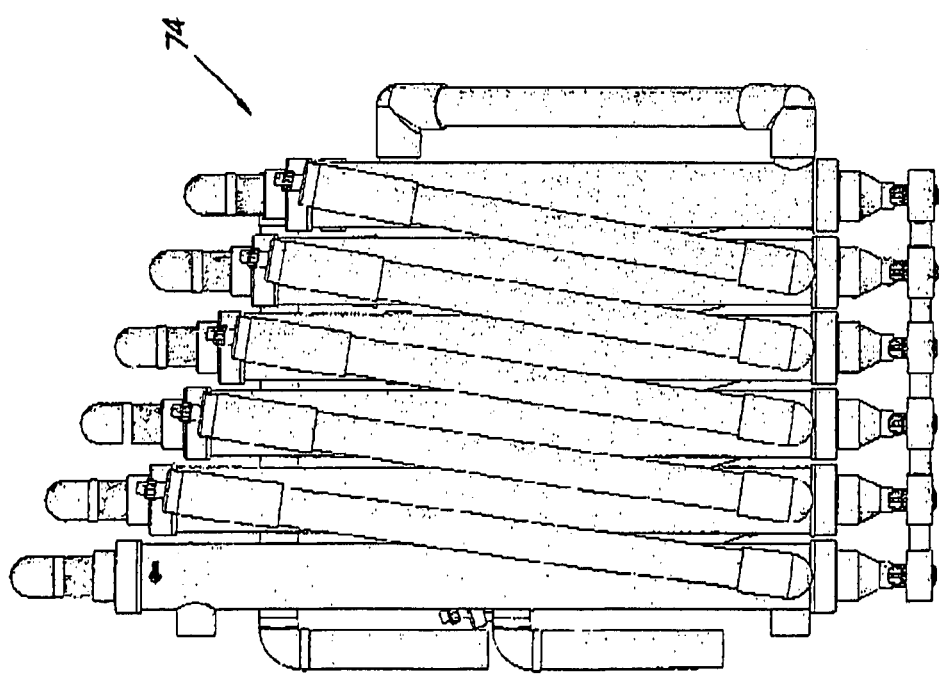

The embodiment of apparatus 74 of FIGS. 21 to 23 is again similar to the embodiment of FIGS. 15 to 17 and like components have been given like numerals. In this case however the unit 75 has respective upright members 57 defining liquid treatment chambers which are of successively decreasing height. The unit 58 however is in substantially the same configuration to that shown in FIGS. 15 to 17.

Figure 24:
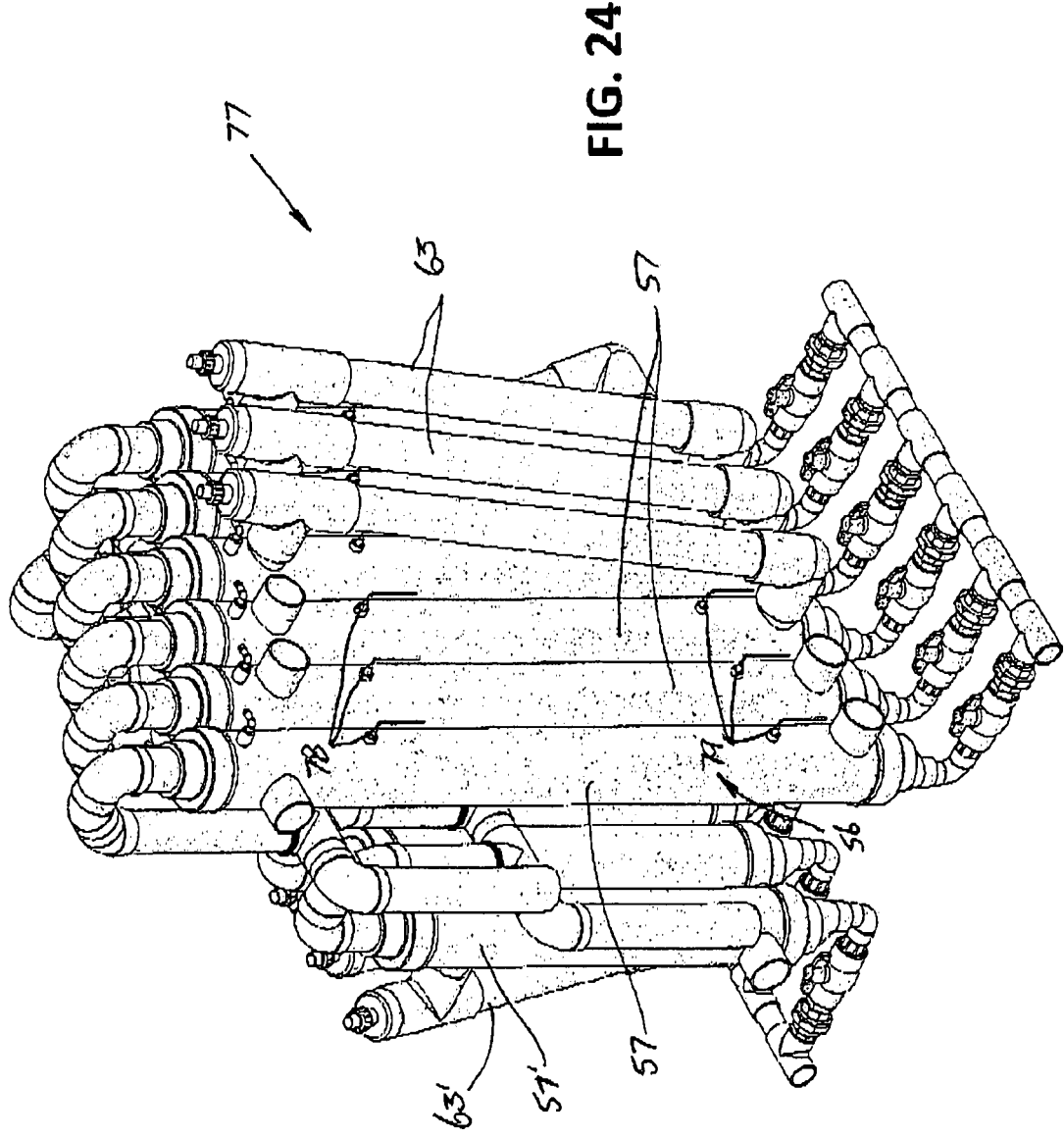
FIG. 24 is an isometric view of liquid treatment apparatus incorporating means for supplying an electrical charge to the treatment chambers.
Figure 25:
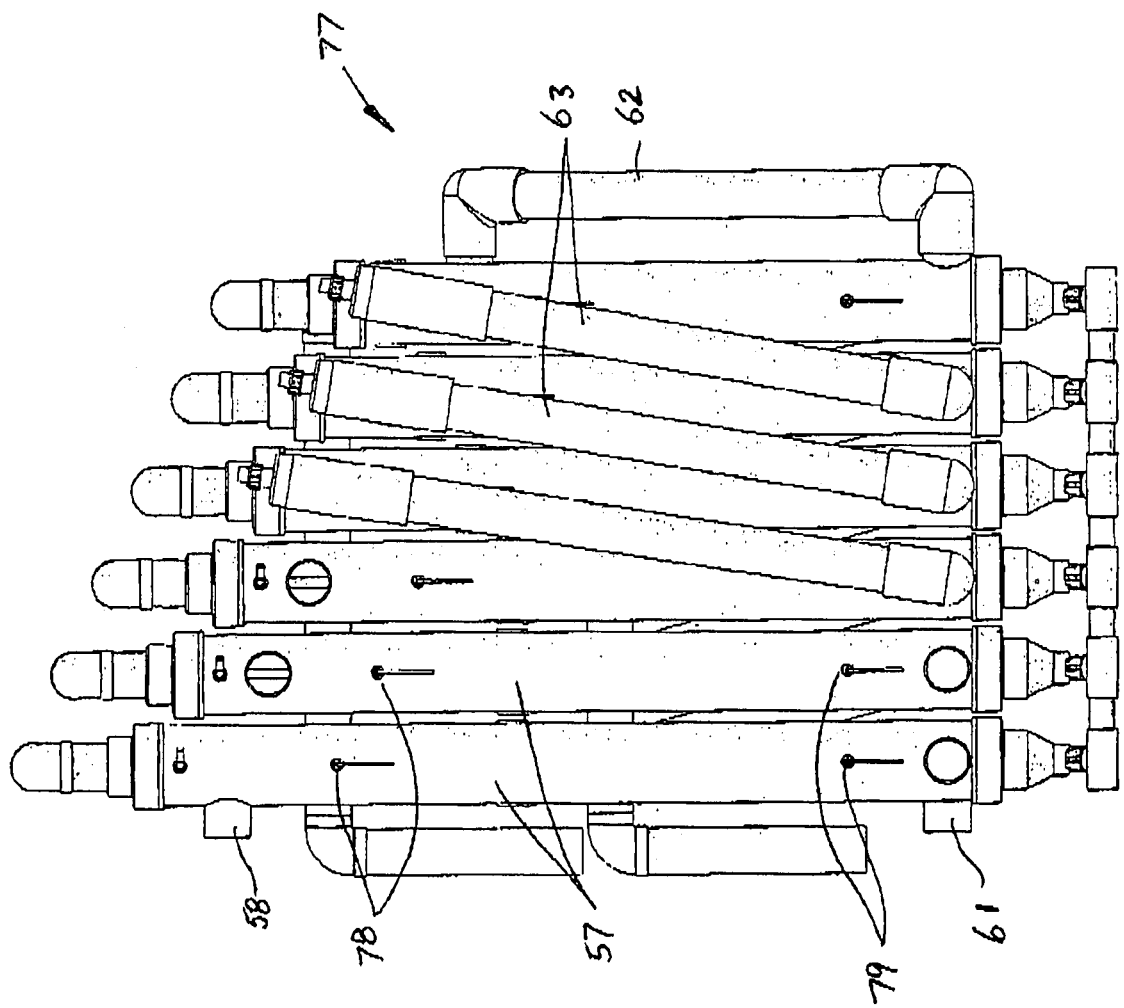
FIG. 25 is a side view of the apparatus of FIG. 24.

In order to enhance bacterial destruction by the liquid treatment apparatus referred to above, means may be provided to introduce an electrical charge into the liquid treatment chambers as in the embodiment of liquid treatment apparatus 77 illustrated in FIGS. 24 and 25 (which is shown with some UV treatment tubes absent). The liquid treatment apparatus 77 is similar to the embodiment of FIGS. 20 to 23 however the apparatus 77 may be of any configuration including the arrangements described above. Like component to the embodiment of FIGS. 20 to 23 have been given like numerals in FIGS. 24 and 25.

Electrodes 78 and 79 are provide towards the upper and lower ends of the liquid treatment chambers defined by the members 12 which enable an electrical charge to be applied to the liquid with the chambers, the electrodes 78 and 79 being connected to a suitable power source. The power source may apply a signal of any form to the electrodes to electrically charge the ozone particles or molecules to assist in destruction of bacteria within the members 57. The signal applied to the electrodes 78 and 79 may be a pulsed signal of any form and may be a fixed pulse or pulse of variable wave form at regular or variable intervals. Signals may be applied to one or both electrodes 78 and 79 and similar electrodes may be provides in the members 57'. In addition similar electrodes may be provided in the transfer pipes 63 and 63' which carry the UV treatment tubes.

Of course many alternative arrangements of treatment members or chambers 57 and 57' may be provided other than that illustrated and described and electrodes for supply of current to the members 12 and 14 may be used as required.

Figure 9:
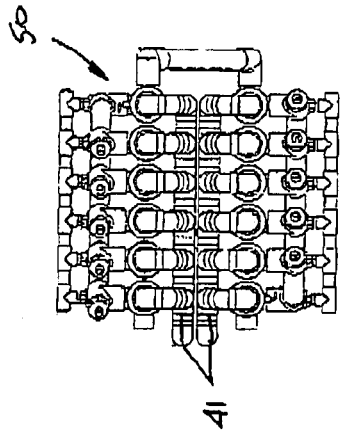
FIGS. 8, 9 and 10 are front, top and end views of the apparatus of FIG. 7.
Figure 8:
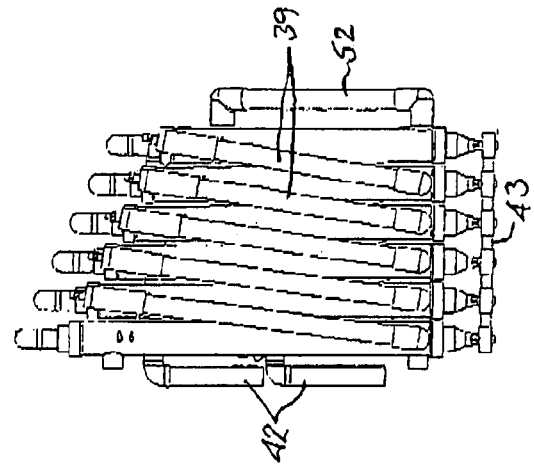
Figure 10:
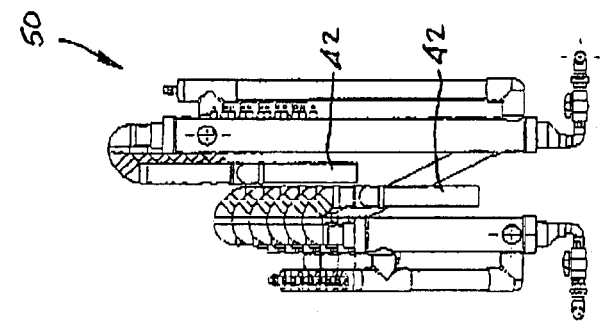
Figure 7:
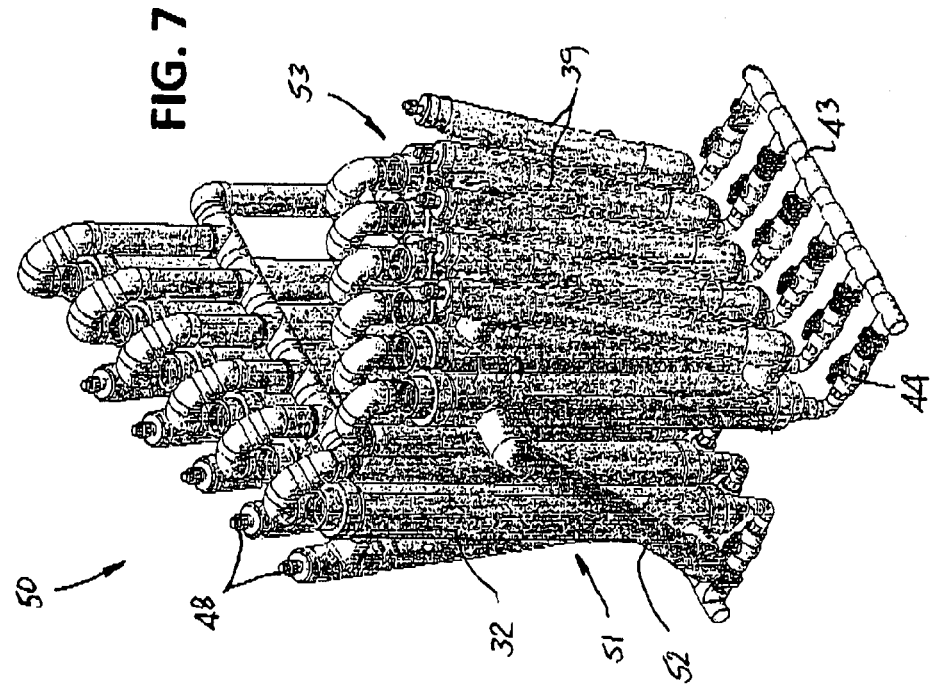
FIG. 7 is an isometric view of liquid treatment apparatus according to another embodiment of the invention.

The embodiment of apparatus 80 of FIGS. 26 to 30 is again similar to the embodiment of FIGS. 15 to 17 with upright members 81 and 82 (equivalent to the members 57 and 58) which define ozone fractionator chambers being of successively decreasing height as in FIGS. 7 to 9. Like components to the components of FIGS. 15 to 17 have been given like numerals. The upright members 81 and 82 which define the liquid treatment chambers in this case have a cross section which tapers from a lower end towards the upper end of the member 81 or 82 such that the members 81 and 82 are of a somewhat frusto-conical configuration.

As externally and internally the members 81 and 82 decrease in cross-section, bubbles of gas formed by injection of ozone or ozone enriched air (or other gas) at the lower ends of the members 81 and 82 through outlets 83 become compressed as they rise upwardly in the members 81 and 82 to enhance impurity collection.

Whilst the members 81 and 82 are of a circular cross section, they may be of other cross sections. Further the members 81 and 82 may be of varying heights. The members 81 and 82 for example may be of constant height with their upper ends at the some horizontal level and apparatus with members 81 and 82 of this configuration are particularly suitable for treatment of liquid which contains detergent. Similarly this applies to the apparatus of FIGS. 15 to 23.

In other embodiments, some only of the members 81 and 82 may be of the same height with their upper ends at the same horizontal level whilst other members 81 and 82 may be of decreasing height. Alternatively all the members 81 may be of the same height whilst the members 82 may taper in height and vice versa. The members 81 and 82 may also be of different cross sections.

Members of the configuration of the members 81 and 82 which define the ozone fractionators of a reducing cross section from the lower ends of the members 81 and 82 towards their upper ends may be applied to the any of the above described fluid treatment or liquid treatment apparatuses or the apparatuses described further below.

Figure 31:
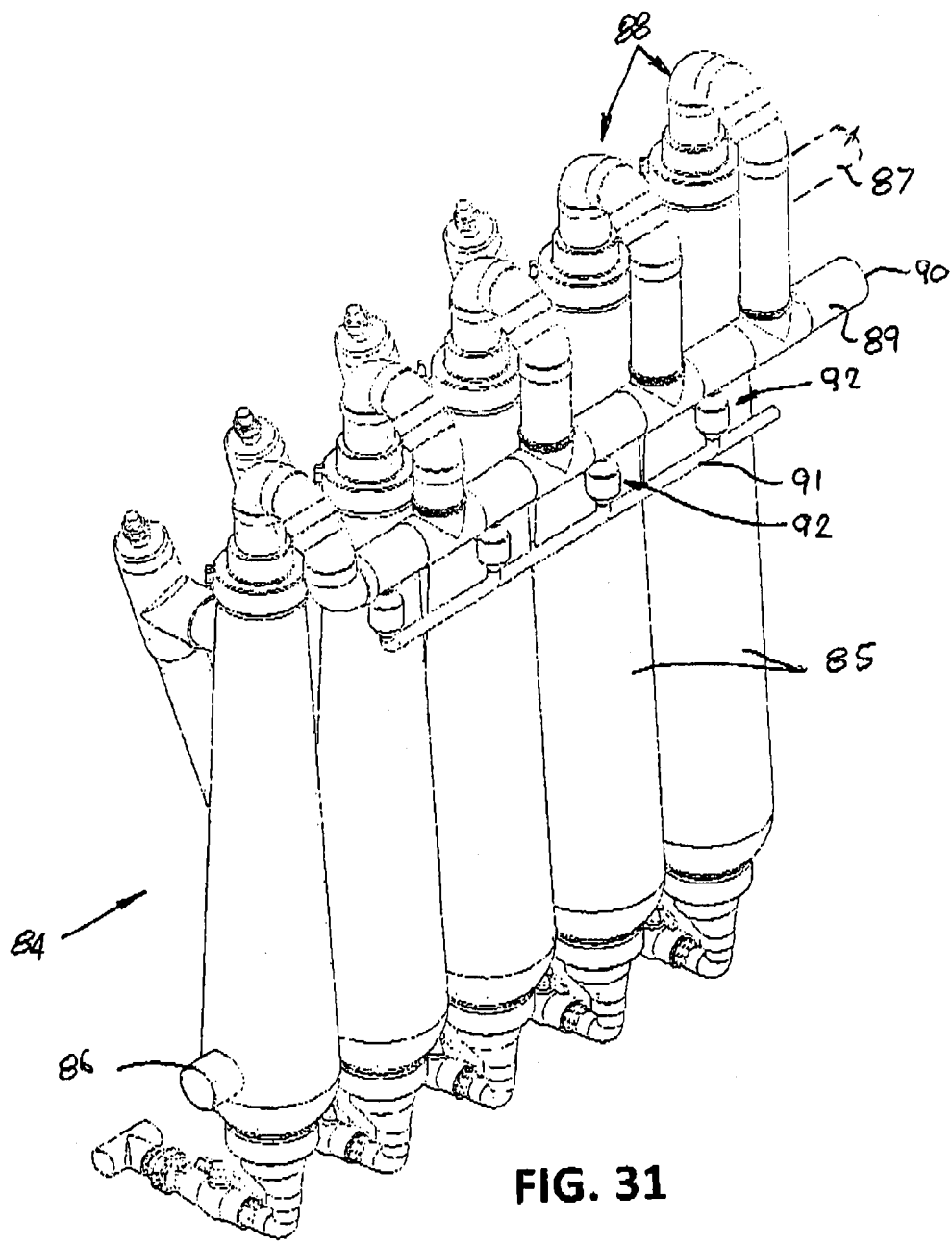
FIG. 31 is an isometric view of liquid treatment apparatus similar to the embodiment of FIGS. 26 to 30.

The embodiment of liquid treatment apparatus 84 of FIG. 31 uses the same principles of liquid treatment as described in reference to FIGS. 26 to 30 above with the ozone fractionation members 85 having internally a cross section which tapers from a maximum at lower end towards the upper end of the member 85 with the members 85 have a successively increasing height from the outlet end of the apparatus 84 in which an outlet 86 is provided at the lower end of the trailing member 85 to a maximum at the leading end of the apparatus 84 in which an inlet 87 is provided at the upper end of the leading member 85.

The upper ends of each member 85 respectively comprise waste outlets for foam and are connected via U-shaped connectors 88 to a common substantially horizontal waste duct or line 89 positioned below the upper ends of the members 85. The duct 89 is closed off at 90 at is free end by an end cap or the like. So as to convert the foam collecting in the waste duct 89 into a liquid, a further waste pipe 91 is located beneath the waste pipe 89. The waste duct 90 is connected to the waste pipe 91 through respective venturi units 92. Air or liquid such as water injected into the venturi units 92 creates a back pressure to suck in foam from the waste duct 89 and convert that foam into waste liquid for passage out through the liquid waste pipe 91.

The arrangement for waste collection and conversion as described above may be used in an of the liquid or fluid treatment apparatuses as described above or below.

The liquid treatment apparatus 93 of FIGS. 32 to 36 includes a series of upright members 94 which form ozone fractionators which are of a stepped configuration and have their lower ends at substantially the same horizontal level and in this embodiment having their upper ends of successively decreasing height.

The first or leading treatment member 94 of the apparatus 93 has an inlet 95 for liquid to be treated towards its upper end whilst an outlet 96 for treated liquid is connected to the lower end of the trailing member 94' of the apparatus 93.

Figure 33:
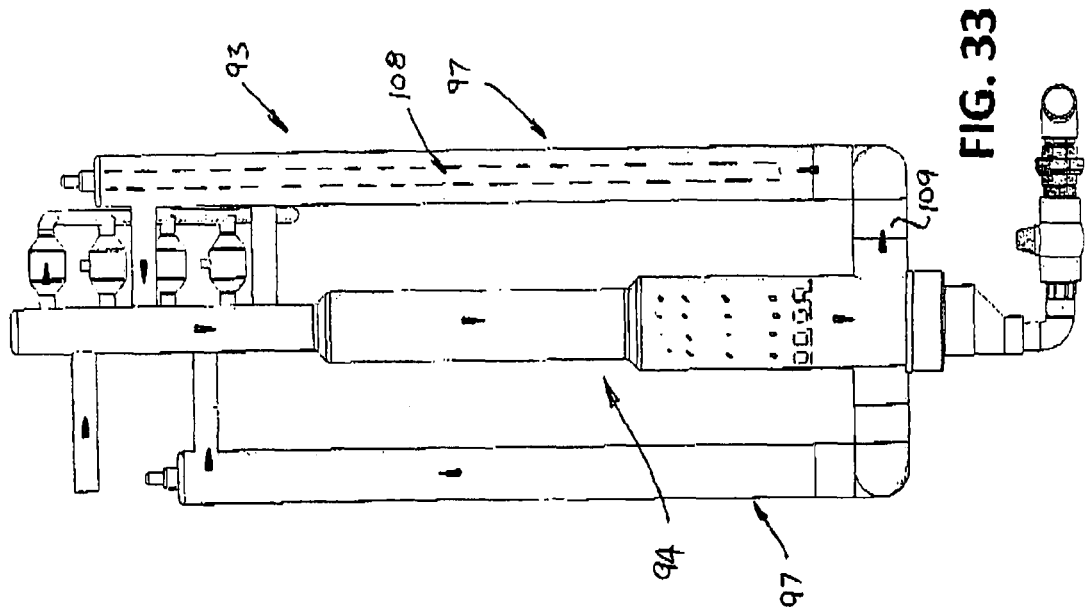
FIG. 33 is an end view of the apparatus of FIG. 32.

The lower end of each hollow member 94 is connected to an upper end of each subsequent member 94 of the series through upright connecting ducts 97 which serve as transfer passages such that liquid being treated flows downwardly through the chambers 98 defined in each member 94 from the upper end of the member 94 towards the lower end thereof with liquid flowing upwardly through the connecting ducts 97 and in series through each member 94 in turn from the leading member 94 to the trailing member 94 as indicated by the arrows in FIG. 33.

Each member 94 comprises portions of different cross section with the cross section being at a maximum at the lower end of the member 94 and a minimum at the upper end of the member 94. In the embodiment illustrated, each member 94 includes three portions 98, 99 and 100 each of a different cross section but of a constant cross section throughout their length. Thus the portion 98 has a greater cross section (or diameter) than the portion 99 and the portion 99 has a greater cross section (or diameter) than the portion 100. The junctions between the respective portions 98 and 99 and 99 and 100 define shoulders or inward steps 101 and 102 in the cross section of the member 94. The shoulders or inward steps 101 and 102 are angled or inclined upwardly at 45 degrees to the horizontal however they may be of any angle to the horizontal or longitudinal axis of the member 94.

The upper end 103 of each upper portion 100 of each member 94 is closed and has a waste outlet 104 adjacent its closed end for foam which is connected to a venturi unit 105, each of which has an inlet 106 for air and/or water or other liquid. The outlet of each venturi unit 105 is connected to one or more downwardly inclined common waste pipes or lines 107. Waste foam may alternatively be removed through U-shaped traps as in FIG. 31.

At least some of the connecting ducts 97 are provided with ultraviolet (UV) light tubes or lamps 108 which are located within and extend longitudinally of the ducts 97.

The closed upper ends 103 of the members 94 may be transparent to enable inspection of the members 94 from above or may comprise inspection caps which may be removable for example by being in threaded engagement with the portion 100 of the member 94. Inspection ports 108 shown in dotted outline in FIG. 32 may also be provided in the shoulders or steps 101 and/or 102. As shown the outlets from the members 94 may be connected to the ducts 97 through feeder pipes 109 such that the ducts 97 are substantially upright or vertical and aligned with an adjacent member 94.

As in the previous embodiments, liquid to be treated flows downwardly through the members 94 to be exposed to bubbles of ozone or ozone-enriched air supplied to the lower end of the member 94. As the members 94 have the inwardly stepped portions 98, 99 and 100, the bubbles of gas are compressed as they rise through the members 94 because of the decreasing cross section of the members 94 increasing the efficiency of treatment of the liquid flowing down through the member 94.

Bubbles of gas reaching the upper ends of the members 94 creates foam which carries contaminants in the liquid which will be sucked out by the venturi units 105 via the outlets 104 and will be converted into liquid which passes into the waste line 22.

Flow continues through the apparatus 93 as indicated by the arrows in FIG. 33 to be successively treated with ozone and UV light. As the members 94 are of successively reducing height, foam in the successive trailing members 94 which usually rises to successively lower levels from the leading member can be efficiently collected or sucked through the outlets 104 by the suction pressure created in the venturi units 105 to be directed to the waste line 107 as liquid. The suction pressure may be created by introduction of air into the venturi units 105 through the inlets 106 or alternatively by the introduction of liquid such as water.

Each of the connecting or transfer ducts 97 may contain ultraviolet light sources or lamps or only selected ducts 97 may include these light sources. In the embodiment illustrated the transfer ducts 97 are located respectively on opposite sides of the members 94 and the members 94 are arranged in line with each other. The members 94 however may be offset from each other.

Figure 32:
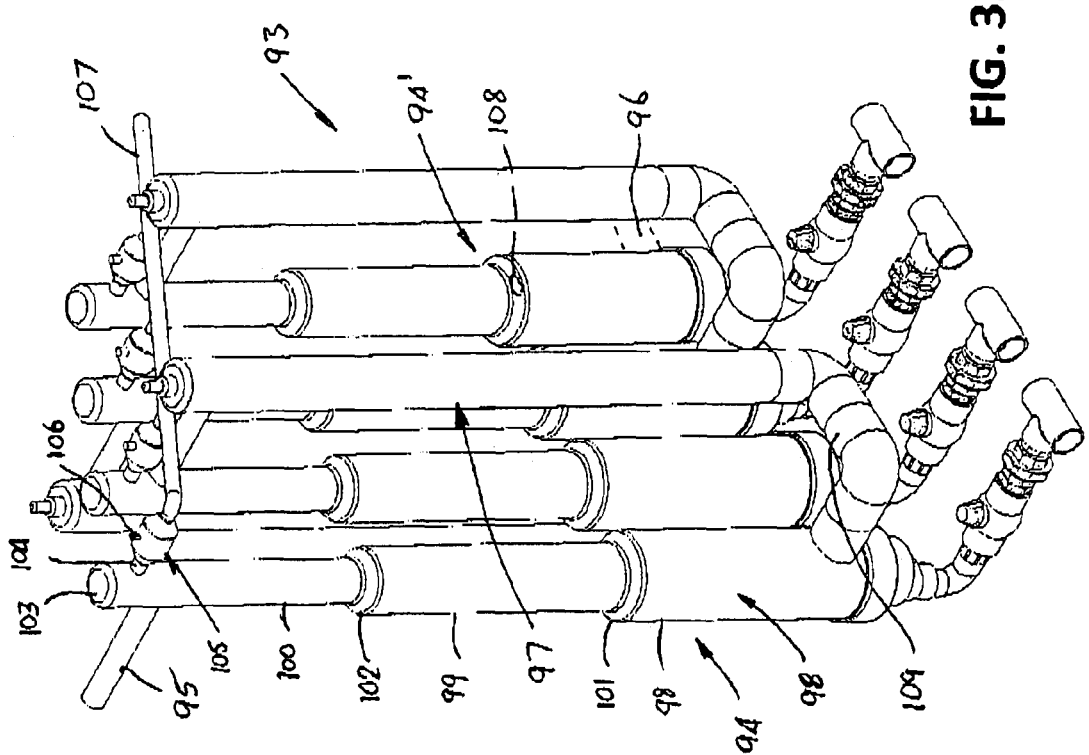
FIG. 32 is an isometric view of liquid treatment apparatus according to a further embodiment of the invention.
Figure 35:
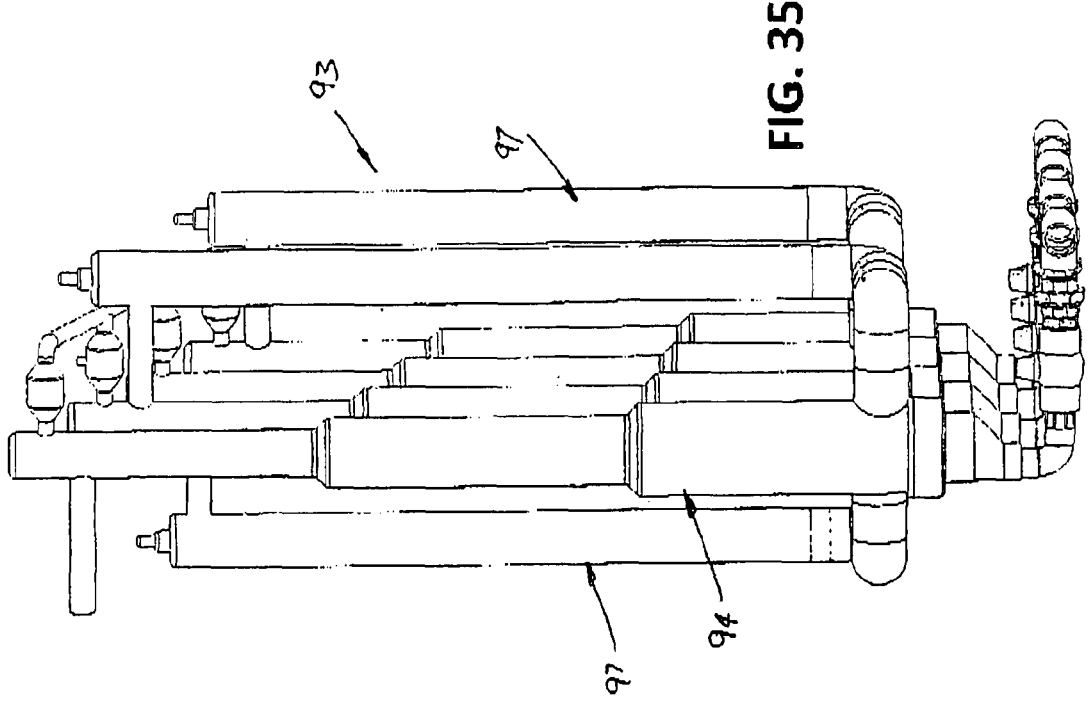
FIG. 35 is an isometric end view of the apparatus of FIG. 32.

In the embodiment of FIG. 32, each member 94 in turn is shorter than the next however only some of the members 94 may have this relationship and in some embodiments all members 94 may have the same height.

Whilst venturi units are preferably provided to such foam from the waste pipes for conversion of foam into liquid, vacuum or similar pumps may be used for this purpose.

Ozone or ozone enriched air may be introduced into the members 94 y any suitable arrangement such as by venturi units 110 as described previously or any other gas inlet.

Figure 41:
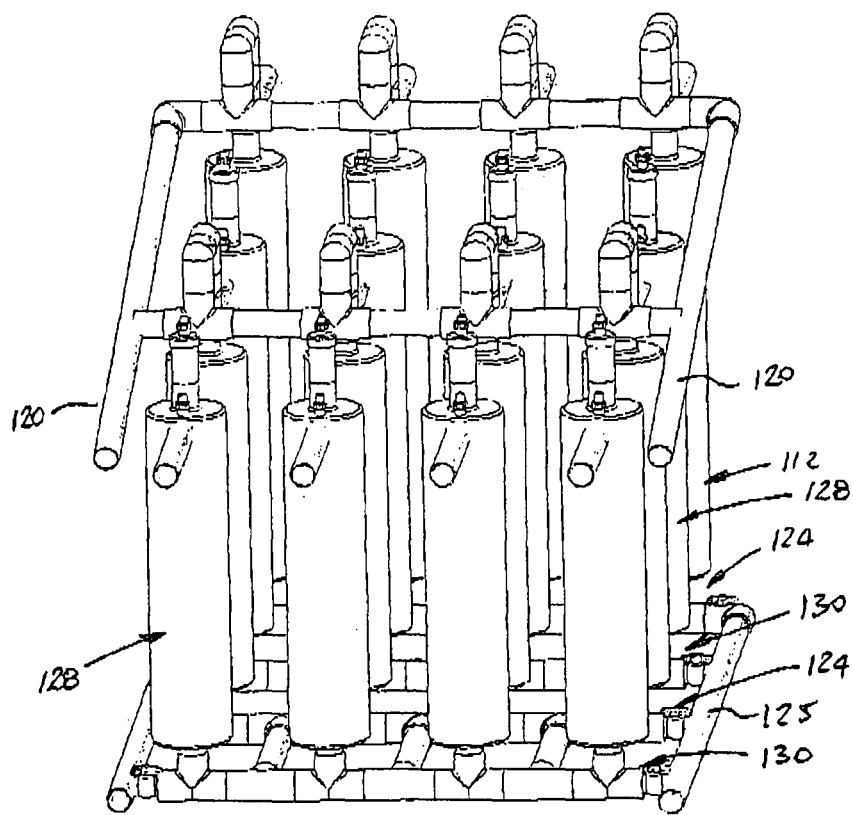
FIG. 41 is an isometric view from the treated liquid outlet end of the apparatus of FIG. 37.
Figure 42:
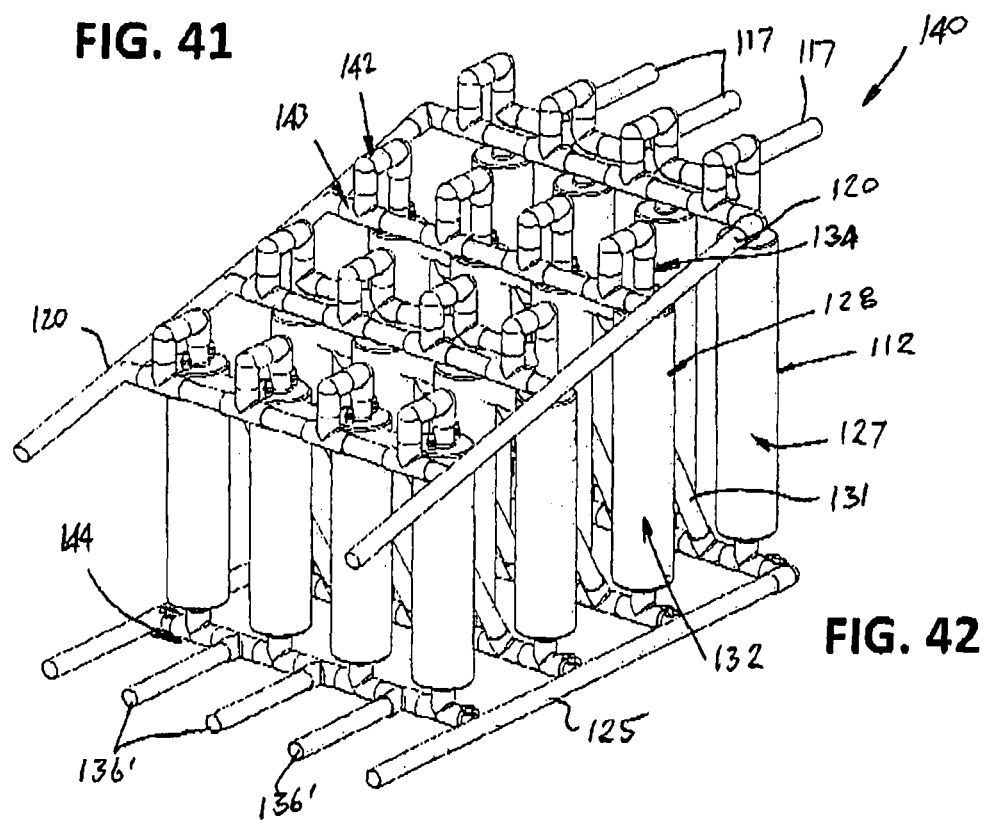
FIG. 42 is an isometric view from the front of liquid treatment apparatus according to a further embodiment of the invention.
Figure 43:
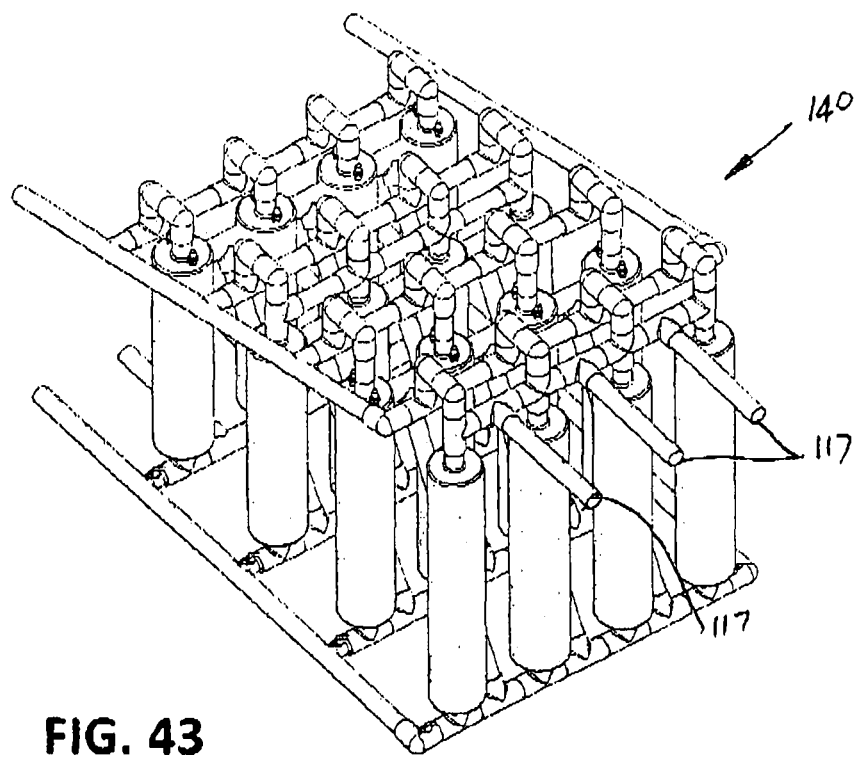
FIG. 43 is an isometric view from the rear of the liquid treatment apparatus of FIG. 42.

A further liquid treatment apparatus 111 according to a further embodiment of the invention is shown in FIGS. 37 to 41, the apparatus 111 having a first set of upright elongated hollow members 112 arranged in a transverse row, the members typically being plastic pipes or tubes which are substantially parallel to each other and have their upper and lower ends at substantially the same horizontal level. Each member 112 has an upstanding inlet 113 at its upper end and the respective inlets 113 of the members are connected to a transversely extending common inlet manifold 114 comprising a series of T-shaped connectors 115 and short pipe joiners 116. Substantially horizontal inlet ducts 117 comprising inlets for liquid to be treated extend from each inlet 113. Alternatively, the inlet ducts 116 may be connected directly to the respective inlets 113 and the manifold 114 not used as shown in FIG. 41.

The T-shaped connectors 115 are connected through U-shaped waste traps 118 comprising end to end elbow connectors to a common transversely extending waste manifold 119 which is similar in configuration to the inlet manifold 116. The height of the waste traps 118 may be varied to vary waste collection. Opposite ends of the waste manifold 119 are connected to forwardly and downwardly inclined waste pipes 120 on opposite sides of the apparatus 111. The U-shaped waste traps 118 may be connected directly to the waste manifold 119 as shown in FIG. 37 or by means of venturi units 121 as shown in FIG. 38 to convert waste foam into liquid and assist in drawing waste foam out of the apparatus. The venturi units 121 have inlets 122 for air or gas to drive the venturi units 121. Similar venturi units 121 may also be provided in the waste pipes 120 as shown in FIG. 38 to assist in removing waste liquid from the apparatus 111.

The members 112 have outlets 123 at their lower ends which are connected to a transversely extending mixing manifold 124 which is of similar configuration to the manifolds 114 and 119. Opposite ends of the mixing manifold 124 are connected to opposite drain pipes 125 on opposite sides of the apparatus 111 via selectively operable valves 126, typically hand operated gate or ball valves.

The hollow members 112 comprise ozone treatment chambers 127 and include means at their lower ends such as internal air stones or external venturi units for introduction of ozone or ozone enriched air as above.

The apparatus 110 further comprises a second set of upright elongated hollow members 128 arranged in a transverse row forwardly of the members 112, the members 128 again typically being plastic pipes or tubes which are substantially parallel to each other and have their upper and lower ends at substantially the same horizontal level and the lower ends at substantially the same level as the members 112. The members 128 however are shorter in height than the members 112.

Each member 128 has an inlet 129 at its lower end and the respective inlets 129 of the members 128 are connected to a transversely extending common inlet mixing manifold 130 which is of similar configuration to the manifold 124. The manifolds 124 and 130 are connected through a series of connecting ducts 131. Opposite ends of the manifold 130 are connected via further selectively operable valves 126 to the drain pipes 125. As the connecting ducts 131 are arranged between the respective members 112 and 128, there is one less connecting duct 131 than inlet ducts 117. In the embodiment illustrate, there are four inlet ducts 117 and three connecting ducts 131. This ensures continuously mixing of fluid as it passes through the apparatus 111 as described further below.

The members 128 comprise UV treatment chambers 132 and extending into the chambers 132 are ultraviolet (UV) light sources in the form of an ultraviolet (UV) light tubes or lamps 133 which are located within and extend longitudinally of the chambers 132. The tubes or lamps 133 comprise a central lamp and a pair of further lamps arranged symmetrically on opposite sides of the central lamp 133. The member 128 is provided with a central upwardly extending housing 134 closed by a removable end cap 135. The upper end of the central lamp 133 extends into the housing 134 and through the end cap 135 and is sealed thereto by clamp seals 135'. The other lamps 133 are similarly sealed.

The members 128 are also provided adjacent their upper ends with outwardly projecting outlet ducts 136 for treated liquid, the outlet ducts 136 being thus positioned lower than the inlet ducts 117.

In use liquid to be treated is supplied to the inlet ducts 117 for flow into the respective ozone treatment chambers or fractionators 112 to flow downwardly in the direction A. Where the manifold 14 is installed, liquid flowing into the respective inlets 117 may mix with further inlet liquid before flowing into the chambers 127 in which the downwardly flowing liquid being exposed to the sterilizing scrubbing effect of ozone on the liquid. This results in disinfection and fractionating of the liquid with contaminant particles including scum and dirt being carried upwardly through the chambers 127. Bacteria and viruses in the liquid will also be removed.

Foam waste carrying contaminants in the liquid passes upwardly through the U-shaped traps 118 into the waste manifold 119 to pass to the drain pipes 120 to be directed to waste.

Liquid reaching the lower ends of the chambers 127 flows via the outlets 123 into the mixing manifolds 124 in which it will mix with fluid passing through the outlets 123 of the other chambers 127. The mixed fluid then passes through the connecting ducts 131 into the further mixing manifold 130 and UV treatment chambers 132 where it flows upwardly as indicated by the arrows B where it is exposed to high doses of UV light from the three UV lamps 133 to kill pathogens in the liquid. Because there are fewer connecting ducts 131 than chambers 127 and 132, there will be continuous mixing of the liquid as it flows from the inlet ducts 117 to the chambers 132. At the upper end of the chambers 138, the treated liquid exits through the outlet ducts 136. Further as the outlet 136 are below the inlets 117, liquid will flow gravitationally through the apparatus 110.

The apparatus may comprise a plurality of gas treatment chambers 127 and UV treatment chambers 132 arranged in the same configuration as described above. Respective members 112 and 128 and chambers 127 and 132 are of successively decreasing height such that the liquid being treated flows gravitationally from the inlets 117 to the final outlets 136'.

For cleaning the apparatus 111, the valves 25 may be opened to drain fluid from the chambers 127 and 130.

It will be noted in FIGS. 38 and 41 that the drain pipes 125, connecting lower ducts 131 and manifolds 124 and 130 are all substantially in the same horizontal plane so that the apparatus 111 sits stably on a support surface.

Liquid treatment apparatus 1 of the type described above may have any number of gas treatment chambers and UV treatment chambers.

The embodiment of liquid treatment apparatus 140 of FIGS. 42 to 49 is similar to the embodiment of FIGS. 37 to 41 and thus like components to the components of the apparatus 111 have been given like numerals. In this embodiment however, the inlets 117 are reduced in number and connected to the inlet manifold 114 such that liquid to be treated is initially mixed prior to entry into the gas treatment chambers 112. Furthermore, liquid is caused to flow through the UV treatment chambers 132 in the same direction as the flow through gas treatment chambers 127. For this purpose, the connecting ducts 131' are angled upwardly for connection to the upper ends of the chambers 132 via transverse ducts 141 which interconnect adjacent members 128 adjacent their upper ends. Further, the UV treatment chambers 132 do not include the central UV lamps 133. Instead the extended housings 134 with the lamps 133 absent serve as foam waste ducts which are connected via U-shaped traps 142 to a further waste manifold 143 which is connected at its opposite ends to the waste ducts 120.

Figure 44:
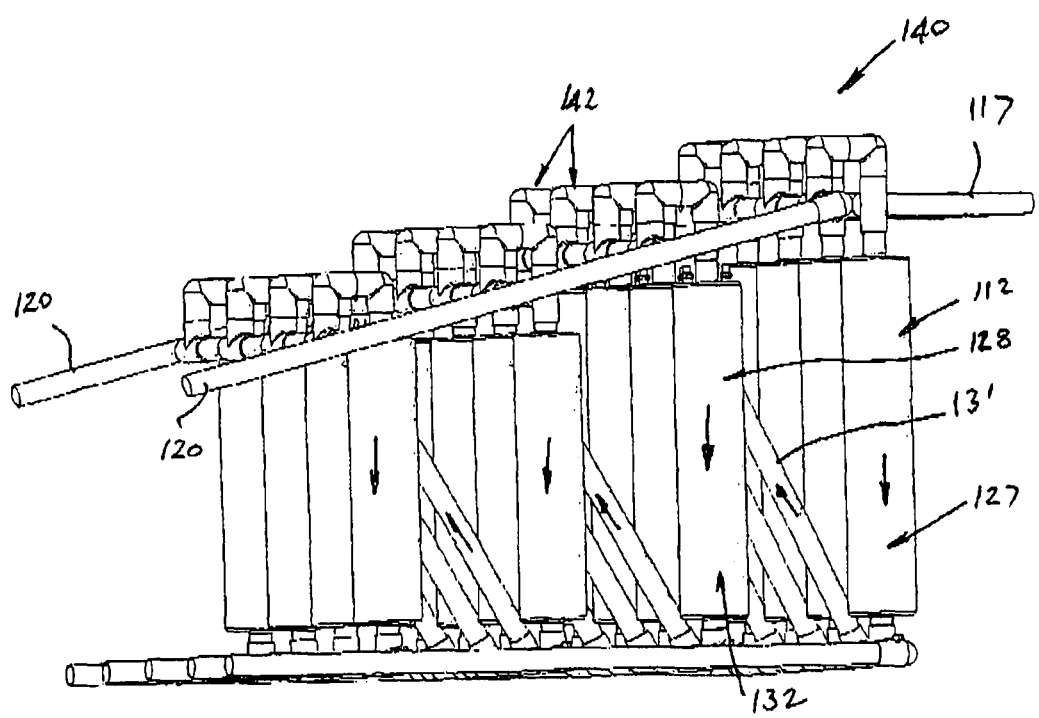
FIG. 44 is ac view from the side of the liquid treatment apparatus of FIG. 43.
Figure 45:
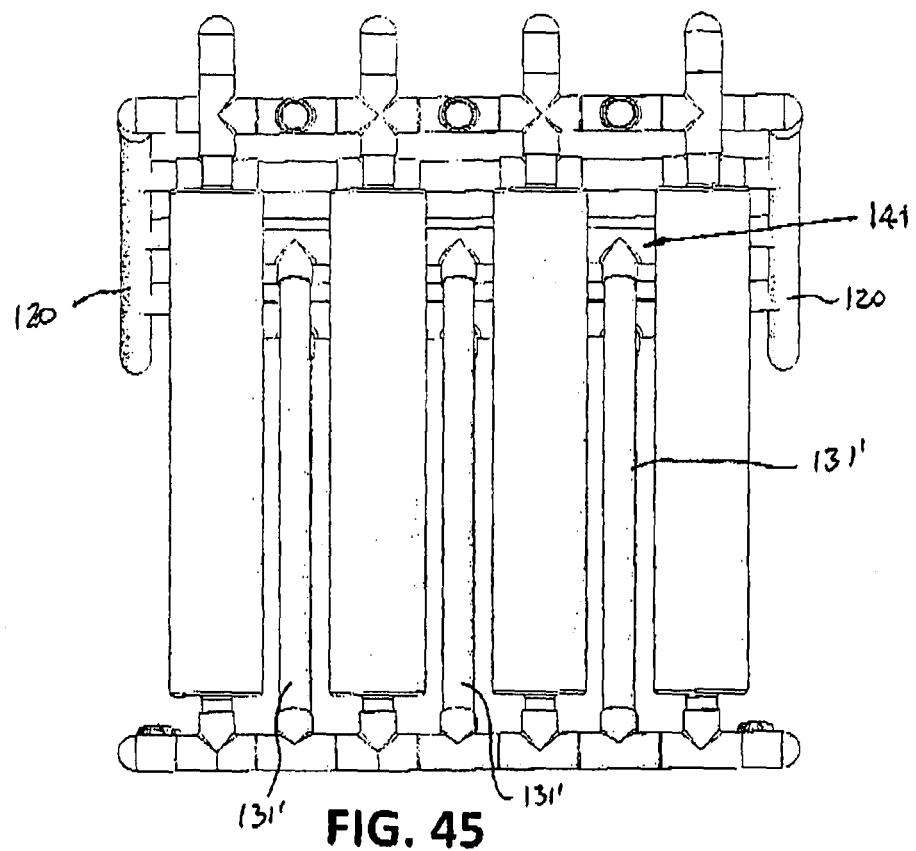
FIGS. 45 and 46 illustrate the inlet and outlet end of the apparatus of FIG. 43.
Figure 46:
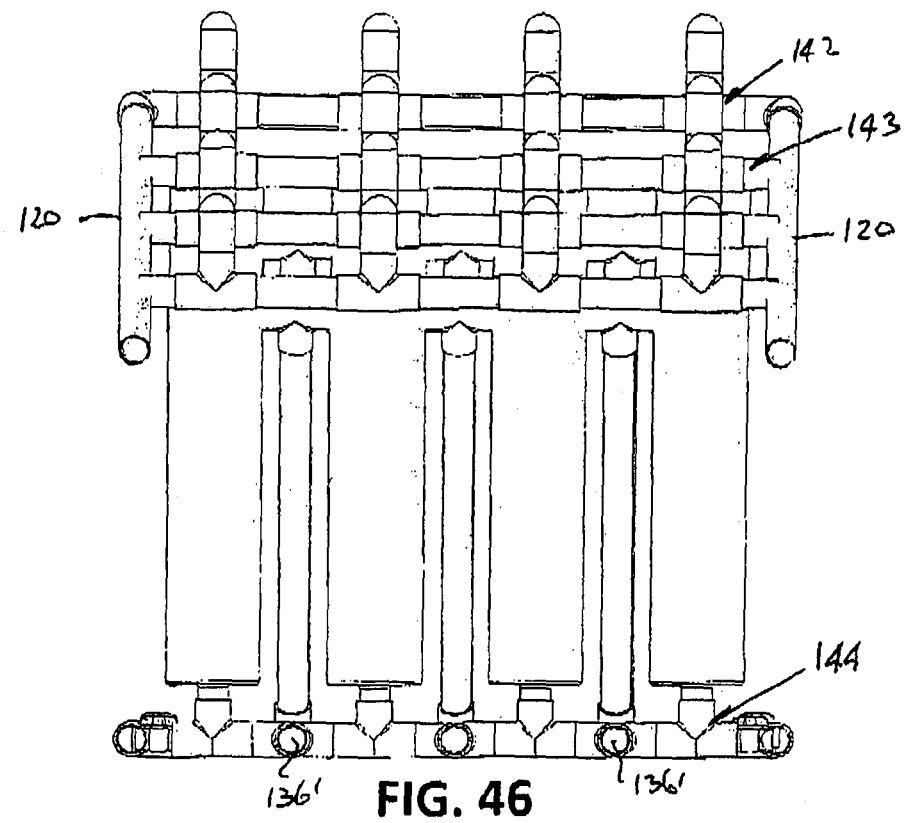
Figure 47:
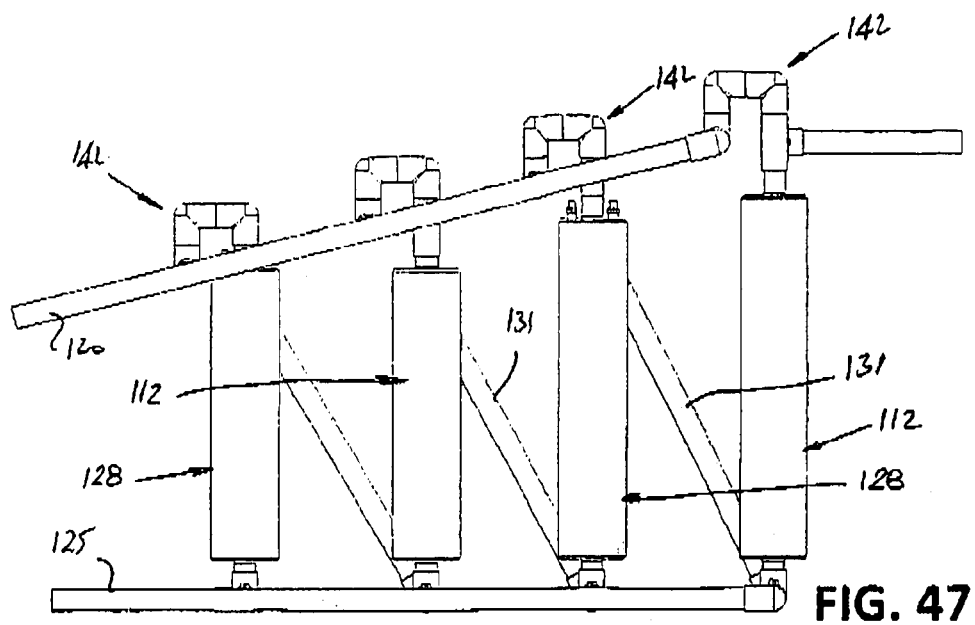
FIG. 47 is a side view of the apparatus of FIG. 43.
Figure 48:
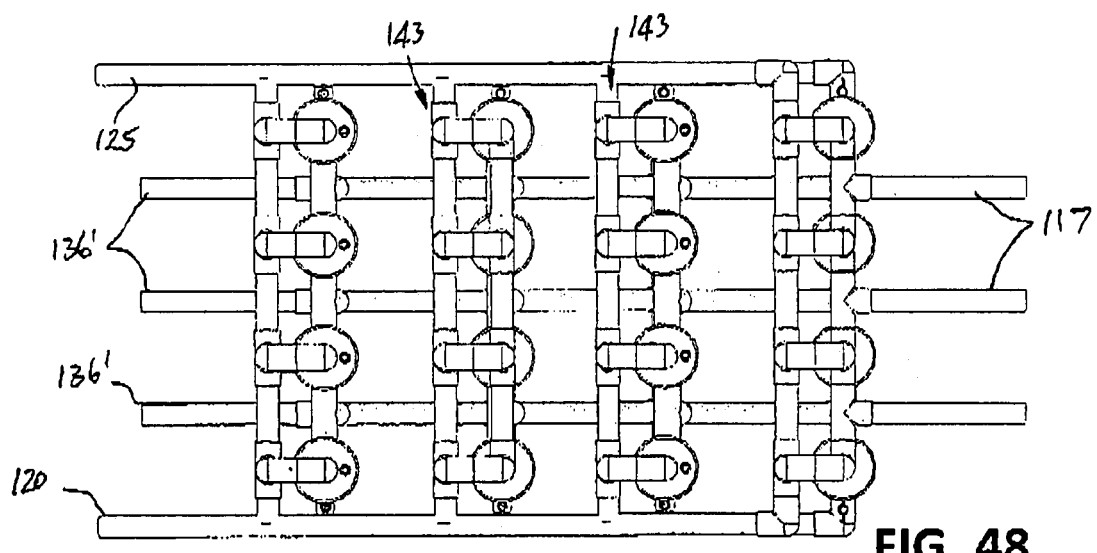
FIGS. 48 and 49 are top and bottom views of the apparatus of FIG. 43.
Figure 49:
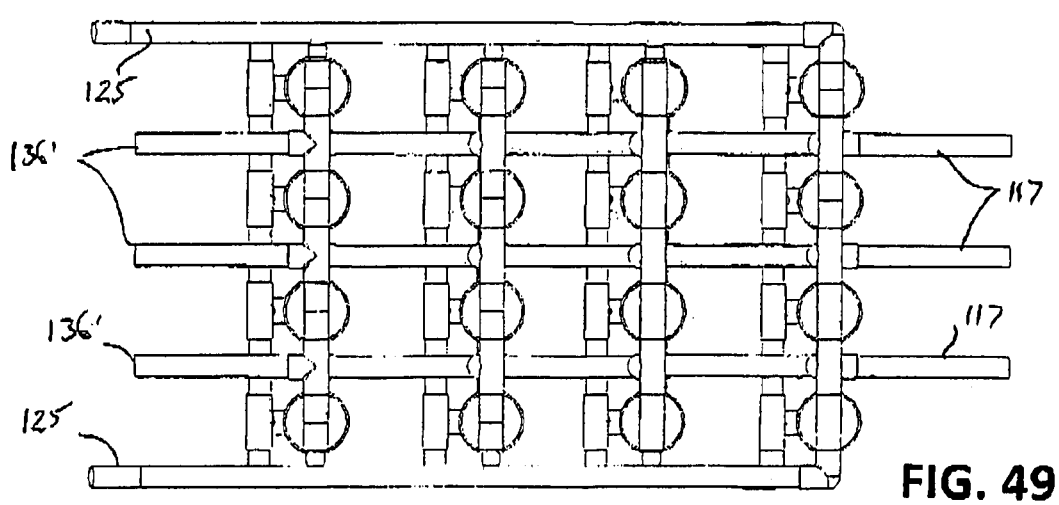

A similar connection arrangement is provided for each successive set of chambers with the ducts 131 connecting the lower ends of one set of chambers 127 or 132 to the upper ends of the next set of chambers such that liquid flows in the same direction in each chamber 127 and 132 as indicated by the arrows in FIG. 44.

As flow through the treatment chambers 127 and 132 of the apparatus 140 is in the same direction, it is necessary to provide treated liquid outlets at the lower ends of the trailing chambers 132' and for this purpose, the lower outlet ends of the chambers 132' are connected to an outlet manifold 144 to which the outlet ducts 136' are connected.

The concentration of ozone introduced into each chamber 127 may be varied and further it is also not necessary that the liquid be treated alternatively and successively with gas or ozone and UV light. Thus chambers may be arranged to provide multiple ozone or gas treatments followed by one or more UV treatment chambers for UV treatment and vice-versa.

To control liquid flow through the apparatus and therefore vary the residence time of liquid in the respective chambers, one or more of the ducts 131 may be provided with valves which can be operated to limit flow through the ducts 131.

Whilst the members 112 and 128 are shown to be of a circular cross section, they may be of other cross sections. Whilst venturi units are preferably provided to suck foam from the waste pipes for conversion of foam into liquid, vacuum or similar pumps may be used for this purpose.

The height of the outlet ducts 136 may be varied relative to the inlets 117 to vary the flow through the liquid treatment apparatus. The members 112 and 128 may be of a different spacing that that illustrated.

FIGS. 50 to 52 illustrate liquid treatment unit 145 of liquid treatment apparatus according to another embodiment of the invention comprising a pair of upright elongated hollow members 146 typically plastic pipes or tubes which are substantially parallel to each other and have their upper and lower ends at substantially the same horizontal level.

The members 146 are connected towards their upper ends by a transverse connecting passage 147 provided with a central inlet 118 for liquid to be treated. The connecting passage 147 and inlet 148 may be defined by T-shaped pip connectors. The lower ends of the members 146 are also connected by a further transverse connecting passage 149 which has a central outlet 150. Again the passage 149 and outlet 150 are defined by T-shaped pipe connectors.

The upper end of each gas treatment member 146 may be closed by a removable end cap 151 which allows for cleaning of the chambers of the members 146 and a waste outlet 152 is provided above the passage 147 and adjacent the end cap 151, the outlet 152 being connected to a venturi unit 153. The outlet of the venturi unit 153 may be connected to a waste pipe or line (described further below).

Alternatively, the gas treatment chambers 146 may be connected to foam passages 154 at their upper ends which include a trap or traps to prevent foam passing back into the chambers defined by the members 146. The foam passages 154 are in the form of an inverted U-shaped member which may be connected via a further venturi unit 153 to waste.

The members 146 comprise ozone fractionators and have gas inlets at their lower ends as described in the above embodiments which may comprise air stones, nozzles, perforated pipes, diffusers or other forms of outlets internally of, or extending into the lower ends of the chambers 146 or the illustrated venture units.

A further upright hollow elongated member 155 defining a chamber 156 is connected to the outlet 150 and is positioned symmetrically between the members 146. An ultraviolet (UV) light tube or lamp 157 is located within and extends longitudinally of the chamber 156 being mounted to an end cap 158 which closes the end of the chamber 156. An outlet 159 for treated liquid (defined by a T-connector) is provided towards the upper end of chamber 156 but below the inlet 148.

Liquid to be treated is supplied to the inlet 148 for split flow into the respective ozone treatment members 146 to flow downwardly in the direction B so as to be exposed to bubbles of ozone with waste foam carried by ozone bubbles to the upper end of the member 146 carrying contaminants being sucked out of the members 146 along with excess air or ozone by the venturi units 153 either directly or via the U-shaped pipes 154, the foam being converted by the venturi units 153 into liquid which passes to waste. The members 146 thus serve as ozone fractionators where the gas introduced through the venturis 21 is ozone.

Liquid reaching the lower end of the members 146 flows via the passage 149 to the single UV treatment chamber 156 for flow upwardly therethrough in the direction C where it is exposed to UV light from the UV lamp 157 to kill pathogens in the liquid before exiting the outlet 159.

Because the inlet flow through inlet 148 is split into the two chambers 146, flow of fluid through these chambers is fifty percent slower through ozone disinfection/fractionation than through the UV chamber 156. This allows for greater ozone contact time and time to remove any foreign bodies or colour and smell from the water. Further as the outlet 159 is below the inlet 148, liquid will flow gravitationally through the unit 145.

Liquid treatment units 145 of the type described above may be combined in various configurations to form liquid treatment apparatus suitably for a wide range of applications.

Figure 53:
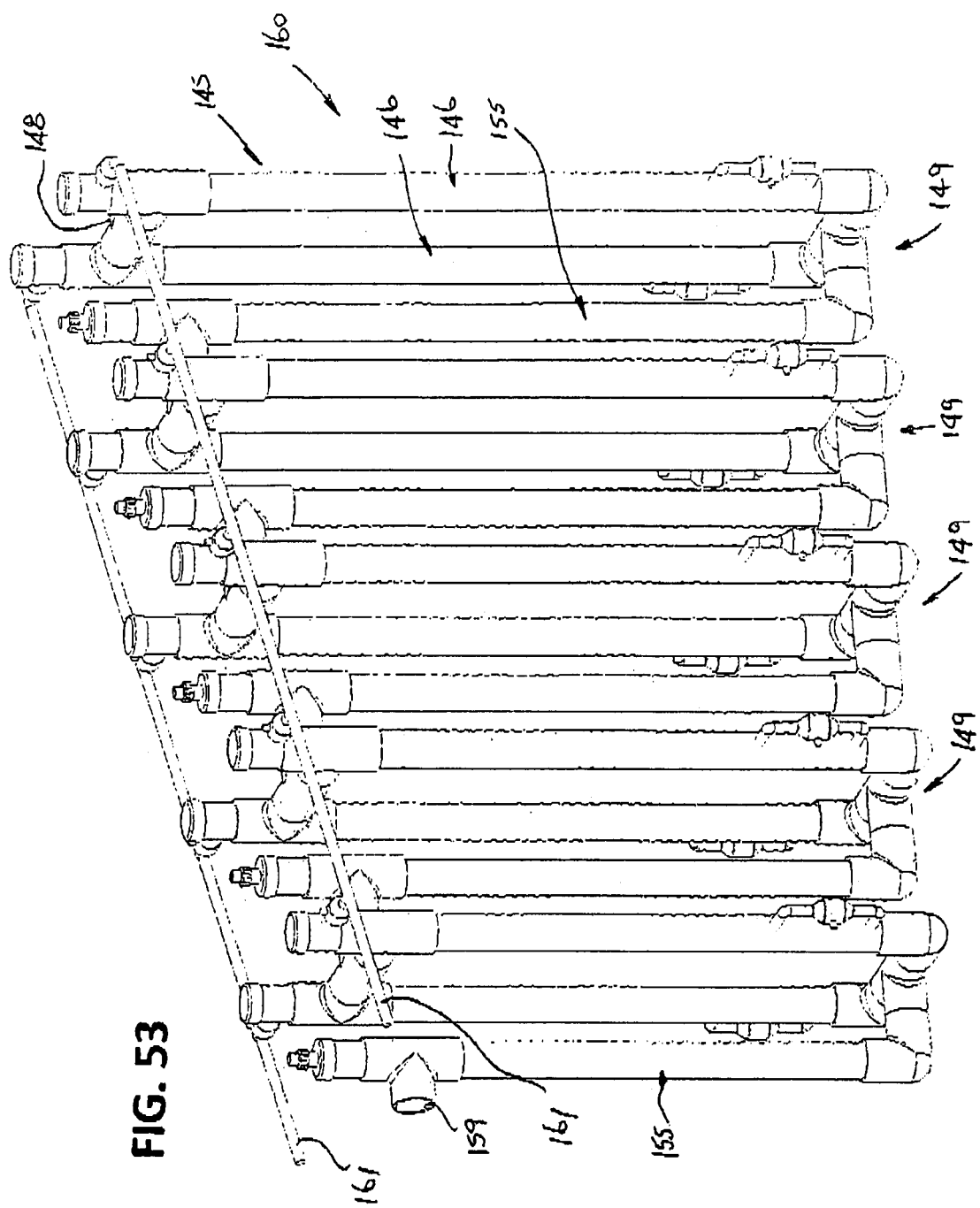
FIGS. 53 to 55 are views from the side, front and top of liquid treatment apparatus including liquid treatment units of the type shown in FIGS. 50 to 52.
Figure 55:
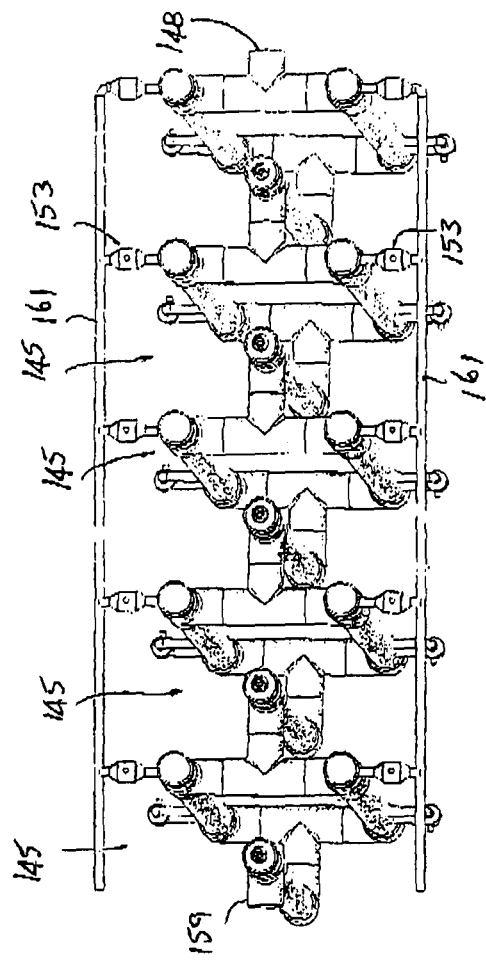
Figure 54:
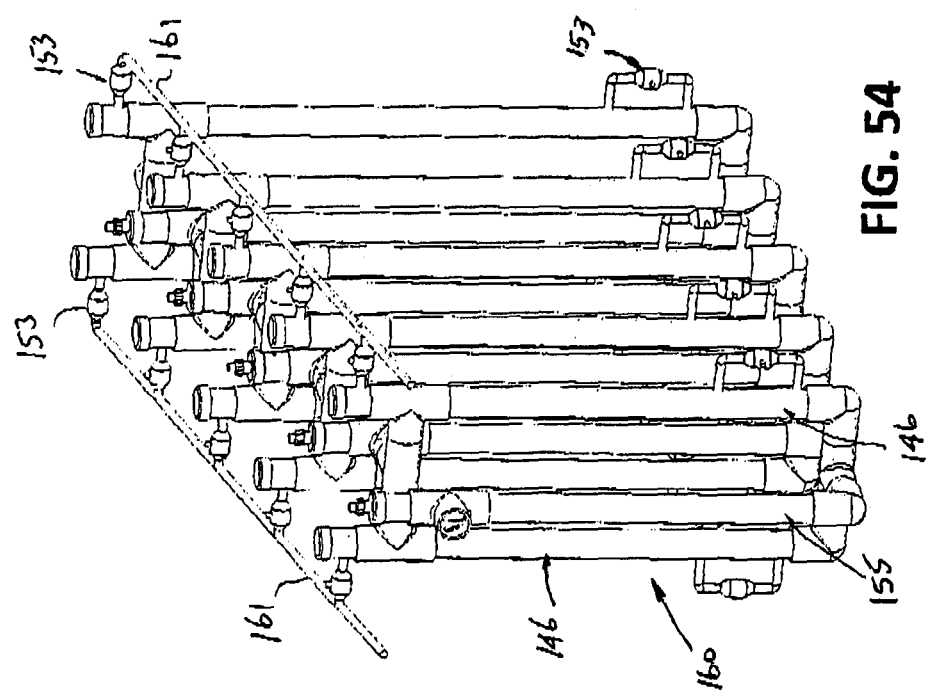

Thus in the embodiment of FIGS. 53 to 55 where like components to the components of the unit 145 of FIGS. 50 to 52 have been given like numerals, the liquid treatment apparatus 160 comprises five units 145 provided in series with the leading unit 145 having a single inlet 148' for liquid to be treated and the trailing unit 145 having a single outlet 159' for treated liquid. The members 146 and 155 in each successive unit 145 of successively decreasing height such that liquid being treated can flow under the influence of gravity from one unit 145 to the next unit 145 via the respective outlets 159, each of which is arranged below the outlet of the preceding unit 145. Further it will be noted particularly in FIG. 54 that the bases of the member 145 and 155 connected by the connecting passages 149 are arranged in substantially the same horizontal plane which enables the apparatus 160 to be free-standing in an upright attitude.

In addition in the apparatus 160, common downwardly inclined waste outlet pipes 161 are provided on each side of the apparatus 160 being connected to the outlets of the respective venturi units 153 which converts the foam The single outlet 159' provides fully disinfected and cleaned fluid which has passed through fifteen ozone and UV treatments in the members 145 and 155 and ten fractionations in the chambers 145.

Where multiple units 145 are combined into the apparatus 160 of FIGS. 53, 54 and 55, the venturi units 153 may be eliminated as excess gas pressure from ozone injection may be used to force foam out to the waste pipes 161.

Figure 58:
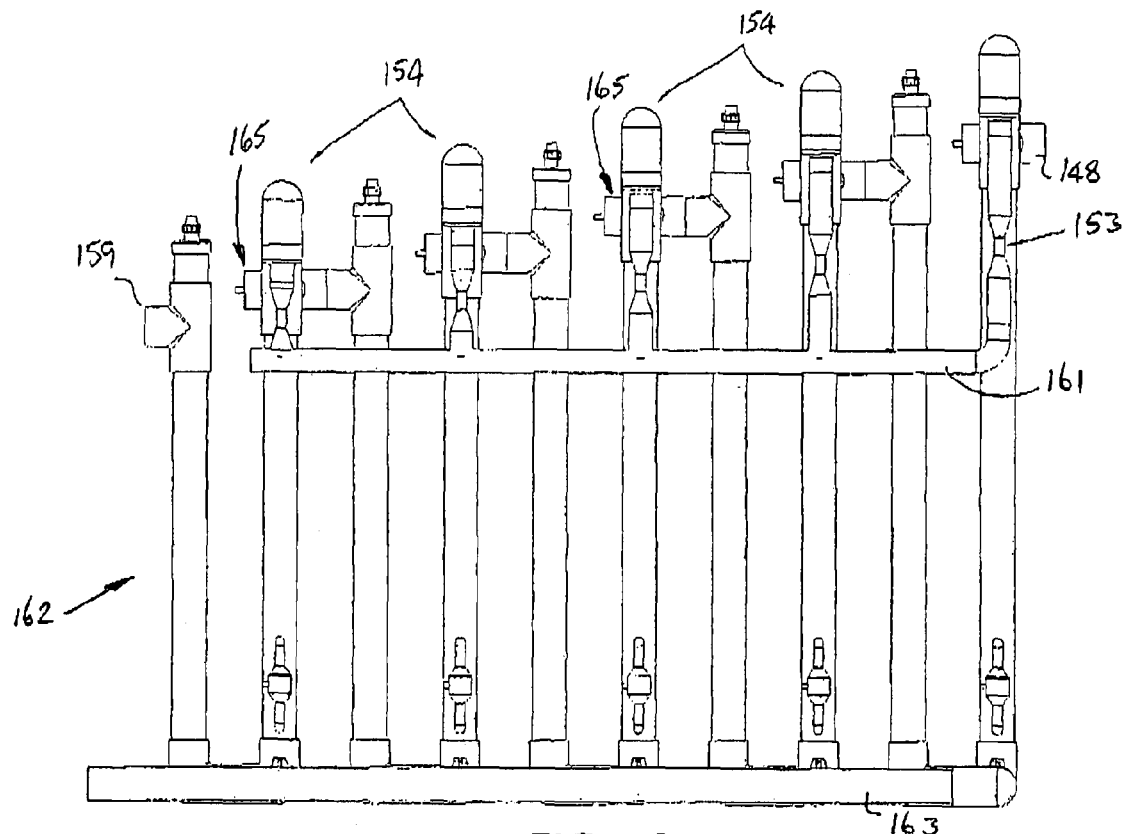

The embodiment of liquid treatment apparatus 162 of FIGS. 56 to 58 in which like components to the components of the unit 145 of FIGS. 50 to 52 and apparatus of FIGS. 53 to 55 have been given like numerals again comprises five units 145 provided in series in successively decreasing height with an inlet 148 to the leading unit 145 and an outlet 159 from the trailing unit 145. In this case however the foam waste passages 154 are defined by U-shaped traps or manifolds as previously described. The passages 154 may be adjusted vertically in opposite directions as indicated by the double headed arrow of FIG. 57 for faster froth or bubble and gas removal and to allow the maximum volume of clean fluid to remain. This adjustment may be achieved by slidingly moving the U-shaped traps or manifolds in opposite directions or having a screw threaded engagement between the manifolds and upper end of the members 146.

In addition, drain pipes 163 are provided on each side of the apparatus 162 being connected to the bottom of the respective members 146 via stop valves or solenoid valves 164. The drain pipes 163 are provided at substantially the same level as the lower ends of the units 145 to provide extra stability to the apparatus 162 when seating on a support surface or floor.

Further if it is required to ionize the water to lift the PH level, ionization units 165 may be inserted into the connection passages 147 through an extended threaded arm 166 thereof. An ionization unit 165 may be provided in a screw out end section 167 of the arm 166 for use as required. The PH level can be adjusted by the number of ionization units 165 that are switch on, the power of the respective units 165 and the speed of the water flow. As an alternative to the ionization units 165, electrical pulse applications units for germ killing or chlorinators may be used depending upon the applications.

The common waste pipes 161 in this embodiment are substantially horizontal or may be inclined towards the trailing end of the apparatus 162.

Figure 59:
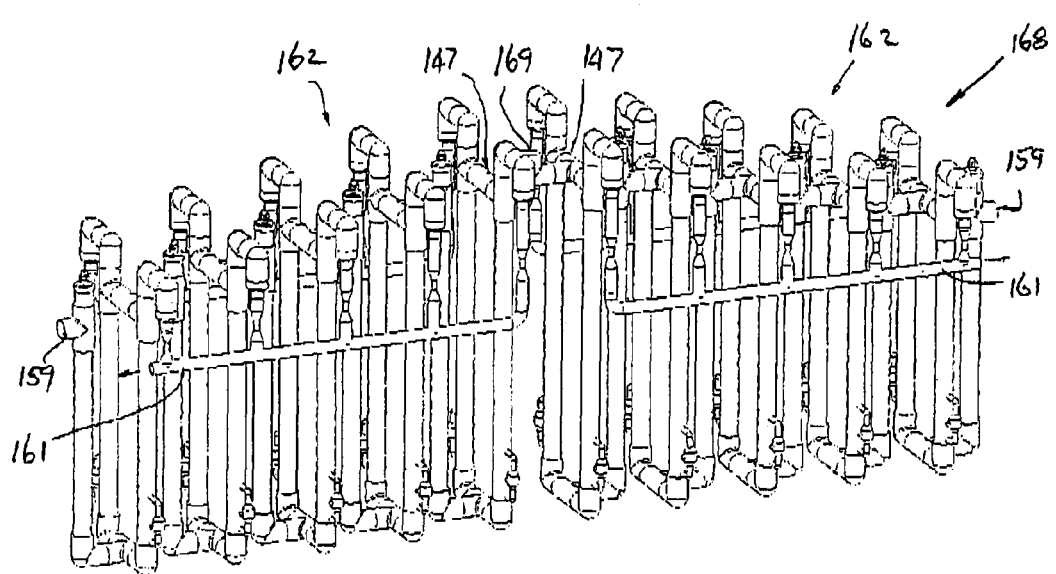
FIG. 59 is an isometric view from the side of a pair of apparatuses of the type shown in FIGS. 56 to 58 in a back-to-back relationship.

The embodiment of liquid treatment apparatus 168 of FIG. 59 comprises a pair of apparatuses 162 of the type shown in FIGS. 56 to 58 in a back to back relationship with a common central inlet 169 connected to the inlet passage 147 and a pair of outlets 159' at opposite ends of the apparatus 168. The apparatus 168 shown in FIG. 59 does not include drain pipes 163 however these may be included in required for draining of the apparatus 168.

Figure 60:
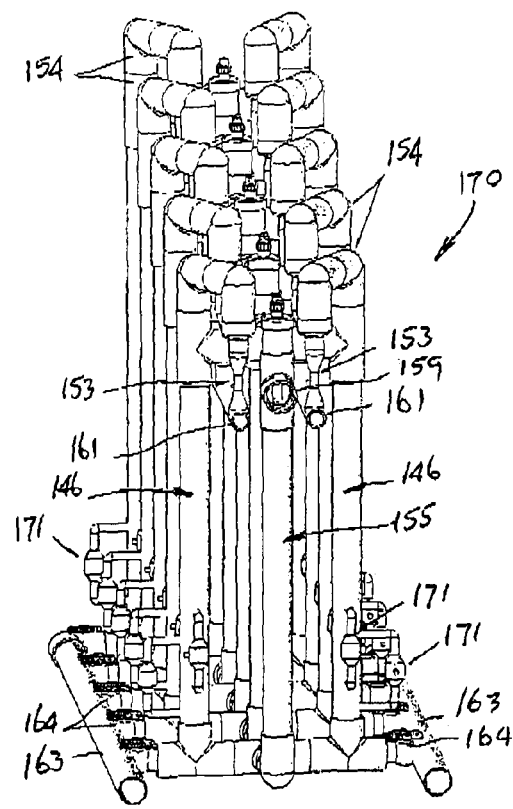
FIG. 60 illustrates from the front further liquid treatment apparatus according to another embodiment of the invention from the front and side.

FIG. 60 illustrates a further embodiment of liquid treatment apparatus 170 which is similar to the apparatus of FIGS. 56 to 58 except that the manifolds/U-shaped traps 154 are angled inwardly to reduce the width and reduce the footprint of the apparatus 170. FIG. 60 additionally illustrate that a series of ozone injection venturi units 171 may be located around the members 155 at different radial positions and different heights in this case to the front and side of the members 155 to increase ozone flow and also increase fractionation. It will be additionally noted that the waste outlet pipes 161 are located between the members 146 and 155 on each side of the apparatus 170.

Figure 61:
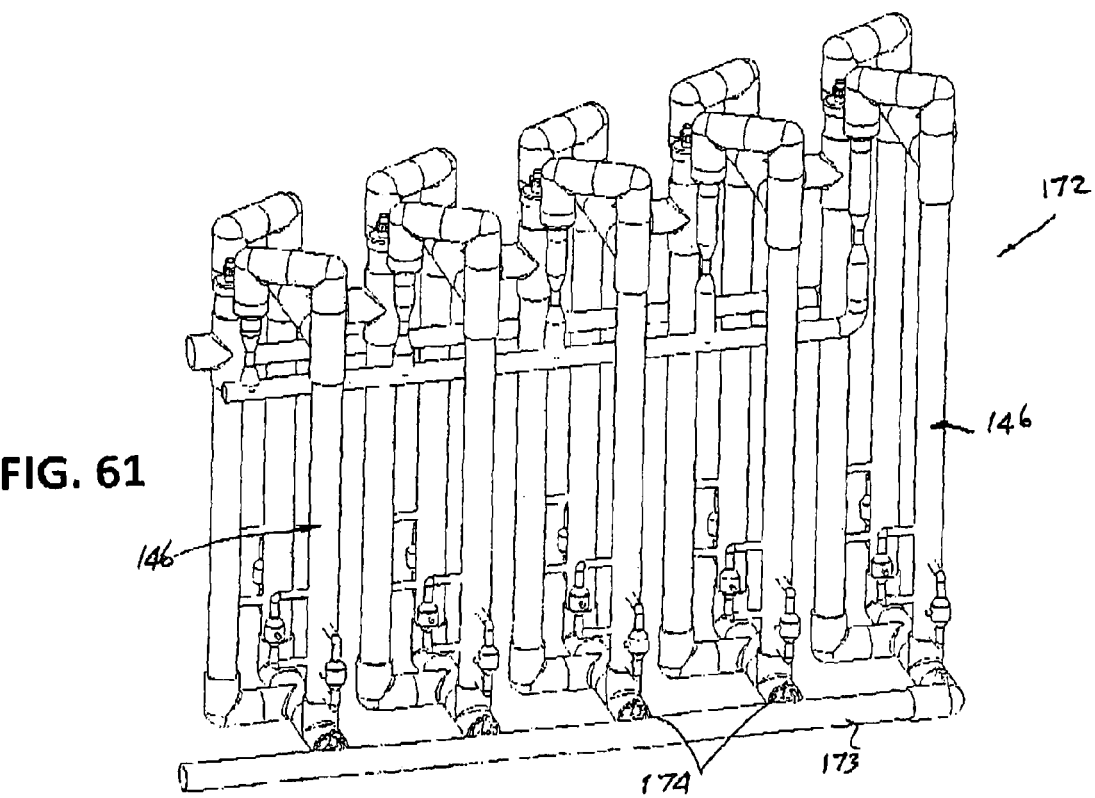
FIG. 61 illustrates a modified form of liquid treatment apparatus which is similar to that of FIG. 60.

The apparatus 172 of FIG. 61 is similar to the apparatus 170 of FIG. 60 except that only a single waste pipe 173 is provided on one side of the apparatus 172 being connected through respective valves 174 to the lower ends of one set of members 145 on one side of the apparatus 172. The members 146 on both sides of the apparatus 172 and the members 155 thus can all be drained to the single waste pipe 173 by operation of selected valves 174.

Figure 62:
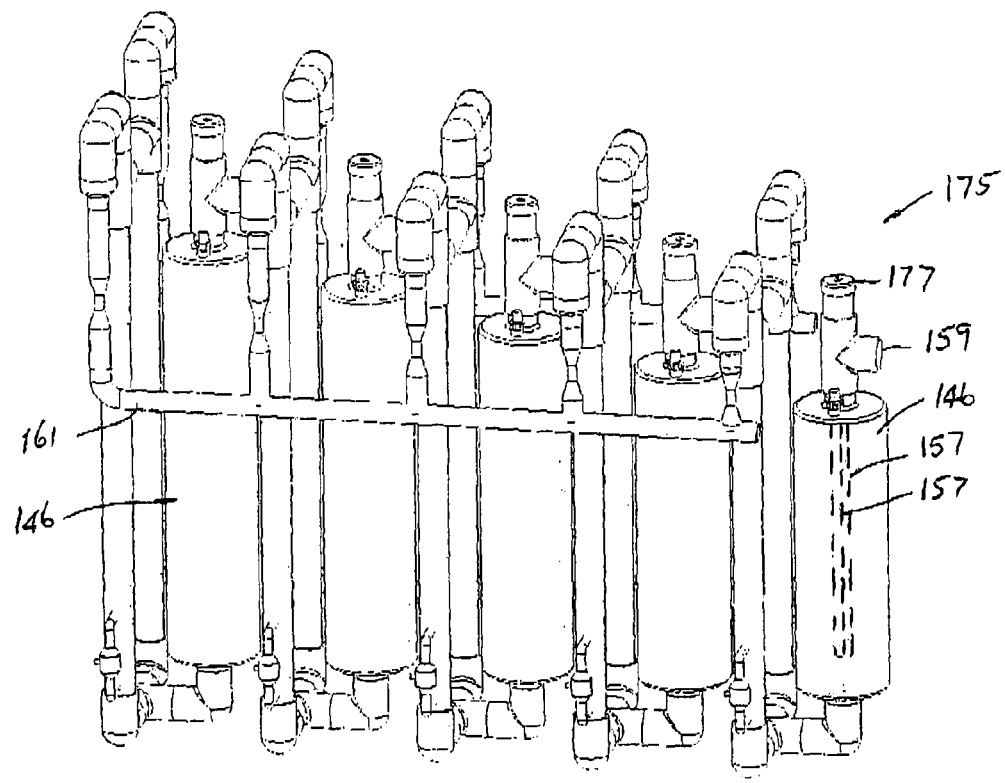
FIGS. 62 and 63 illustrate in side and top views an alternative embodiment of liquid treatment apparatus according to the invention.
Figure 63:
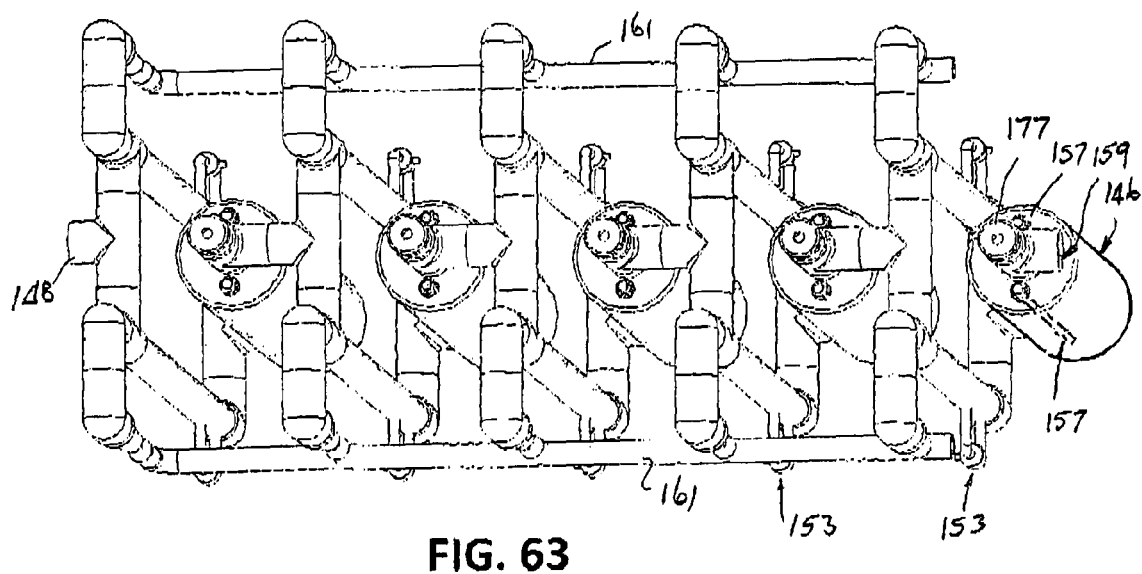

The embodiment of apparatus 175 of FIGS. 62 and 63 is similar to the embodiment of FIGS. 56 to 58 except that the members 146 comprise hollow tubular members 176 of increased cross section so as to allow for the inclusion of multiple UV tubes 157 for increased disinfection with the tubular members 176 being of reducing height from the inlet 148' to the outlet 159'. Further as the member 176 is of an increased cross section, water flow rate through the member 176 is decreased to therefore allow for additional UV disinfection time. In the embodiment shown, one of the UV tubes or lamps 157 is arranged centrally of the member 145 and a further UV tube 157 is arranged at a position radially spaced from the central UV tube 157. It will be appreciated that a series of UV tubes or lamps 157' may be arranged at spaced positions around the central tube 157 or alternatively may be used in place of the central tube 157 (for example as shown in FIG. 63).

The top of the member 176 is of similar configuration to that of FIGS. 56 to 58 and is provided with a cap 177 which is centrally apertured to allow for release of any gases or generated foam from the members 145. The cap 177 alternatively may be replaced by a waste passage similar to the waste passage 154 for exhaust of gases or foam.

Figure 64:
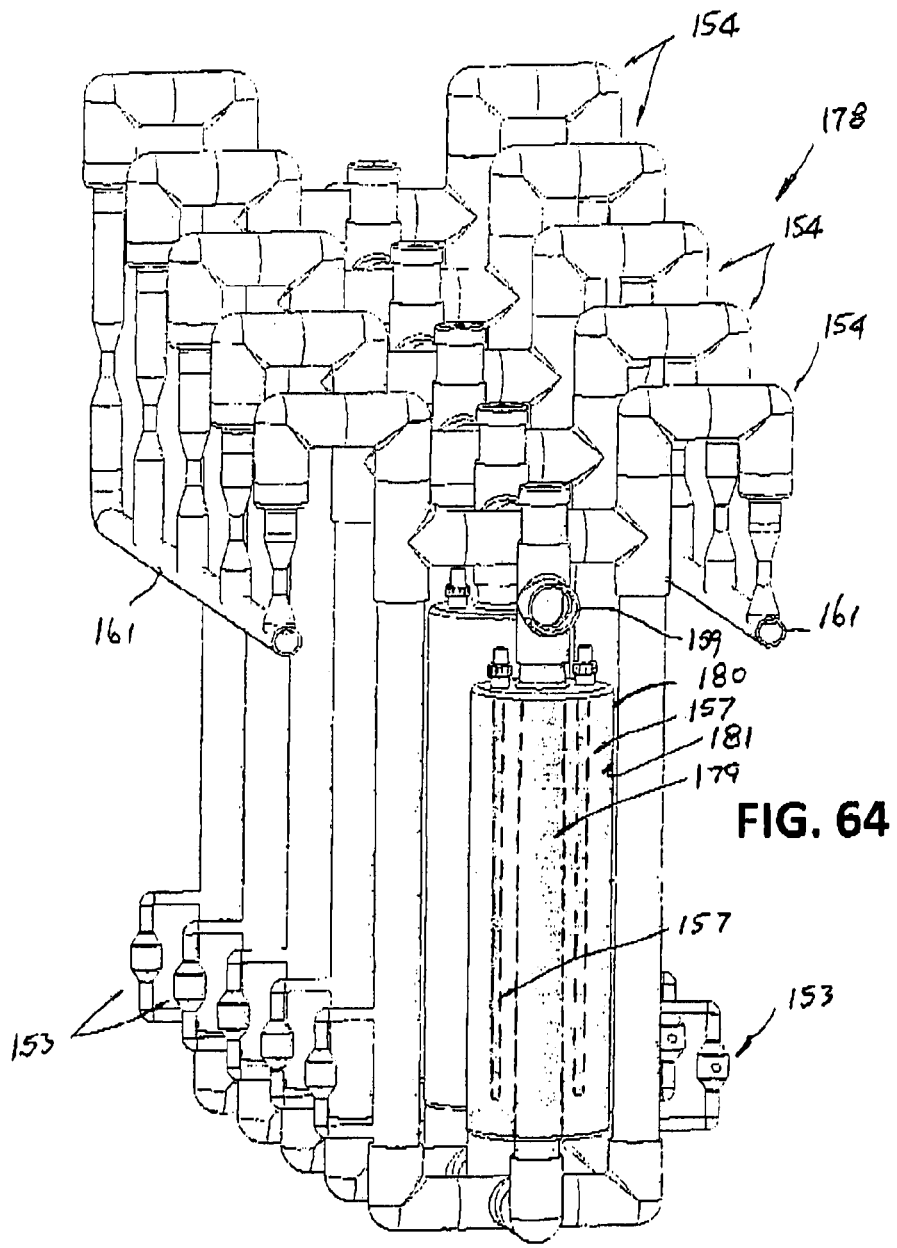
FIG. 64 is a view from the front of an alternative liquid treatment apparatus according to another embodiment of the invention.

The embodiment of liquid treatment apparatus 178 of FIG. 64 is similar in appearance to the embodiment of FIGS. 62 and 63. In this case however, the UV treatment chamber includes a central transparent or translucent tubular member 179 formed of a material such as quartz and surrounded by an enlarged tubular housing 180 which has a reflective inner face 181. A pair of UV lamps 157 is provided at spaced circumferential positions so that water flowing through the transparent or translucent member 179 is exposed to UV light whilst the lamps 157 remain dry. Of course there may be any number of UV lamps 157 in the housing 180.

In the liquid treatment apparatus described in the above embodiments, the UV treatment chamber is provided separately from the ozone fractionator chamber/s. In the embodiments described below, advanced oxidation is achieved by carrying out UV treatment of the liquid or fluid in an ozone fractionator chamber. FIGS. 65 and 66 illustrate an advanced oxidation unit 210 comprising an upright elongated primary treatment chamber 211, the chamber 211 in this embodiment having a main lower section 212 defined by a plastics pipe or tube and an upper section 213 also formed by a plastic pipe or tube joined to the pipe or tube of the lower section 212 and being closed at its upper end by an end cap 214 which is internally threaded for engagement with the upper end of the pipe or tube of the upper section 213.

An inlet 215 for fluid to be treated at an upper end of the chamber section 212 and an outlet 216 is provided at the lower end of the chamber section 212. For draining of fluid from the chamber 211, the lower chamber section 212 is connected via a valve 217 in this case a manual ball or gate valve to a waste line 218.

A gas outlet 219 in the form of an air stone is provided at a lower end of the chamber section 212 and is connected via a gas supply line 220 to an external gas coupling 221 provided in the wall of the chamber section 212.

An ultraviolet lamp assembly 222 is mounted to the end cap 214 and extends longitudinally into, and substantially coaxially of, the chamber 211. The lamp assembly 222 comprises an elongated transparent hollow tube 223 which is closed at its lower end 224, the tube 221 typically being formed of quartz. The tube 223 is mounted to the end cap 214 by means of a hollow tubular holder 225 which is fixed centrally to the end cap 214 and which extends to opposite sides thereof. The tube 223 extends closely through the holder 225 such that the upper open end 226 thereof is positioned externally of the chamber 211 and is located above the holder 225. The opposite ends of the holder 225 are threaded for engagement by glands nuts 227 which when tightened exert an radial force to the tube 223 to clamp the tube 223 to the holder 225 on opposite sides of the end cap 214.

An elongated ultraviolet lamp or tube 228 is located within the tube 223 to extend longitudinally thereof. The tube 228 is thus not exposed directly to fluid in the chamber 211. Connection cables 229 for supplying power to the UV lamp 228 extend out of the upper open end 226 of the tube 223. Typically the UV tube 228 emits UV light at a wavelength of 254 nanometers.

The pipe or tube of the upper section 213 includes a transparent portion 230 which defines a viewing window allowing visual observance of the treatment process within the chamber 211. The upper section 213 also includes a waste outlet 231 for outlet of waste foam created in the treatment process.

In use, water or other liquid to be treated passes into the inlet 215 to flow downwardly within the chamber 211 towards the outlet 216. The coupling 221 is connected to source of ozone or ozone enriched air which is supplied to the air stone to flow upwardly as bubbles through the downwardly flowing water. Power is also supplied to the UV tube 228 such that the water and bubbles in the chamber 211 are exposed to ultraviolet light. The ultraviolet light reflects off the bubbles creating multiple reflections to enhance exposure of the water to UV light. The combination of ozone and UV light will kill bacteria and viruses in the water and multiple passes through the chamber 211 will enhance disinfection and cleaning of the water. The high concentrations of ozone in the chamber 211 can destroy and oxidize iron cyanide, sulphur and other chemicals. Additionally, ozone is able to fractionate dirt and excess chemicals which will be carried by the bubbles upwards and form foam at the upper end of the liquid in the chamber 211 which exits through the waste outlet 231.

The rate at which ozone bubbles rise in the liquid can be controlled by controlling the volume of water or liquid flow. Control of the flow will allow the bubbles to either rise faster or slower or remain suspended. Thus the ozone bubbles can have a long contact time within the chamber 211 and ensure effective sterilization. Control of the volume of supply of ozone can also control the flow rate of liquid through the chamber 211. A further beneficial effect of the advanced oxidation process described above when used for treating water is that the PH of the water will be increased.

Referring now to FIGS. 67 and 68, there is illustrated a liquid treatment device 232 for liquid treatment apparatus, the device including a pair of advanced oxidation units 210 as described above. The upright elongated hollow chambers 211 of the respective devices 232 are spaced from each other and a T-shaped pipe connector 233 is connected to the respective inlets 215 with the free leg 234 of the connector 233 comprising an inlet for liquid to be treated. A similar T-shaped connector 235 is provided at and connected to the lower ends of the respective chambers 211 with the leg 236 of the connector 235 comprising an outlet for liquid from the chambers 211. The T-shaped connector 235 is arranged such that its opposite arms are connected to the lower ends of the chambers 211 by elbows. It will be noted in this case that the chambers are not connected to the waste line 218 by the valves 217.

The chambers 211 further have their outlets 231 connected to waste passages 236 which are located below the outlets 215 via include transparent passages 237 which allow visual inspection of the foam waste flowing to the passages 236.

Further in this case, venturi units 238 are connected to the lower ends of the chambers 211 above the T-section connector 235 to allow introduction of ozone or ozone enriched air into the chambers 211. Each venturi unit 238 has its inlet 239 connected to the chamber 211 and its outlet 240 connected to the chamber 211 at a lower position beneath the inlet 239. An inlet 241 to the venturi unit 238 is connected to a source of gas such as air or ozone to create a suction pressure to draw in liquid and gas through the inlet 239 and force it through the outlet 240 in the direction of the arrows A in FIG. 68. This introduces gas such as ozone into the lower ends of the chambers 211 by drawing liquid out the chambers 211 and mixing that liquid with ozone before re-injecting it into the chambers 211. This enables recirculation of ozone in the chambers 211 and increases ozone fractionation of the liquid in the chambers 211. Bubbles of ozone thus pass upwardly through each chamber 211 against downward flow of liquid from the inlet 13 in the direction B down through the chamber 211. This occurs in each chamber 211.

The outlets 216 from the chambers 211 are connected via the T-connector 235 to the lower end of a common UV treatment chamber 242 via an elbow 243, the chamber 242 being defined by an upright tubular member or pipe which is positioned on the trailing side of the chambers 211 and centrally relative to the chambers 211 such that the chambers 211 are arranged symmetrically to opposite sides of the chamber 242. This enables the device 232 to seat stably on a flat support surface or floor. An ultraviolet (UV) light source in the form of an ultraviolet (UV) light tube or lamp 244 is located within and extends longitudinally of the chamber 242. The tube or lamp 244 may be mounted to an end cap 245 of the chamber 242 in a similar manner to that described with reference to the tube or lamp 28 of FIGS. 65 and 66. The chamber 211 may also include a transparent inspection portion 246. An outlet 247 for treated liquid (defined by a T-connector) is provided towards the upper end of chamber 242 but below the inlet 234.

In use liquid to be treated is supplied to the inlet 234 for split flow into the chambers 211 of the advanced oxidation units 210 to flow downwardly in the direction B against ozone or ozone-enriched air bubbles flowing upwardly through the chambers 211 whilst at the same time the liquid is exposed to UV light from the lamps 28. The downwardly flowing liquid is therefore exposed not only to UV light but to the sterilizing scrubbing effect of ozone on the liquid. This results in disinfection and fractionating of the fluid with contaminant particles being carried upwardly through the chamber 211 thus creating foam which carries contaminants in the liquid at the upper end of the chambers 211 which passes through the connection ducts 231 to the foam waste passages 236.

Liquid reaching the lower end of the chambers 211 flows via the T-connector 235 to the single UV treatment chamber 242 for flow upwardly therethrough in the direction C where it is exposed to UV light from the UV lamp 46 to kill pathogens in the liquid before exiting the outlet 247.

Because the inlet flow through inlet 13 is split into the two chambers 211, flow of fluid through these chambers 211 is fifty percent slower through the advanced oxidation units 210 than through the UV chamber 242 which is of the same cross sectional area as each chamber 211. This allows for greater ozone contact time and time to remove any foreign bodies or colour and smell from the water. Further as the outlet 247 is below the inlet 234, liquid will flow gravitationally through the unit 210. Further variation of the ozone contact time in the chambers 211 or UV light exposure in the chambers 242 can be achieved by varying the cross-sectional area or diameter of the chambers 211 or 242.

Liquid treatment devices 232 of the type described above may be combined in various configurations to form liquid treatment apparatus suitably for a wide range of applications. Thus in the embodiment of FIGS. 69 and 70 where like components to the components of the device 232 of FIGS. 67 and 68 have been given like numerals, the liquid treatment apparatus 248 comprises five devices 232 provided in series with the leading device 232' having a single inlet 234' for liquid to be treated and the trailing unit 232" having a single outlet 247' for treated liquid. The chambers 211 and 242 of each device 232 are in each successive unit 210 of successively decreasing height such that liquid being treated can flow under the influence of gravity from one unit 232 to the next unit 232 via the respective outlets 247, each of which is arranged below the outlet of the preceding unit 232. Further it will be noted that the lower ends of the chambers 211 and 242 connected by the T-connectors 235 (and elbows) are arranged in substantially the same horizontal plane which enables the apparatus 248 to be freestanding in an upright attitude.

In addition to the apparatus 248, the common waste outlet pipes 236 are provided on each side of the apparatus 248 being connected to the outlets of respective venturi units 249 connected to the upper ends of the chambers 211, the venturi units 249 being connected to a source of air or gas and being operative to convert the foam from the chambers into liquid and direct the liquid waste collected from each chamber 211 to the waste lines 236. The waste outlet lines 236 as shown are inclined from the leading unit 232' to the trailing unit 232" for gravitational flow of waste liquid to waste.

The single outlet 247' provides fully disinfected and cleaned fluid which has passed through multiple advanced oxidation processes and UV treatments in the chambers 211 and 242.

Whilst the chambers 211 typically act as advanced oxidation units for exposure of liquid therein both to UV light and to ozone fractionation, one or more of the chambers 211 may be configured to only expose the liquid therein to ozone fractionation. Thus one or more of the chambers 211 may have the UV lamp therein not operated or the UV lamp absent. Further whilst the apparatus 248 is shown to have five liquid treatment devices 232 connected in series, the apparatus 248 may only have two such devices 232 or more than five devices 232 connected in series.

Figure 69:
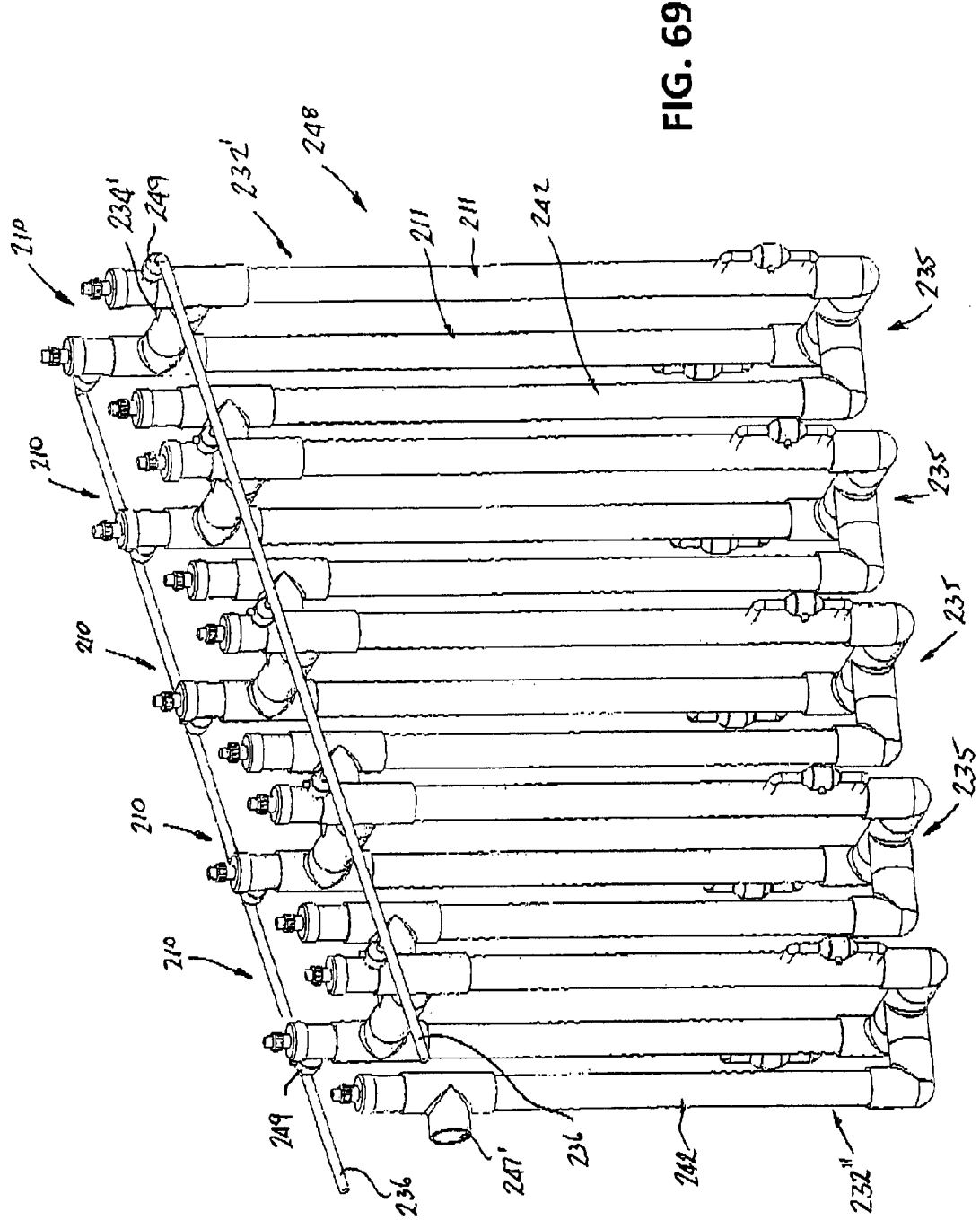
FIG. 69 is an isometric view of liquid treatment apparatus including liquid treatment devices of the type shown in FIGS. 67 and 68.

Referring now to FIGS. 70 to 73, there is illustrated liquid treatment apparatus 250 similar to that of FIGS. 68 to 70 in which like components to the components of the apparatus 232 and 248 of FIGS. 67 to 69 have been given like numerals. The apparatus 250 in this case however includes an ozone generator 251 for supplying ozone to the advanced oxidation units 210 or ozone fractionators 252. The advanced oxidation units 201 and ozone fractionators 252 have ozone outlets at their lower ends, for example air stones 219 similar to that described in FIG. 66 or venturi units 238 similar to that shown in FIG. 69 to supply bubbles or ozone or ozone enriched air which bubbles upwardly through downwardly flowing liquid.

The ozone generator 251 comprises an air inlet manifold 253 of a U-shaped configuration which is substantially horizontal and the respective arms 254 of which are located between the chambers 211 of each device 232. An ozone outlet manifold 255 of a U-shaped configuration is located below the inlet manifold 253. A series of upright ozone generator tubes 256 are connected at their upper ends to the inlet manifold 253 and at their lower ends to the outlet manifold 255. A UV lamp 257 is provided in each tube 256 being mounted to an end caps fitted to the upper end of the tube 256 to close a seal the tube. The UV lamp typically provided UV light at a wavelength of 185 nm. Air supplied to the inlet manifold 253 passes into the respective tubes 256. When exposed to UV light from the lamps 257, the oxygen molecules in the air are split to enable ozone to form which exits into the outlet manifold 255. The outlet manifold 255 is connected to U-shaped ozone supply manifold 258 via supply tubes 259, the manifold 258 being arranged above the air manifold 254 and between the chambers 211.

Where the chambers 211 include air stones 219 for supply of ozone to the lower end of the chamber 211 for bubbling up through liquid flowing downwardly through the chamber 211, supply tubes 260 from the manifold 258 are connected to the couplings 221 at the upper end of the chamber 211 which are connected by internal tubes to the air stones 219 (shown in dotted outline). Valves 261 enable control of the supply of ozone to the air stones 219.

Alternatively, supply tubes 262 (shown in dotted outline) are connected via valves 262 to the venturi units 238 for supply of ozone to the lower end of the chambers 211 as described above.

For treatment of liquid in the chambers 211 with electric pulses, one or more of the chambers 211 may also be provided with electric terminals 263 to which an electric pulsed current may be applied. Alternatively, if it is required to ionize the water to lift the PH level, ionization units may be connected to or communicate with one or more of the chambers 211 for treatment of liquid flowing therein. This may be achieved by the use of electrodes in the cross passage between the chambers 211 as shown in dotted outline at 263' in FIG. 71. The electrodes may also be used for chlorination of the water flowing to the chambers 211. Similar electrodes may be used in the embodiments of FIGS. 67 to 69.

Figure 34:
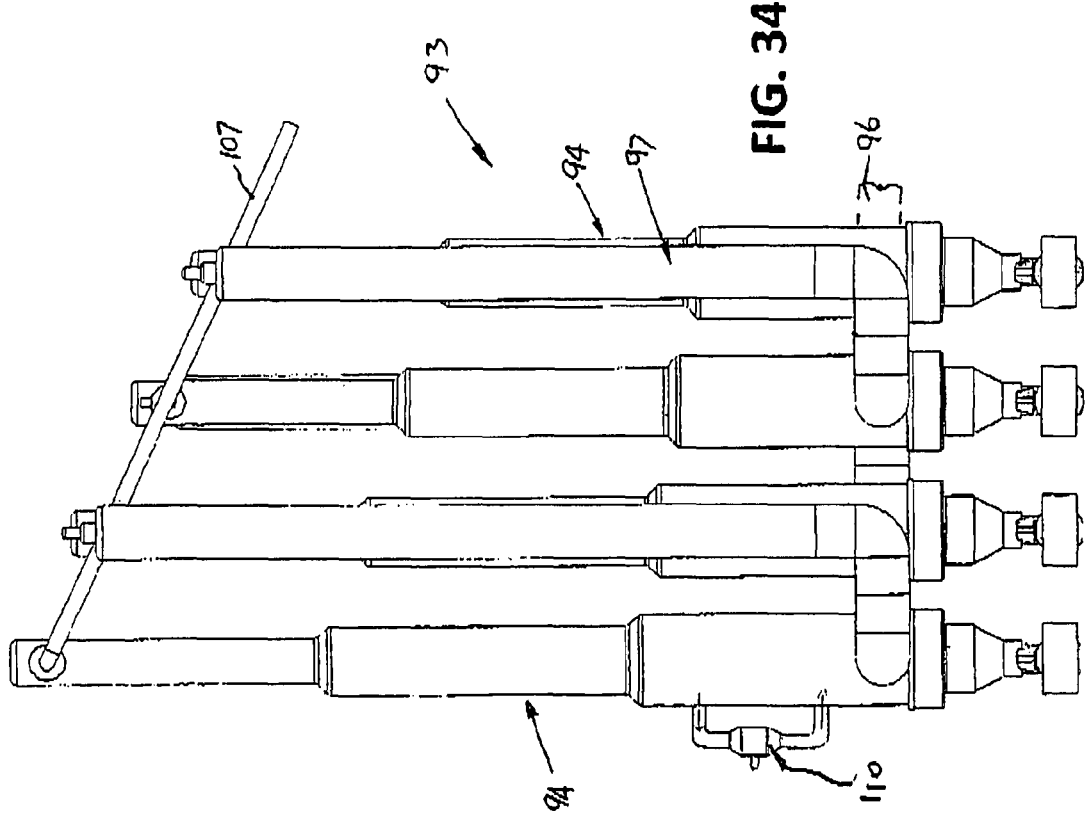
FIG. 34 is a side view of the apparatus of FIG. 32.
Figure 39:
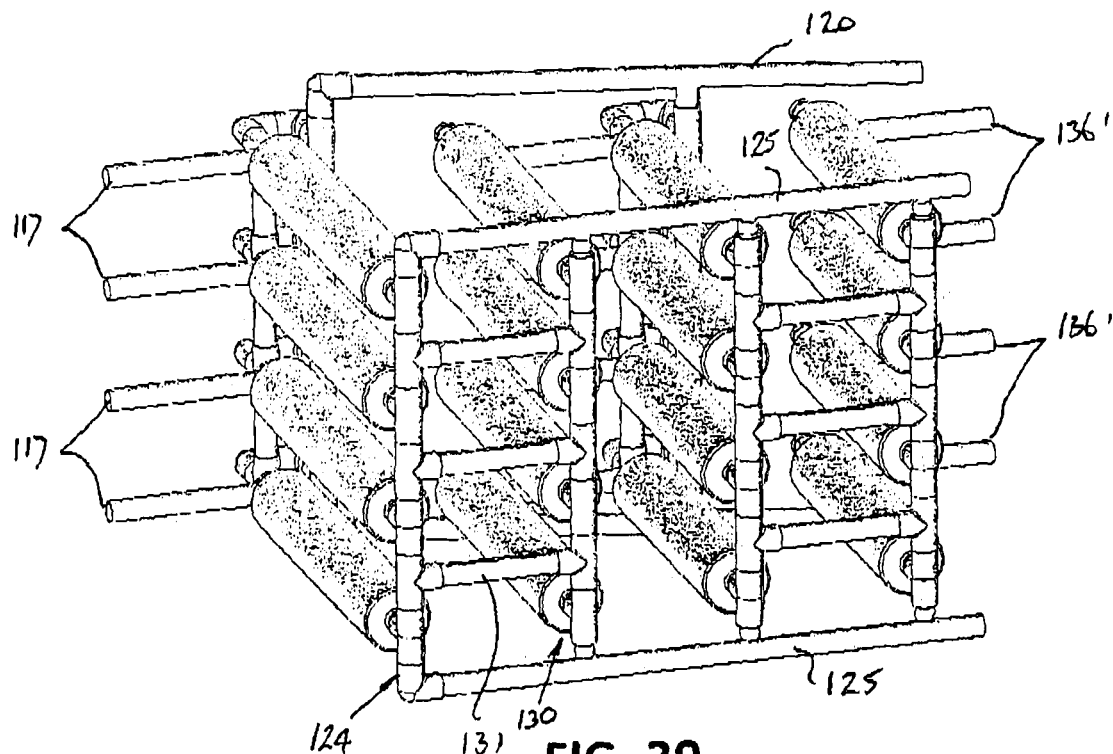
FIG. 39 is an isometric view from the bottom of the apparatus of FIG. 37.
Figure 40:
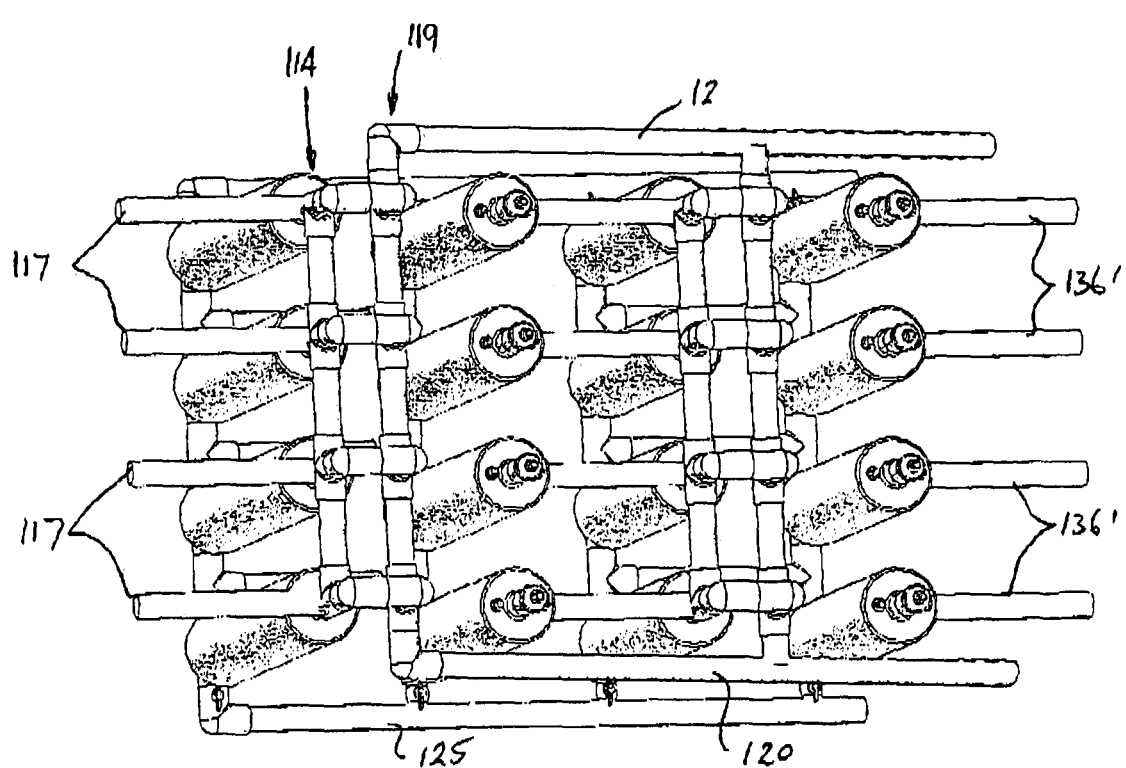
FIG. 40 is an isometric view from the top of the apparatus of FIG. 1.
Figure 74:
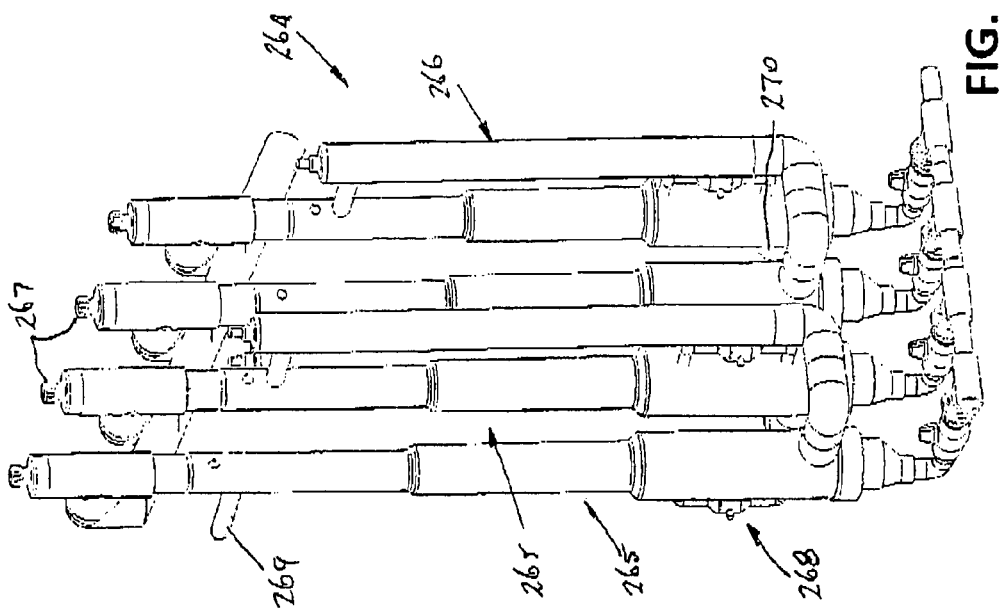
FIG. 74 is an isometric view of alternative liquid treatment apparatus according to the invention.
Figure 73:
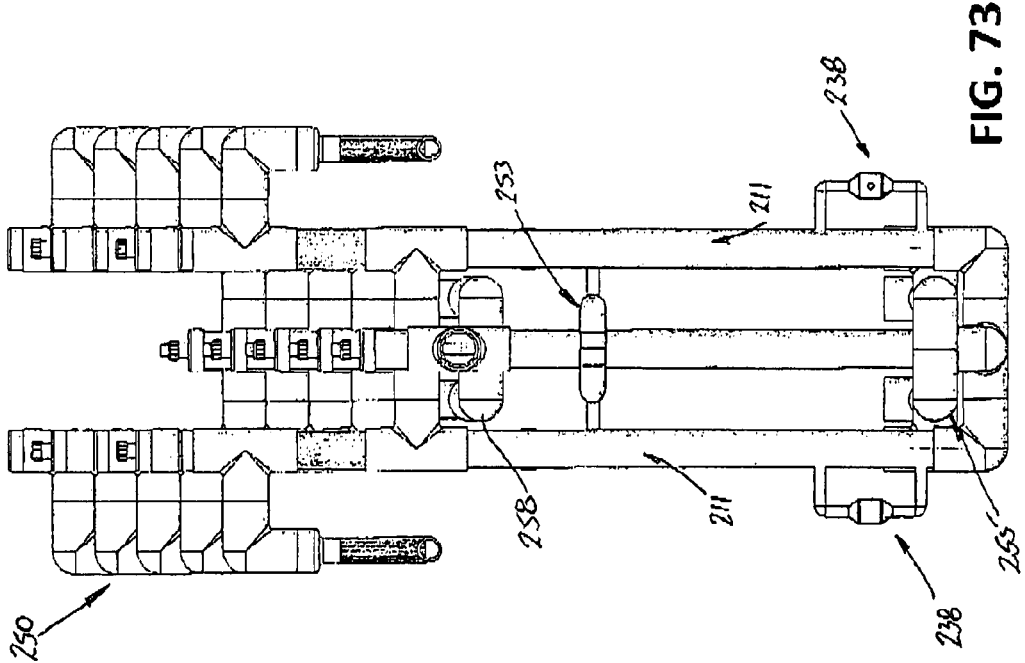
Figure 75:
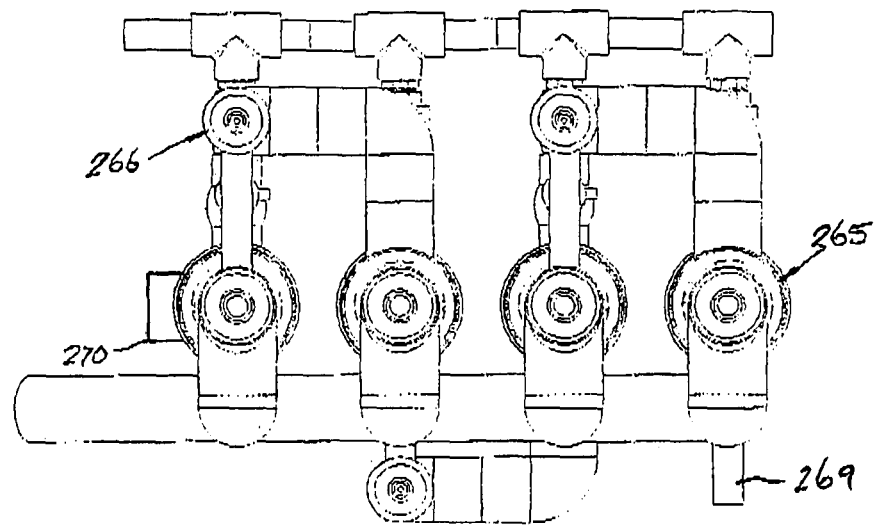
FIG. 75 is an enlarged top view of the apparatus of FIG. 74.

Referring now to FIGS. 74 and 75, there is illustrated further liquid treatment apparatus 264 similar to that described with reference to FIGS. 32 to 34 however in this case the stepped ozone fractionators members 94 of FIGS. 32 to 34 are replaced by advanced oxidation units 265 arranged in series with respective UV treatment units 266, the advanced oxidation units 265 and UV treatment units 266 being of successively decreasing height. The advance oxidation units 265 include UV tubes 267 and also means to introduce ozone or ozone enriched air into a lower portion of the unit such as venturi units 268. Flow occurs from the upper inlet 269 to the lower outlet 270

Figure 76:
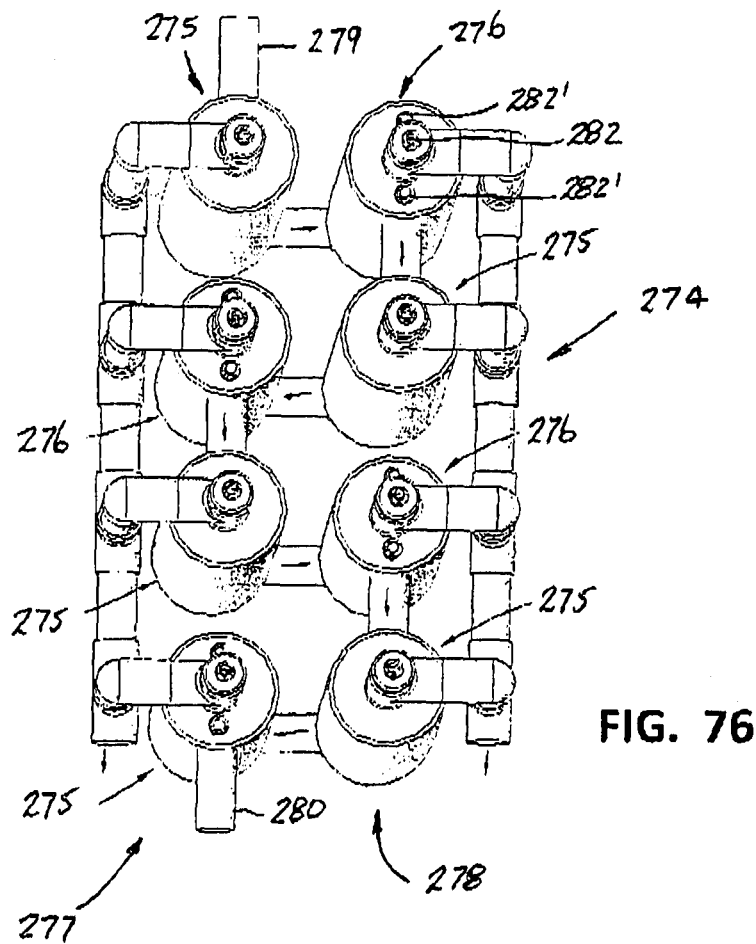
FIGS. 76, 77 and 78 illustrate in top, isometric and front view, a further liquid treatment apparatus according to another embodiment of the invention.
Figure 78:
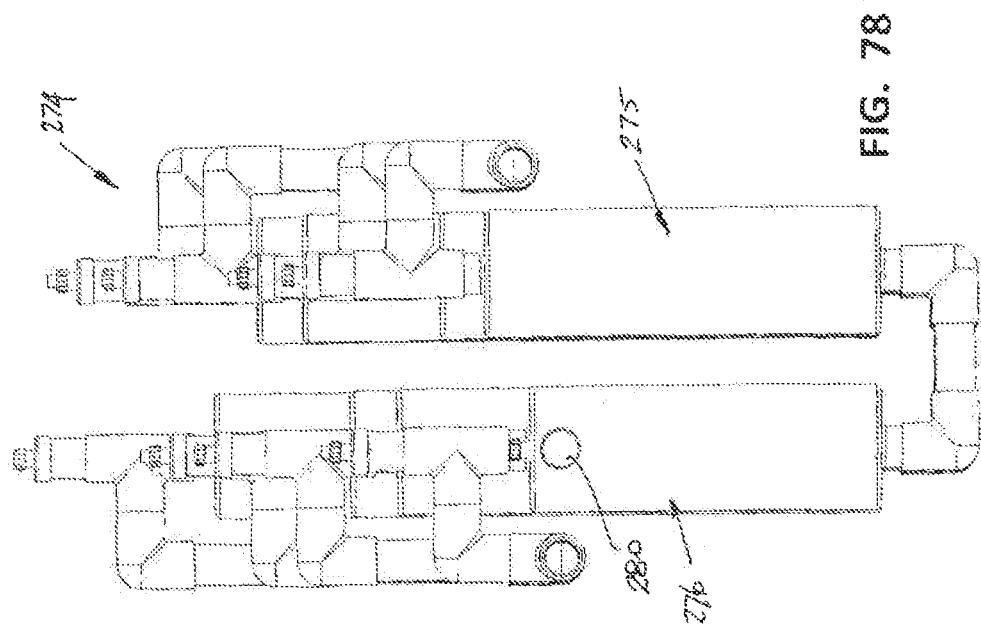
Figure 77:
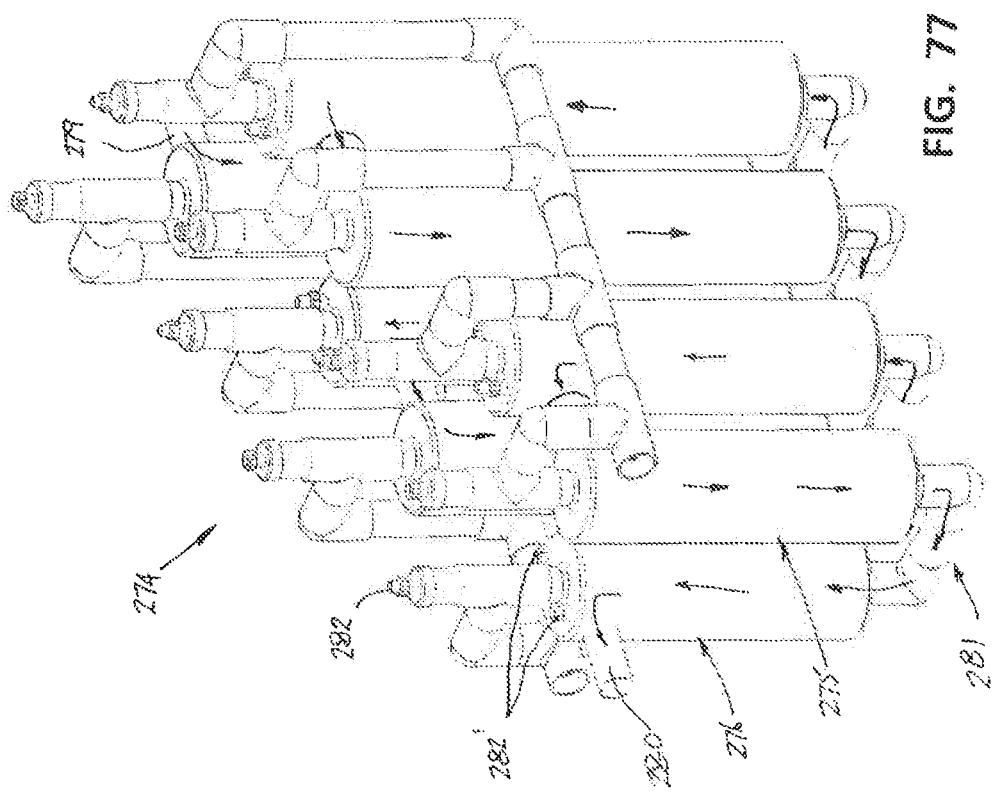

The apparatus 274 of FIGS. 76 to 78 has advanced oxidation units 275 and UV treatment units 276 arranged alternatively in two columns 277 and 278. An inlet 279 is connected to the leading oxidation unit 275 and an outlet 280 connected to the trailing unit 276. Flow through the apparatus 274 occurs from an oxidation unit 275 in one column 277 or 278 to a UV treatment unit 276 in the other column 278 or 277 as indicated by the arrows in FIG. 76 through U-shaped connected passages 281 joining the lower sides of the units 275 and 276. Further each unit 275 and 276 has a chamber of enlarged cross section. This enables the UV treatment units 276 to have not only a central UV lamp 282 but additional UV lamps 282'. It will be appreciated that the chambers of the units 275 and 276 may be of different diameters or cross section.

Figure 80:
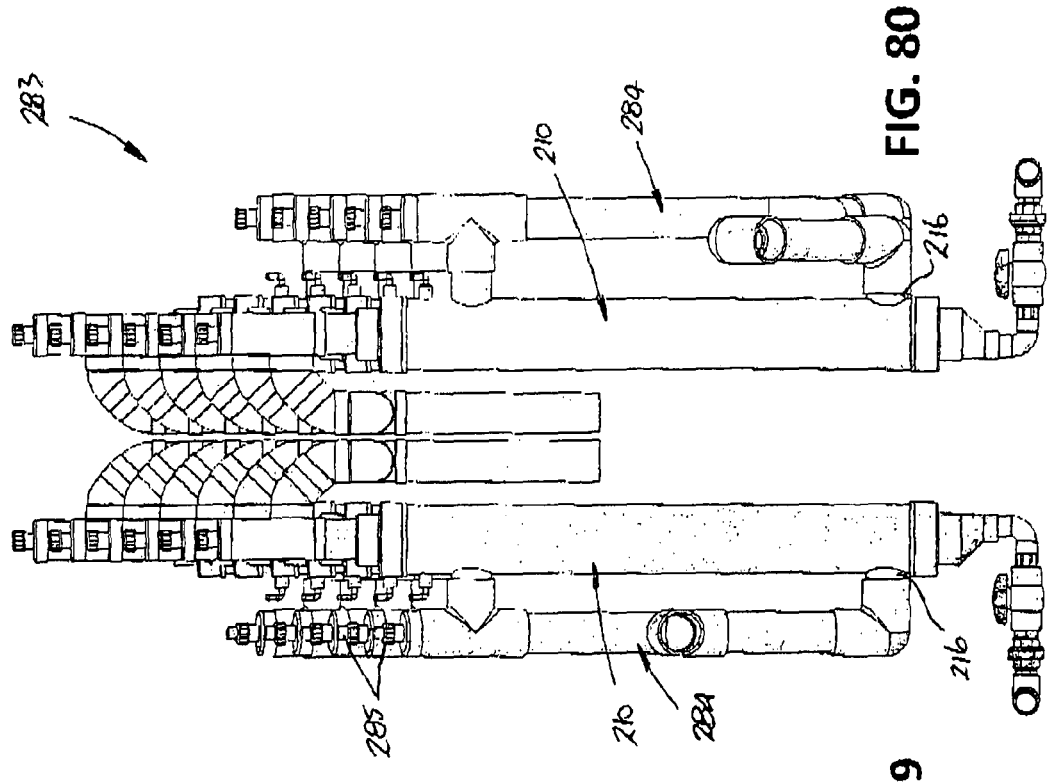
FIGS. 79, 80 and 81 illustrate in side and opposite end views, further liquid treatment apparatus according to another embodiment of the invention.
Figure 79:
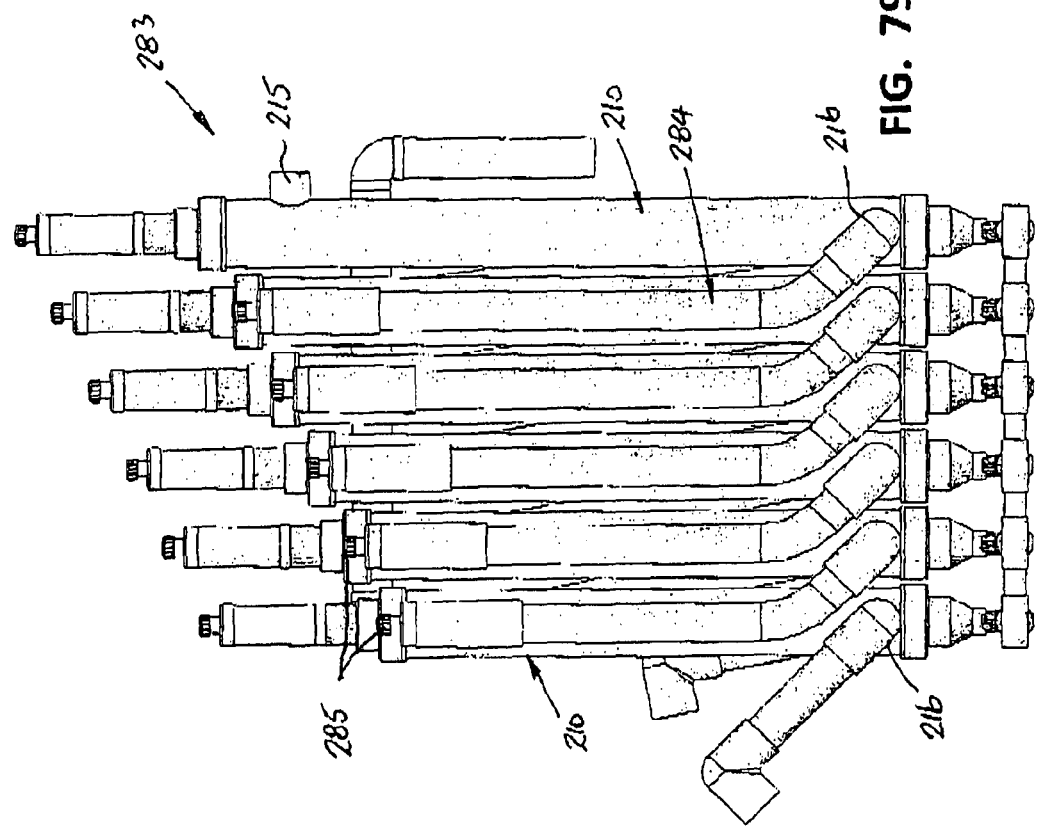
Figure 81:
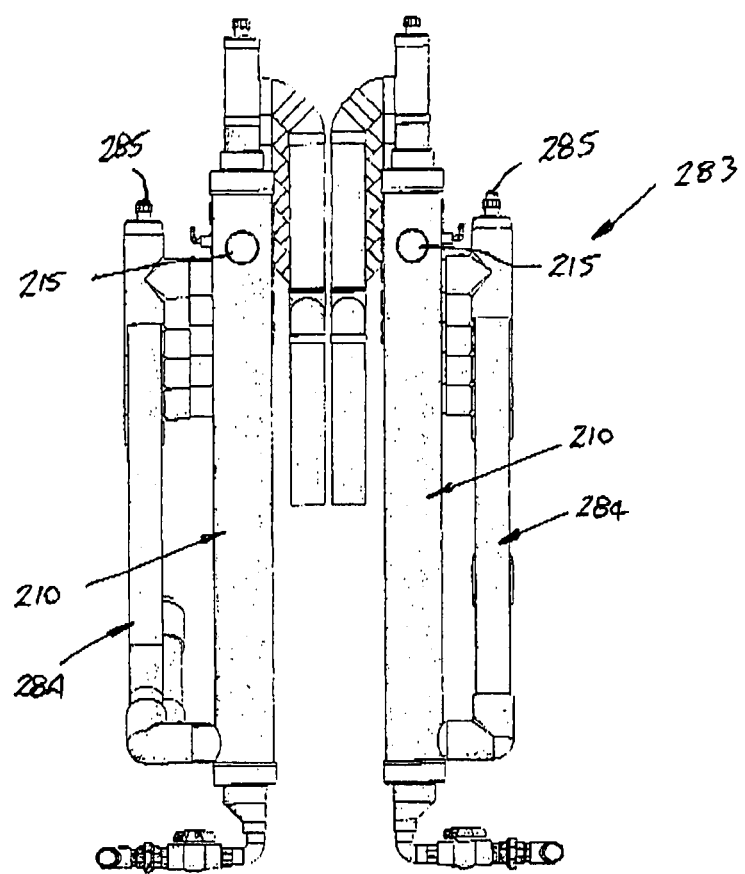

The apparatus 283 of FIGS. 79 to 81 has advanced oxidation units 210 similar to those described with reference to FIGS. 65 and 66 arranged in two separate columns or rows. Similar components to the units 210 of FIGS. 65 and 66 have been given similar numerals. The outlet 216 of each unit 210 is connected to the lower end of a UV treatment unit 284 which is arranged in an upright attitude adjacent the next advanced oxidation unit 210 for liquid flow upwardly through the UV units 284 for exposure to UV light provided by the lamps 285. The upper ends of each UV unit 284 are connected to the upper end of the adjacent oxidation unit 210 for flow of liquid downwardly through the units 210. Treated liquid exits the outlets 216.

The units 210 are of successively decreasing height from the inlet 215 to the outlet 216 with the connection of the outlet of each UV unit 284 to an oxidation unit 210 being lower than the inlet to the preceding unit 210 such that liquid flows gravitationally from the inlet 215 to the outlet 216. The waste outlets 231 are connected to common waste pipes 286.

Figure 82:
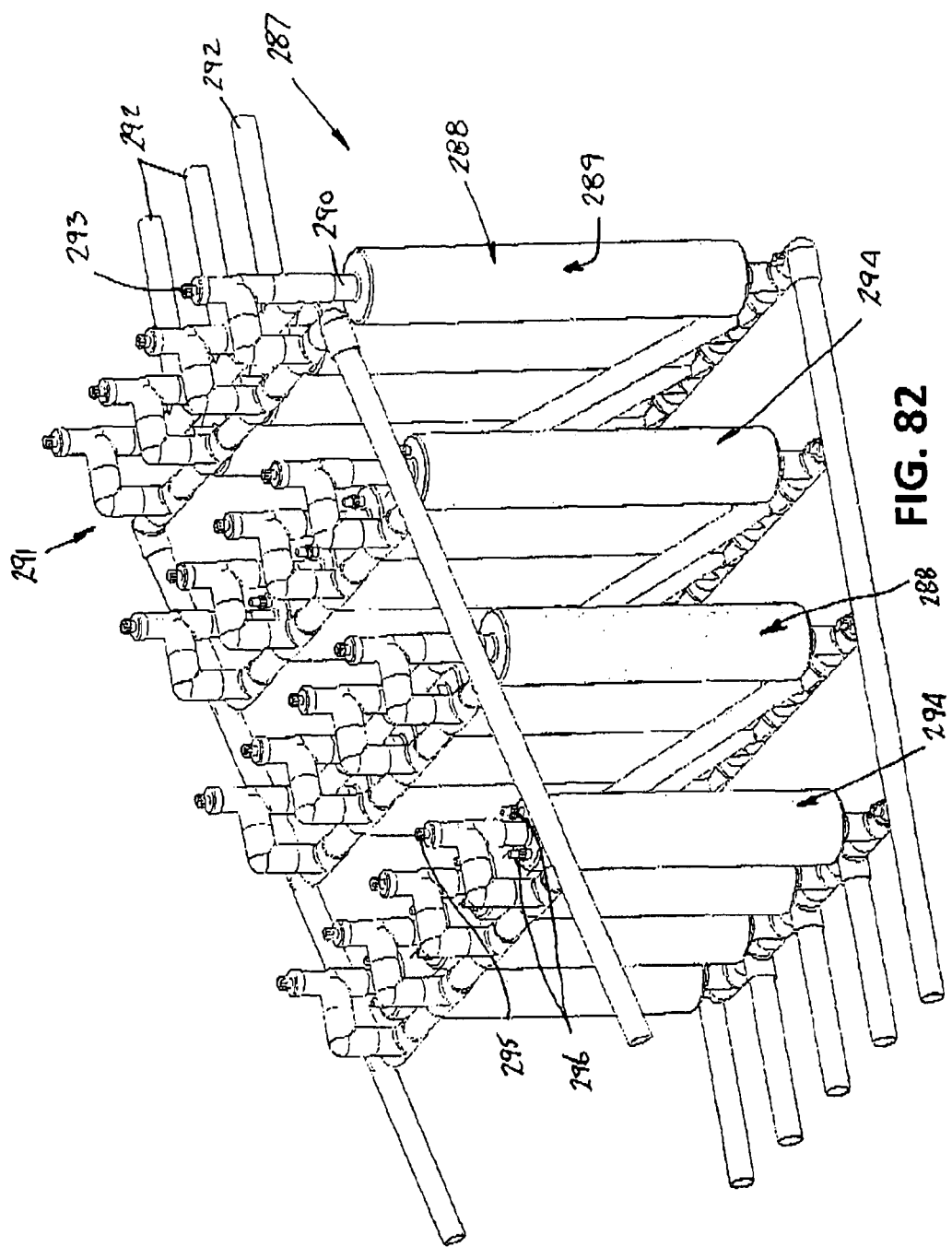
FIGS. 82 and 83 are opposite isometric views of liquid treatment apparatus according to another embodiment of the invention.
Figure 83:
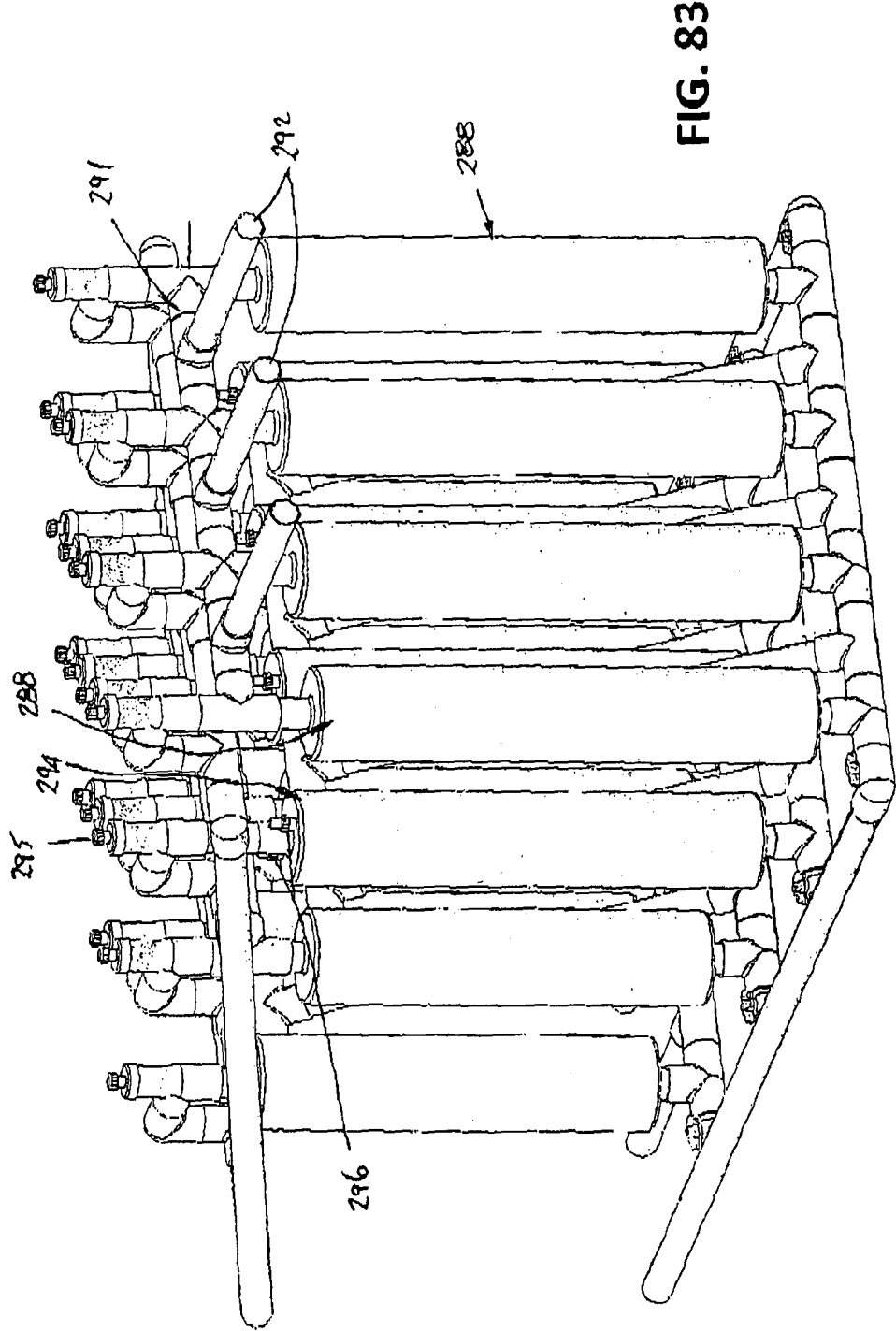

The liquid treatment apparatus 287 of FIGS. 82 and 83 is similar to that described in FIGS. 42 to 47 however in this case a first set of advanced oxidation units 288 of the type described above replace the oxidation chambers 127 of FIGS. 42 to 47 and define treatment chambers 289. Each chamber 289 has an upstanding inlet 290 at its upper end and the respective inlets 290 of the members are connected to a transversely extending common inlet manifold 291 from which inlet ducts 292 extend. The chambers 289 carry UV lamps 293 for advance oxidation of liquid flowing in the chambers. The apparatus 287 further includes UV treatment chambers 294 into which a central UV lamp 295 and a pair of further lamps 296 arranged symmetrically on opposite sides of the central lamp 295 extend.

Liquid entering the inlets 292 is subject to both advance oxidation and UV treatment in flowing through the chambers 289 and 294. Whilst the apparatus of FIG. 82 shows advanced oxidation units 288 in each row of the apparatus, some of the units 288 may be provided without UV lamps such that liquid flowing therein is only subject to ozone fractionation. The units 288 and chambers 294 may be arranged in any combination and arranged in any order.

Figure 84:
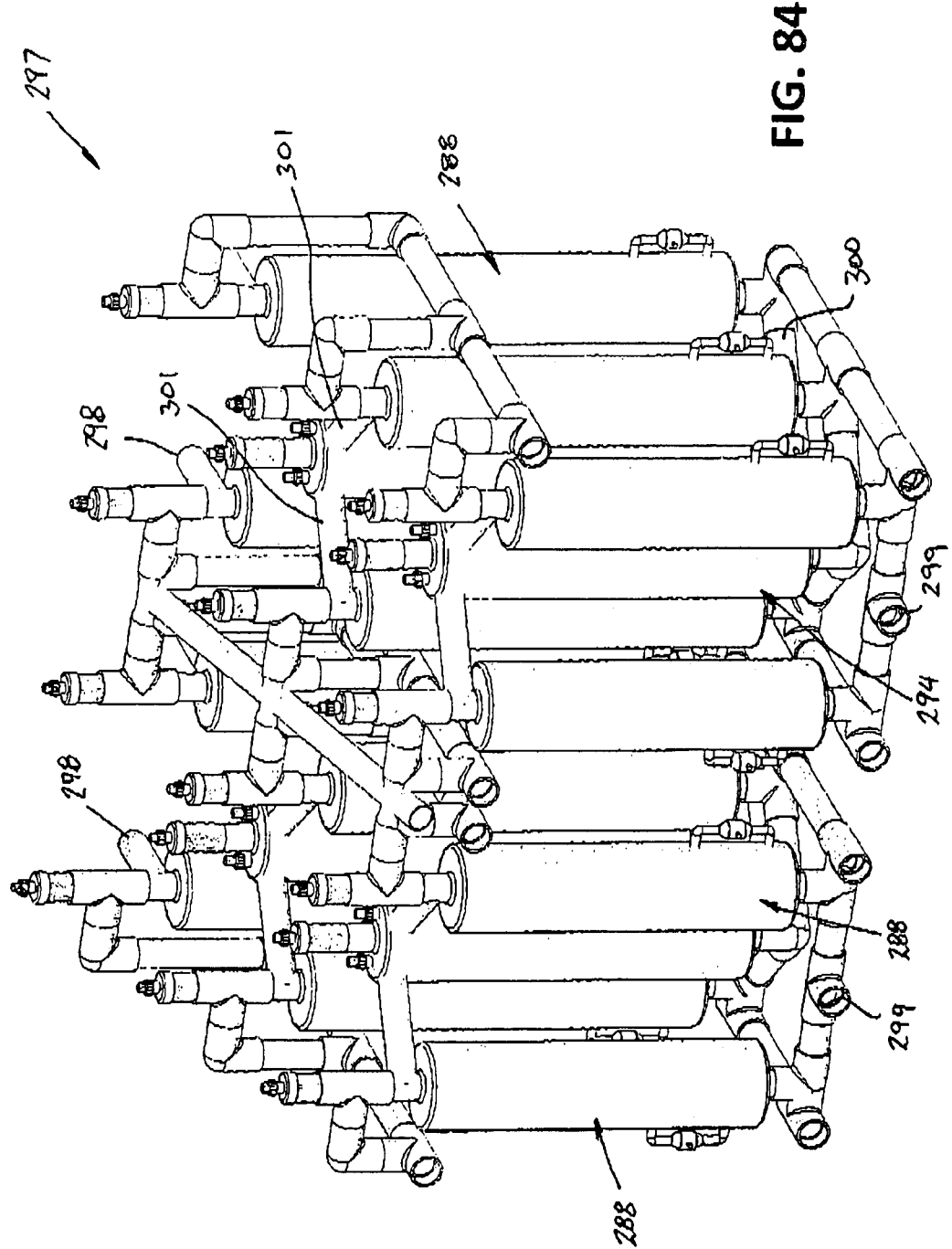
FIGS. 84 and 85 illustrate in isometric and front views further liquid treatment apparatus according to another embodiment of the invention.
Figure 85:
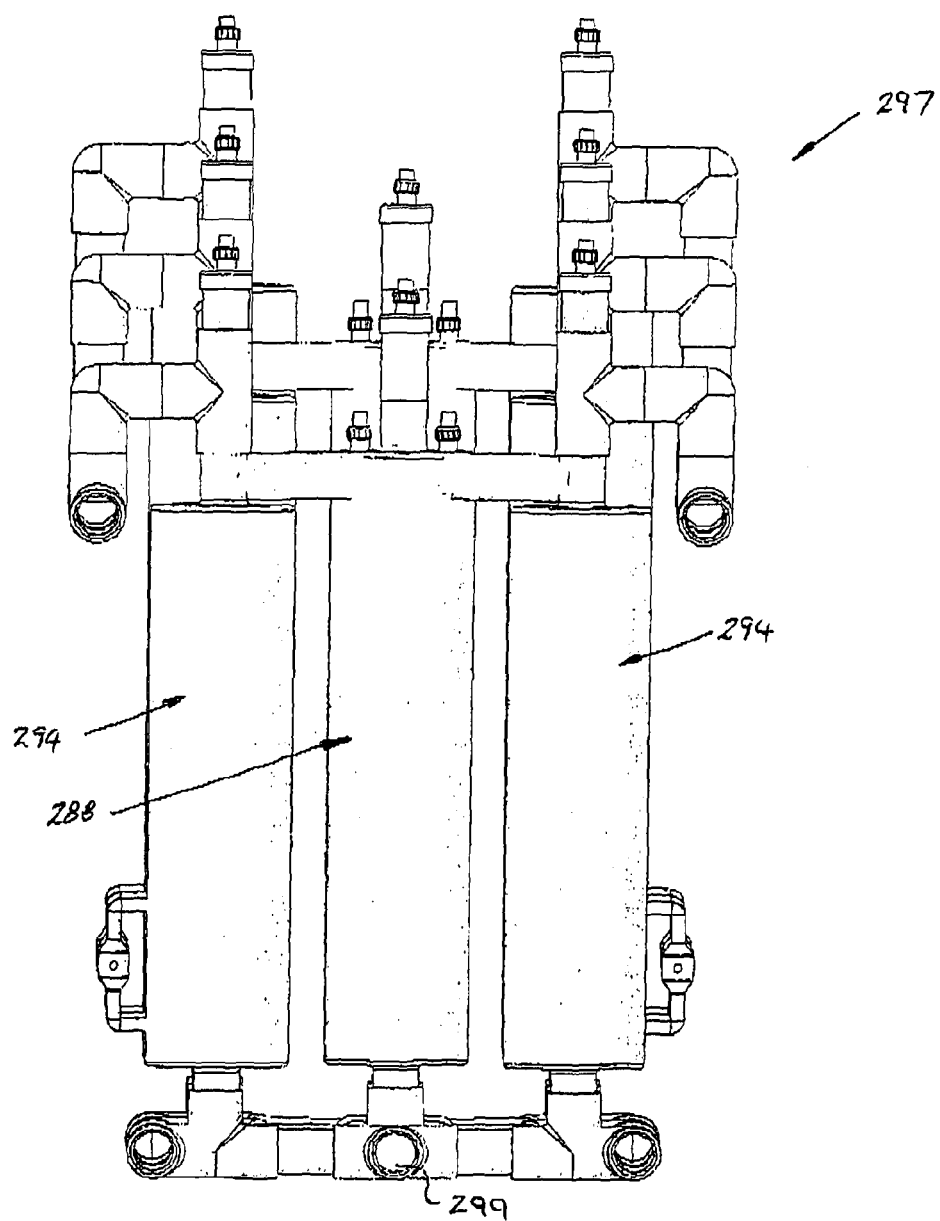

The liquid treatment apparatus 297 of FIGS. 84 and 285 uses advanced oxidation units 288 and UV treatment chambers 294 of similar form to that described in FIGS. 82 and 83. In this case a pair of units 288 are followed by a single UV treatment chamber 294 and the single chamber 294 followed by a pair of units 288. This pattern continues throughout the apparatus 297 from inlets 298 provided to the upper end of each leading unit 288 to outlets 299 from the lower ends of the trailing units 288. The units 288 and chambers 294 are connected by connecting passages 300 on their lower sides from units 288 to chambers 294 and on their upper sides by further connecting passages 301 on their upper sides from the chambers 298 to the units 294. The passages 300 and 301 also serve to split flow through the apparatus 297.

Thus liquid flowing into the inlets 298 passes downwardly through the units 288 for exit into the connecting passages 300 where it flows to the lower end of a single UV treatment unit 294 for flow upwardly therethrough. Flow from the upper ends of the chamber 294 is split into the connecting passages 301 for flow to the upper ends of the next pair of units 288 for flow downwardly therethrough. Flow continues in this manner through the apparatus 299 to exit at the outlets 299. The units 288 and chambers 294 are of successively decreasing height for gravitational flow through the apparatus 297.

Figure 26:
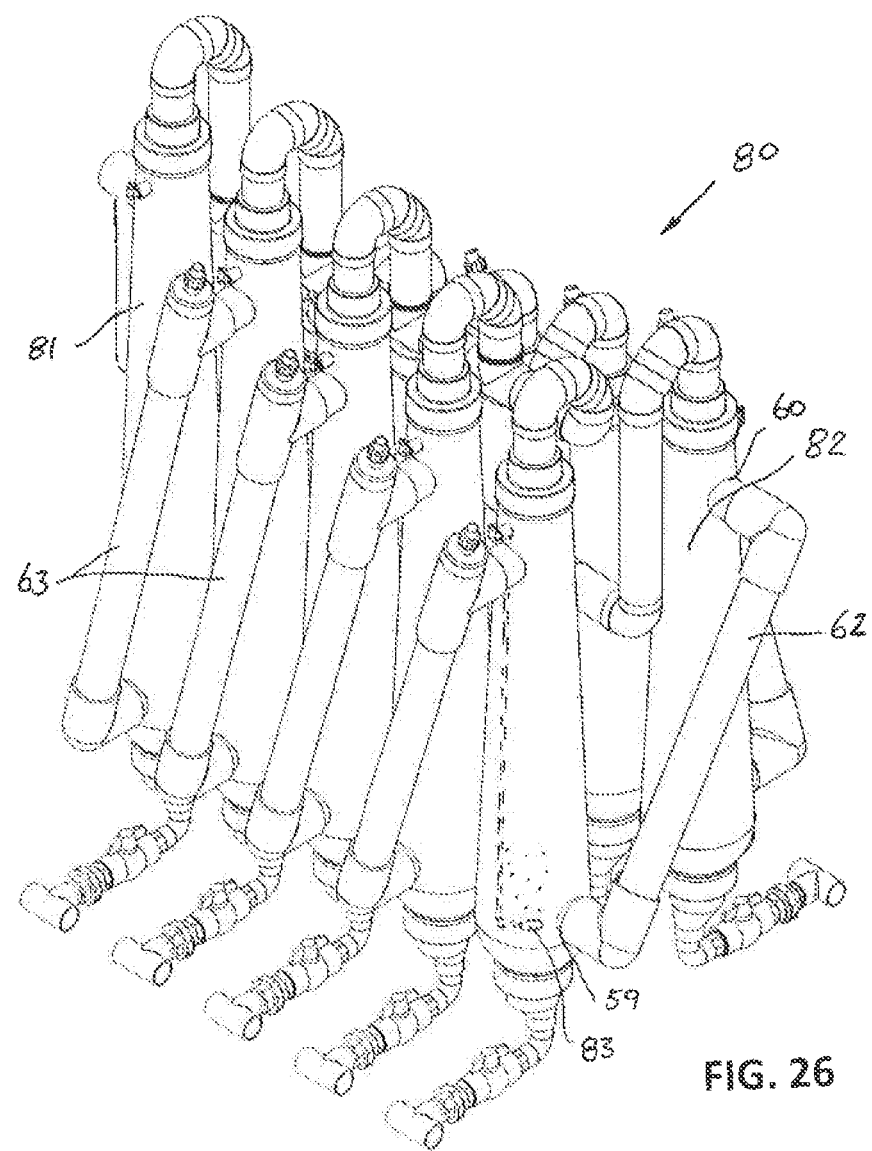
FIG. 26 is an isometric view of liquid treatment apparatus according to another embodiment of the invention.
Figure 28:
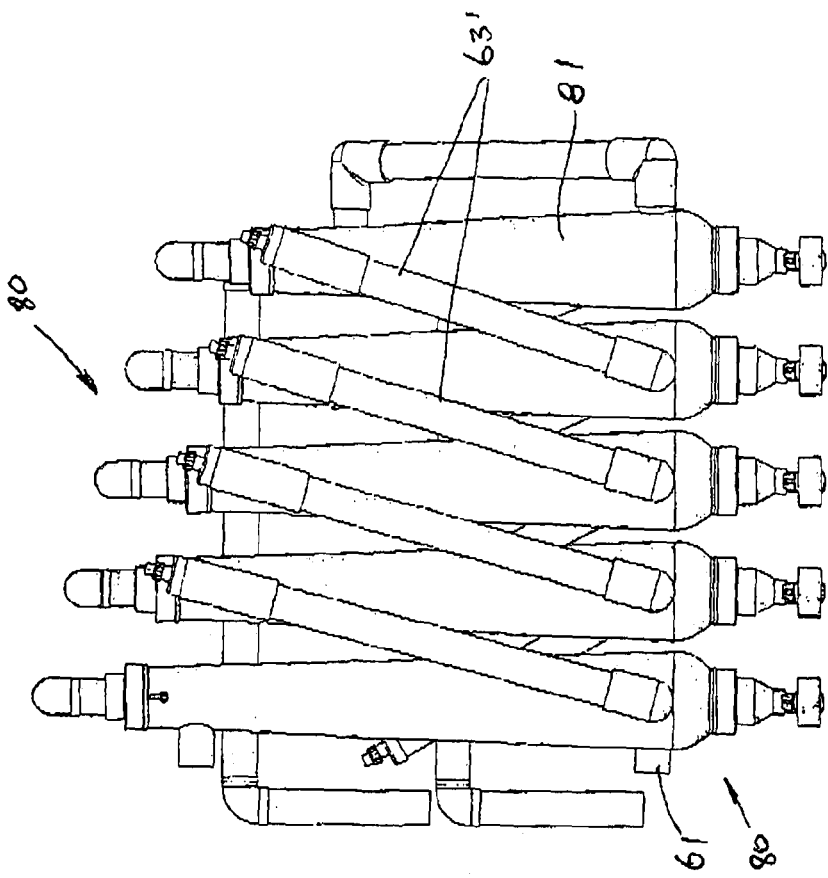
FIGS. 27 and 28 are opposite side views of the apparatus of FIG. 26.
Figure 27:
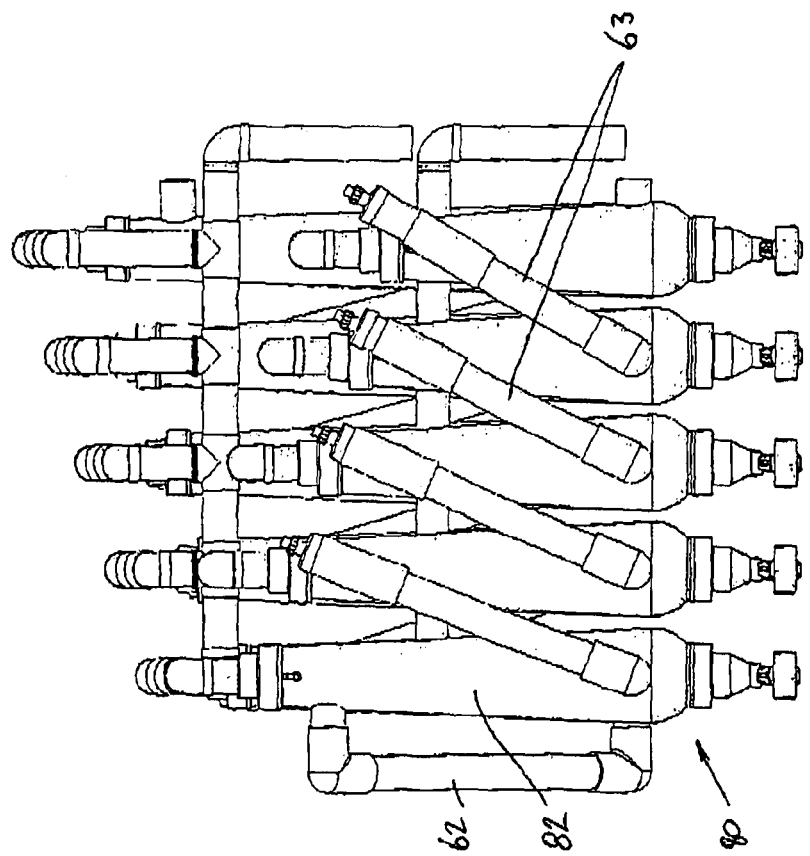
Figure 87:
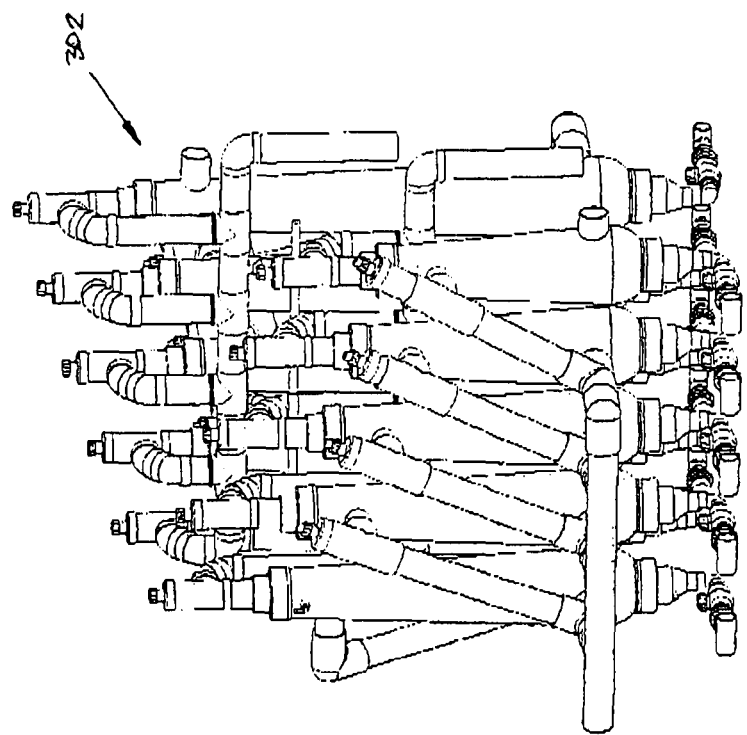
FIGS. 86 and 87 illustrate opposite isometric views of liquid treatment apparatus according to another embodiment of the invention.
Figure 86:
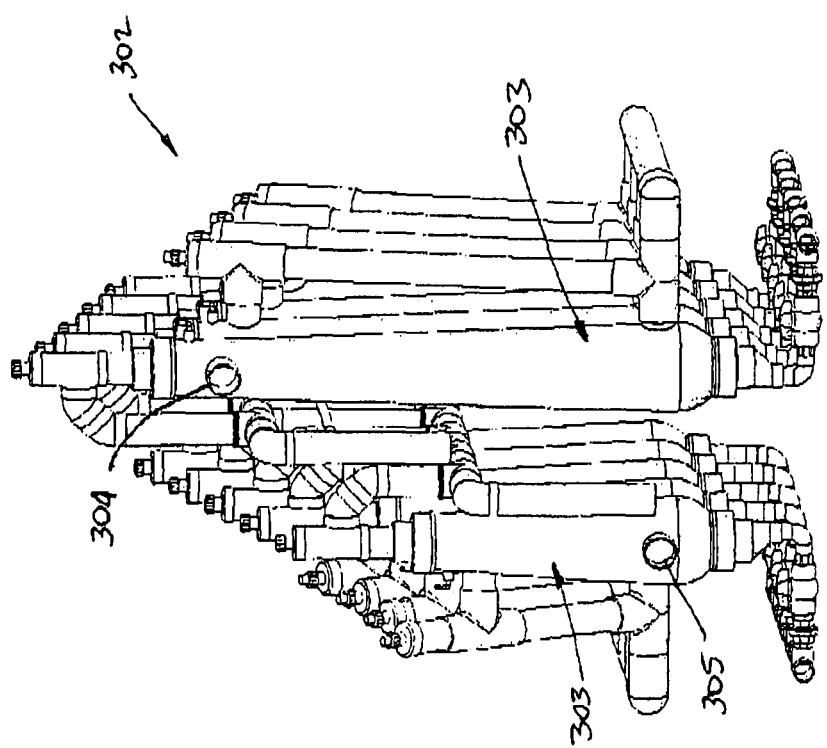

The embodiment of liquid treatment apparatus 302 of FIGS. 86 to 88 is similar to that of FIG. 26 and includes chambers of similar configuration to the chambers 82 of the apparatus of FIG. 26 tapering in cross section from a lower end towards the upper end. In this case however the chambers 82 comprise advanced oxidation units 303 in to which UV lamps extend. In other respects, the apparatus functions as described with reference to FIG. 26.

Referring now to FIGS. 89 and 90, there is illustrated a waste extraction unit 306 for treatment of waste extracted from the liquid treatment apparatus described above. The unit 306 includes a main chamber 307 connected to a vacuum pump 308 and an inlet pipe 309 which is connected to a waste outlet pipe or pipes of a liquid treatment apparatus described above. The base of the chamber 307 includes an outlet duct 310 which extends upwardly into the chamber 307. A shroud 311 extends over the upper end of the duct 311 to form a trap with the upper edge 312 of the duct 310 defining a weir over which water may flow to waste. A pair of UV lamps 313 also extend into the chamber 307, the lamps 313 emitting UV light of a wavelength to r brake down ozone.

Operation of the pump 308 will create a suction pressure in the chamber 307 thus draw in waste liquid and ozone into the chamber 307 through the pipe 309 and liquid will collect at the bottom of the chamber 307 and pass into the outlet duct 310 when the level reaches the weir edge 312 as shown in dotted outline at 314. This will form a liquid seal at the lower end of the chamber 307 which will to prevent gases passing out through the duct 310. Gases such as ozone in the chamber 307 will be exposed to the UV light emitted by the lamps 313 and thereby is destroyed or broken down. Continued operation of the pump 308 will cause the treated gases to pass to the atmosphere through pump outlet 315.

Many variations may be made to the operation of the liquid treatment apparatus described in the above embodiments. For example the concentration of ozone introduced into the advanced oxidation chambers may be varied. Further the apparatus may have any combinations of advanced oxidation units and UV treatment units of the type described above. Hydrogen peroxide may be introduced as a gas into the primary treatment chambers. Alternatively or additionally, hydrogen peroxide may be introduced as a liquid prior to or during flow of fluid through the chambers. For UV sterilization, UV lamps which emit UV light in the lower range, mid range and upper ranges may be used, that is of wavelengths in the range of 100-280 nm, 280-315 nm and 315-400 nm. Sterilization wavelengths are usually in the lower range.

Whilst the chambers of the units are typically of a circular cross section, they may be of other cross sections. Various means for introducing the sterilizing gas to the advanced oxidation chambers as described. Further in each of the above described apparatus, ionization units or chlorination units may be connected to or communicate with one or more of the chambers of the advanced oxidation units or with any other flow passage of the apparatus for treatment of liquid flowing therein. Various combinations of the described waste foam removal means may be provide in any of the above embodiments as required.

The treatment chambers may be enlarged in cross section as for example in the embodiment of FIG. 37 to reduce flow through the chambers and therefore increase exposure of the chambers to the sterilizing agent and/or UV light. For destorying In addition, the embodiments of liquid treatment apparatus described above may be associated with additional filtering apparatus such as carbon filters or screen or drum filters.

The above described apparatus is particularly useful for cleaning biologically toxic or non-degradable materials such as aromatics, pesticides, petroleum constituents, and volatile organic compounds in waste water with contaminated materials converted to a large extent into stable inorganic compounds such as water, carbon dioxide and salts, When applied to contaminated water, the cleaned waste water may be used as required.

It should be noted that reference to the prior art herein is not to be taken as an acknowledgement that such prior art constitutes common general knowledge in the art.

The terms "comprising" or "comprise" or derivatives thereof as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

The invention claimed is:

1. Fluid purification or treatment apparatus comprising
a series of alternative interconnected upright elongated primary treatment chambers and further chambers, whereby fluid flowing through the apparatus is subjected to multiple treatments, wherein:
each upright elongated primary treatment chamber comprises,
an inlet for fluid to be treated at an upper end of said primary treatment chamber,
an outlet from the primary treatment chamber at a lower end of said primary treatment chamber such that fluid flows downwardly through said primary treatment chamber from said inlet to said outlet,
means for introducing a sterilizing agent into a lower end of said primary treatment chamber for bubbling upwardly through liquid flowing downwardly through said primary treatment chamber,
means at the upper end of said primary treatment chamber for removing waste in said liquid conveyed by said bubbles upwardly through said primary treatment chamber,
each further chamber, being inclined and connected between the outlet of an associated primary treatment chamber and the inlet of an adjacent primary treatment chamber, comprises:
an inlet located at a lower end of the further chamber for receiving gas treated fluid from said associated primary treatment chamber, said inlet connected to the lower end of said associated primary treatment chamber; and
an outlet at an upper end of said further chamber such that the flow of gas treated liquid is upwardly through said further chamber;
wherein the outlet of each further chamber is located below the level of the input of the associated primary treatment chamber such that the fluid flows gravitationally through the fluid purification or treatment apparatus, and
wherein a one or more of said further chambers is associated with an ultraviolet light source for exposing gas treated liquid from said associate primary treatment chamber to ultraviolet light.

2. Fluid purification or treatment apparatus as claimed in claim 1 wherein said means for introducing said sterilizing agent into said primary treatment chamber comprises one or more gas outlets, said one or more gas outlets comprising one or more of air stones, a gas permeable pipe or pipes, a diffuser or diffusers or an external venturi or venturis communicating with the primary treatment chamber and a source of said agent, and wherein said means at the upper end of said primary treatment chamber for removing waste comprises an inverted U-shaped trap and/or a venturi unit.

3. Fluid purification or treatment apparatus as claimed in claim 2 wherein one or more further chambers comprises a source of ultraviolet light within said further chamber whereby liquid from said associated primary treatment chamber is exposed to ultraviolet light in said further chamber, and wherein said source of ultraviolet light comprises at least one ultraviolet lamp or tube extending longitudinally of said further chamber.

4. Fluid purification or treatment apparatus as claimed in claim 3 wherein the or each said primary treatment chamber and the or each said further chamber is defined by an elongated upstanding tubular member.

5. Fluid purification or treatment apparatus as claimed in claim 1, wherein at least some of said primary treatment chambers are of a successively decreasing height from an inlet to said apparatus to an outlet from said apparatus, and wherein at least some of said further chambers are of a successively decreasing height or length from an inlet to said apparatus to an outlet from said apparatus, and wherein said primary treatment chambers and further chambers are arranged in transverse rows and wherein the inlets to the primary treatment chambers are connected to an inlet mixing manifold and wherein the outlets of said primary treatment chambers are connected to an outlet mixing manifold, said outlet mixing manifold being connected to inlets to said further chambers via transfer passages.

6. Fluid purification or treatment apparatus as claimed in claim 5 wherein said transfer passages are connected to an inlet mixing manifold connected to the inlets to said further chambers, and wherein said transfer passages connect said primary treatment chambers to upper ends of said further chambers whereby flow through said primary and further chambers is in the same direction.

7. Fluid purification or treatment apparatus as claimed in claim 6 wherein said waste removing means of each said primary treatment chamber is connected to one or more common waste pipes.

8. Fluid purification or treatment apparatus as claimed in claim 7 wherein the lower ends of said chambers are selectively connectable to one or more common drainage pipes or ducts to allow drainage of said chambers.

9. Fluid treatment or purification apparatus as claimed in claim 1, comprising
a series of interconnected fluid treatment or purification units, each unit comprising
a pair of the primary treatment chambers, coupled at the outlets of the primary treatment chambers to an inlet of a further chamber, and wherein the further chamber is coupled at the outlet to the inlets of primary treatment chambers of a successive fluid treatment unit.

10. Fluid treatment or purification apparatus as claimed in claim 9 and including a plurality of said fluid treatment units and wherein the inlets to said primary treatment chambers are interconnected and connected to the outlet of an immediately preceding further said chamber, and wherein the lower ends of said primary and further chambers are in substantially the same horizontal plane such that said apparatus can be freestanding.

11. Fluid treatment or purification apparatus as claimed in claim 10 wherein said means for removing waste comprise inverted U-shaped waste trap members at the upper ends of said primary treatment chambers, and wherein said waste trap members are connected to at least one common waste pipe or line, and said at least one common waste pipe or line extends between said pairs of primary treatment chambers.

12. Fluid treatment or purification apparatus as claimed in claim 10 wherein said means for removing waste comprise venturi units at the upper ends of said primary treatment chambers.

13. Fluid treatment or purification apparatus as claimed in claim 12 wherein the lower ends of the primary treatment chambers and further chambers are connectable to one or more common drainage pipes or ducts to allow drainage of said chambers.

14. Fluid treatment or purification apparatus as claimed in claim 13 wherein at least one of said further chambers comprises an inner transparent flow tube and an outer housing surrounding said flow tube and wherein said at least one source of ultraviolet light is located within said outer housing such that fluid flowing through said tube is subject to ultraviolet light.

15. Fluid purification or treatment apparatus as claimed in claim 14 wherein one or more of said primary treatment chambers have a decreasing cross section from a lower end to an upper end of a said primary treatment chamber, and said one or more of said primary treatment chambers includes a plurality of joined or interconnected chamber sections, each said chamber section being of a cross section which is smaller than that of an immediately adjacent lower chamber section.

16. Fluid purification or treatment apparatus as claimed in claim 1, wherein said ultraviolet light source comprises at least one elongated ultraviolet lamp or tube extending longitudinally of said associated further chamber, and the or each said chamber is defined by an elongated upstanding tubular member.

17. Fluid purification or treatment apparatus as claimed in claim 16 wherein said upstanding tubular member includes an end cap and wherein said at least one ultraviolet lamp or tube is mounted to said end cap, and wherein said at least one ultraviolet lamp is located with a transparent tube mounted to said end cap such as not to be exposed directly to fluid flowing through said chamber.

18. Fluid purification or treatment apparatus as claimed in claim 17 wherein said means for introducing a sterilizing agent into said primary treatment chamber comprises one or more gas outlets, said one or more gas outlets comprising one or more of air stones, a gas permeable pipe or pipes, a diffuser or diffusers or an external venturi communicating with the primary treatment chamber and a source of said agent, and further including means for selectively controlling the flow of said sterilizing agent to said one or more gas outlets.

19. Fluid purification or treatment apparatus as claimed in claim 18 wherein the lower ends of said chambers are in substantially the same horizontal plane and wherein at least some of said chambers are of decreasing height from an inlet to an outlet to and from said apparatus.

20. Fluid purification or treatment apparatus as claimed in claim 18 wherein said means for introducing said sterilizing agent into one or more of said primary treatment chambers comprises means for introducing air into said primary treatment chambers.

21. Fluid purification or treatment apparatus as claimed in claim 18 wherein said primary treatment chambers and further chambers are arranged in two rows or columns, each row or column including alternatively primary treatment chambers and further chambers respectively and means interconnecting the primary treatment chambers in one row with adjacent further chambers in the other row, and wherein said primary treatment chambers and further chambers are arranged in transverse rows and wherein the inlets to the primary treatment chambers are connected to an inlet mixing manifold and wherein the outlets of said primary treatment chambers are connected to an outlet mixing manifold, said outlet mixing manifold being connected to inlets to said further chambers via transfer passages, and said transfer passages are connected to an inlet mixing manifold connected to the inlets to said further chambers, and further including at least one pair of primary treatment chambers connected to a said further chamber whereby fluid flowing in said primary treatment chambers flows through said further chamber.

22. Fluid purification or treatment apparatus as claimed in claim 21 wherein one or more of said primary treatment chambers have a decreasing cross section from a lower end to an upper end of a said primary treatment chamber, and wherein one or more of said primary treatment chambers includes a plurality of interconnected chamber sections, each said chamber section being of a cross section which is smaller than that of an immediately adjacent lower chamber section.

23. Fluid purification or treatment apparatus as claimed in claim 22 and including one or more of means for ionizing, chlorinating or applying electrical pulses to, fluid flowing through said apparatus.

24. Fluid purification or treatment apparatus as claimed in claim 23 wherein said sterilizing agent comprises ozone or ozone enriched air and including ozone production means for supplying ozone or ozone enriched air to said primary treatment chambers, said ozone production means comprising one or more elongated upright chambers, one or more ultraviolet lamps in said one or more chambers and means for passing air through said chambers, ultraviolet radiation from said lamps being of a frequency to convert oxygen in said air into ozone.

25. Fluid purification or treatment apparatus as claimed in claim 24 and including means for processing waste from said apparatus, said processing means including a waste chamber having an inlet for receiving said waste, a vacuum or suction pump connected to said waste chamber, at least one ultraviolet light source in said chamber for destroying gas in said waste chamber and an outlet from said chamber, and further including a fluid trap associated with said outlet for preventing gases passing through said outlet.

* * * * *